(12) United States Patent
Felter

(10) Patent No.: US 7,308,286 B2
(45) Date of Patent: Dec. 11, 2007

(54) MULTI-DIMENSIONAL JOINT SEARCHER AND CHANNEL ESTIMATORS

(75) Inventor: Stefan Felter, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 353 days.

(21) Appl. No.: 10/717,313

(22) Filed: Nov. 20, 2003

(65) Prior Publication Data

US 2005/0113042 A1    May 26, 2005

(51) Int. Cl.
H04M 1/00    (2006.01)
H04B 1/06    (2006.01)
H04B 17/00    (2006.01)

(52) U.S. Cl. .......... 455/562.1; 455/272; 455/279.1; 455/575.7; 455/550.1; 455/62; 455/13.3; 455/277.1; 343/751; 343/742; 343/757; 343/776; 343/754; 370/335; 370/320; 370/334

(58) Field of Classification Search ..... 455/272–279.1, 455/562.1, 575.7, 550.1, 13.3, 62; 343/751, 343/742, 757, 776, 754; 370/335, 320, 334, 370/441; 375/144–152, 130, 140
See application file for complete search history.

(56) References Cited

U.S. PATENT DOCUMENTS

| | | | |
|---|---|---|---|
| 5,790,606 A * | 8/1998 | Dent | 375/348 |
| 6,141,393 A | 10/2000 | Thomas et al. | |
| 6,311,043 B1 | 10/2001 | Haardt et al. | |
| 6,353,731 B1 | 3/2002 | Haardt et al. | |
| 6,370,397 B1 | 4/2002 | Popović et al. | |

6,473,393 B1    10/2002    Ariyavisitakul et al.

(Continued)

FOREIGN PATENT DOCUMENTS

| | | |
|---|---|---|
| EP | 1 303 058 A2 | 4/2003 |
| WO | 02/103927 A1 | 12/2002 |

OTHER PUBLICATIONS

International Search Report and Written Opinion mailed Mar. 8, 2005 in corresponding PCT application No. PCT/SE2004/001623.

(Continued)

*Primary Examiner*—George Eng
*Assistant Examiner*—Emem Ekong
(74) *Attorney, Agent, or Firm*—Nixon & Vanderhye, P.C.

(57) ABSTRACT

A wireless communication receiver (20) comprises an antenna structure (22) and a joint searcher and channel estimator (24). The antenna structure acquires dimensionally differentiated signals which are concurrently utilized by the joint searcher and channel estimator for determining both a time of arrival and channel coefficient. The wireless communication receiver can be either a mobile terminal or a network node (e.g., a radio access network node such as a base station node, also called Node-B). In "spatial" embodiments, the antenna structure comprises an array of plural antennas. The signals acquired by different antennas of the array are dimensionally differentiated with regard to a spatial dimension, and the time of arrival and a composite channel coefficient are essentially concurrently determined by the joint searcher and channel estimator. In "temporal" embodiments, the antenna structure comprises an antenna which provides signals for each of successive sets of pilot data received by the antenna as the dimensionally differentiated signals.

51 Claims, 32 Drawing Sheets

U.S. PATENT DOCUMENTS

| | | |
|---|---|---|
| 6,567,482 B1 | 5/2003 | Popović |
| 6,571,097 B1 | 5/2003 | Takai |
| 2002/0048286 A1 | 4/2002 | Brunel |
| 2002/0190901 A1 | 12/2002 | Yoshida |
| 2003/0012267 A1* | 1/2003 | Jitsukawa et al. .......... 375/148 |
| 2003/0043887 A1 | 3/2003 | Hudson |
| 2003/0053523 A1 | 3/2003 | Xu |
| 2003/0067970 A1 | 4/2003 | Kim |

OTHER PUBLICATIONS

U.S. Appl. No. 10/717,203, filed Nov. 20, 2003 entitled "Spatial Joint Searcher And Channel Estimators".

U.S. Appl. No. 10/707,205, filed Nov. 20, 2003 entitled "Temporal Joint Searcher And Channel Estimators".

U.S. Appl. No. 10/707,212, filed Nov. 20, 2003 entitled "Spatio-Temporal Joint Searcher And Channel Estimators".

* cited by examiner

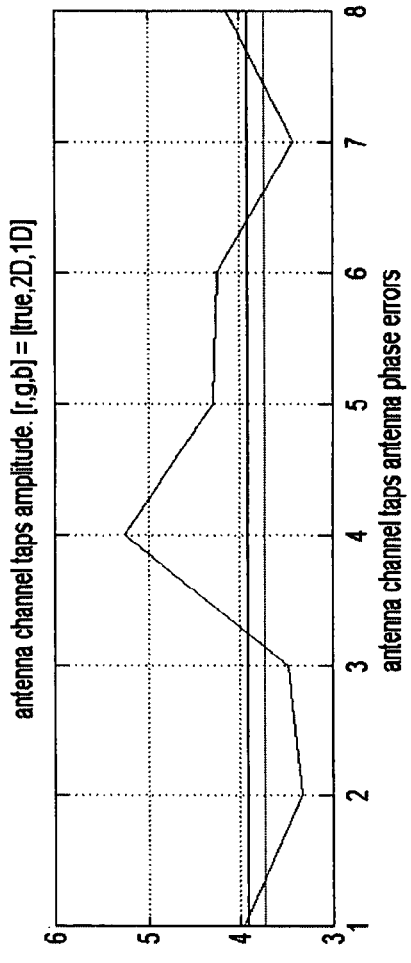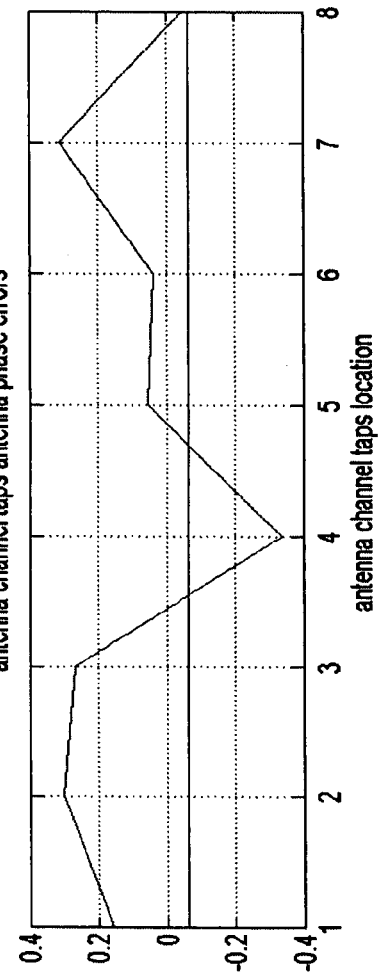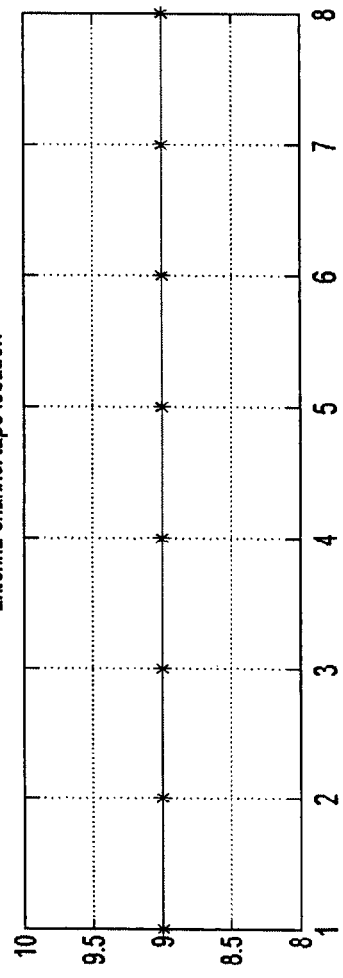

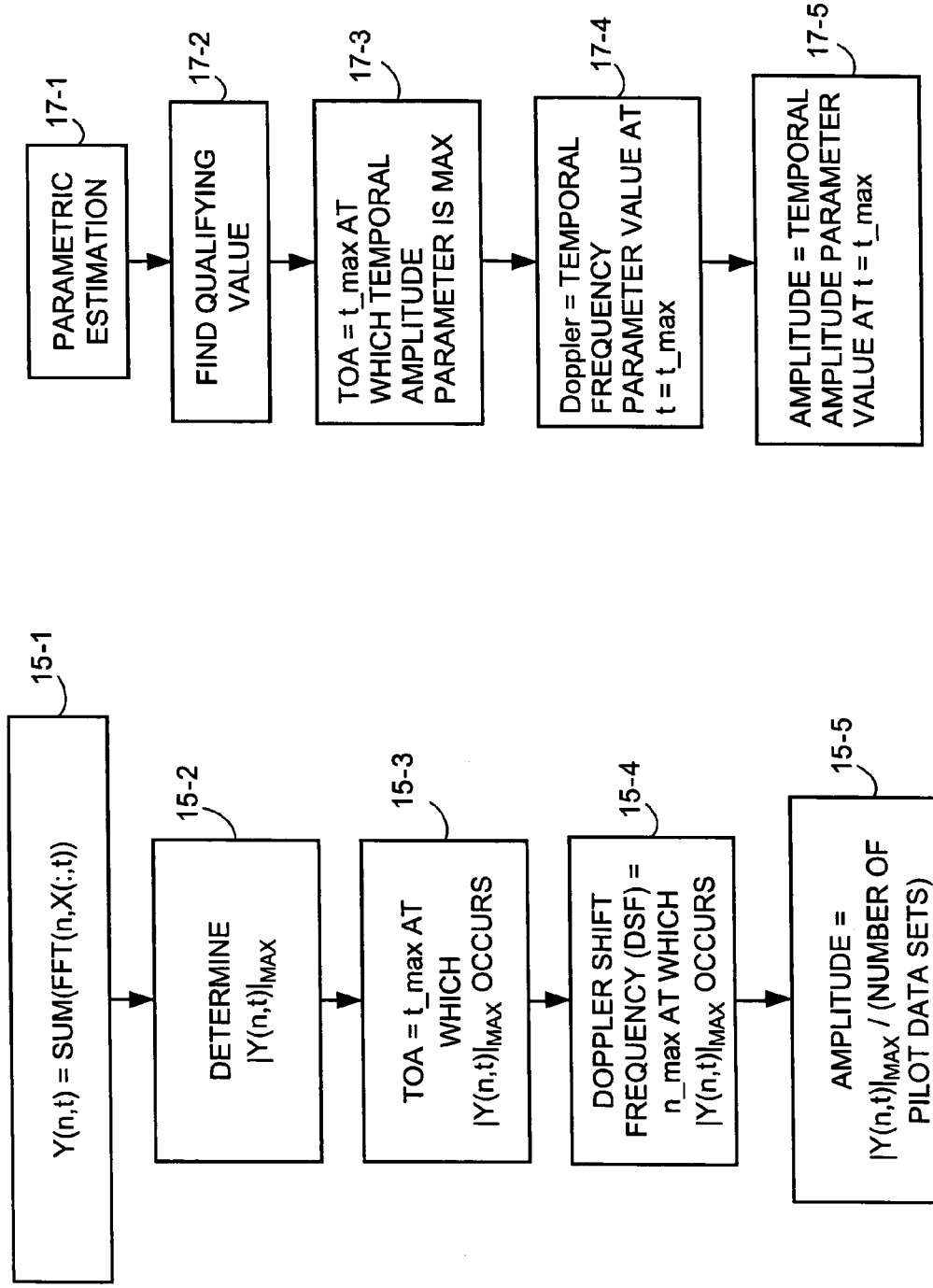

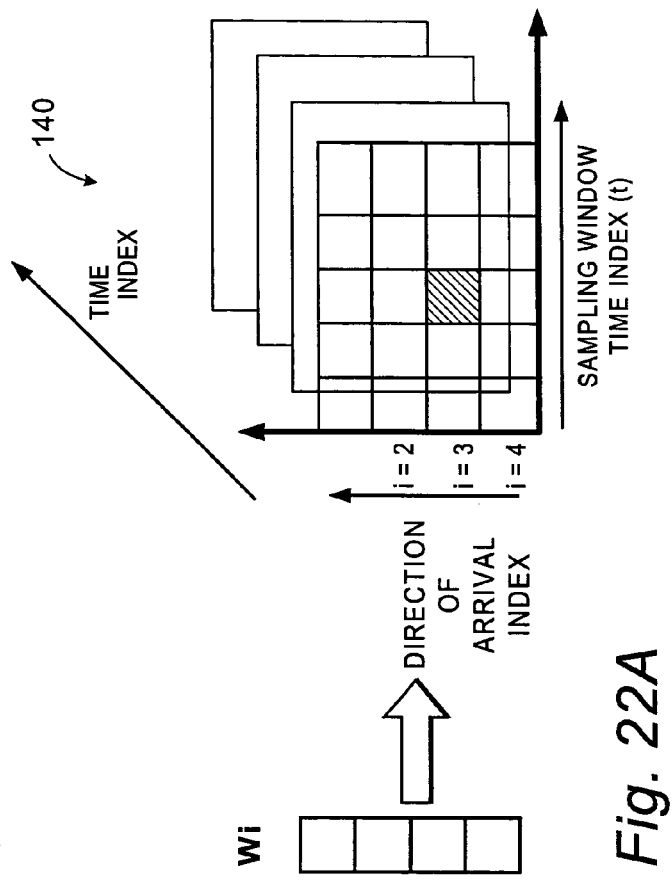
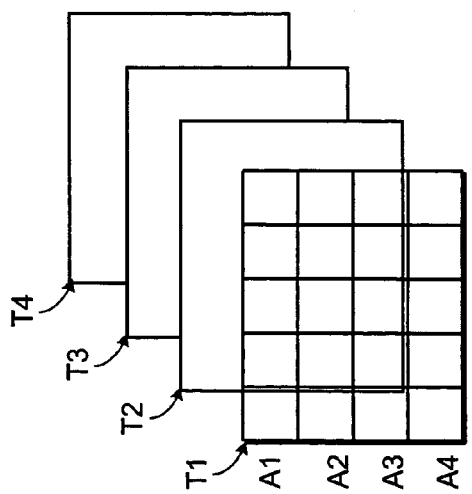
Fig. 22A
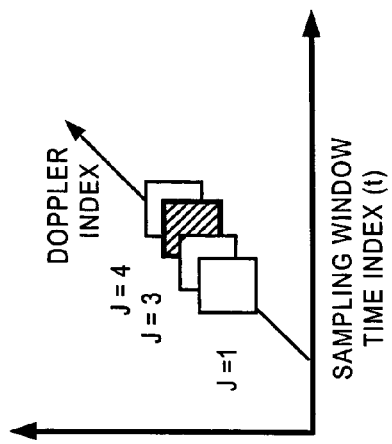
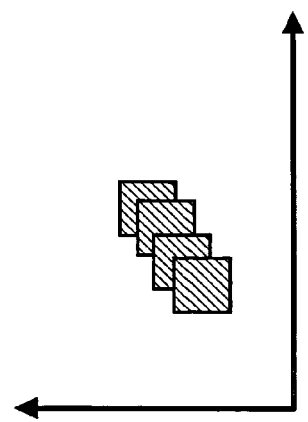
Fig. 22B

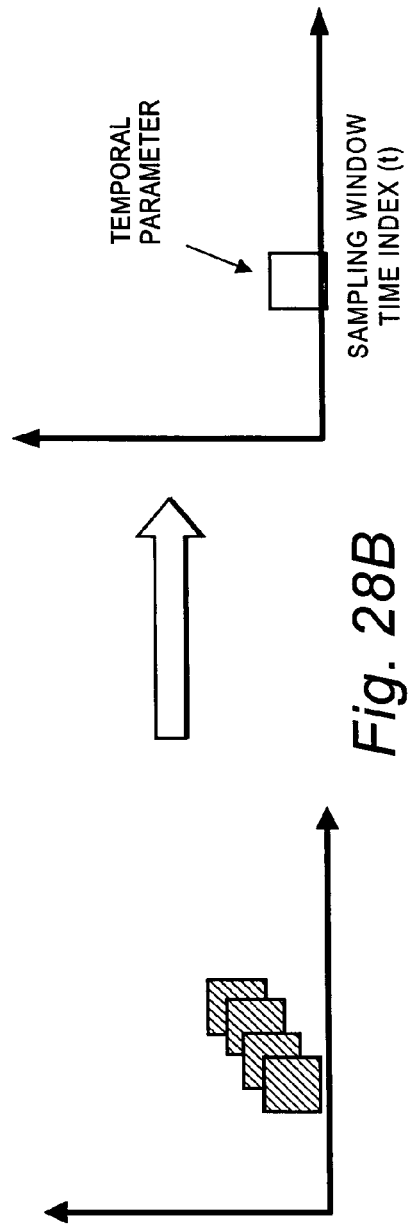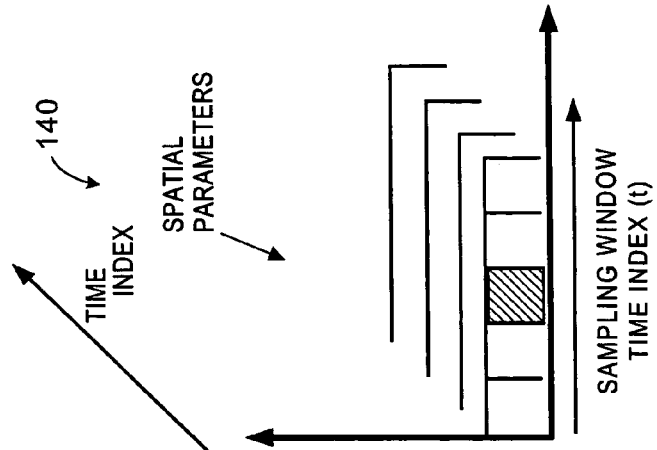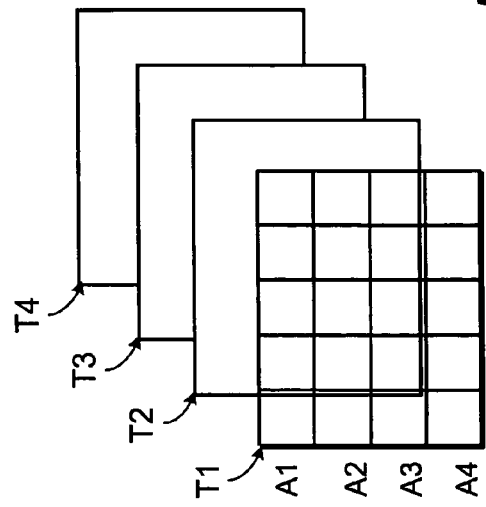
Fig. 28A
Fig. 28B

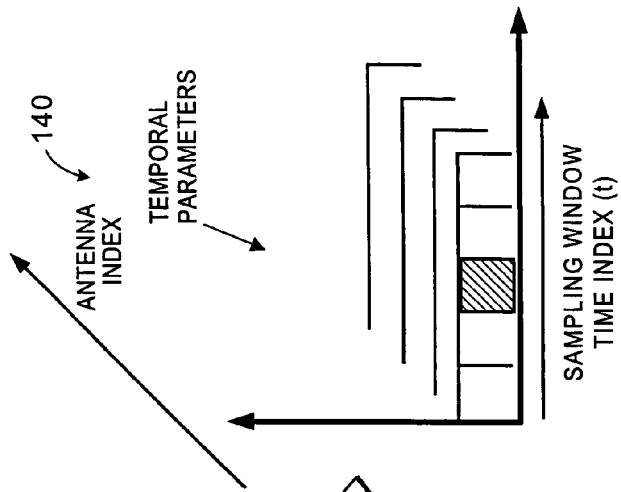
Fig. 30A
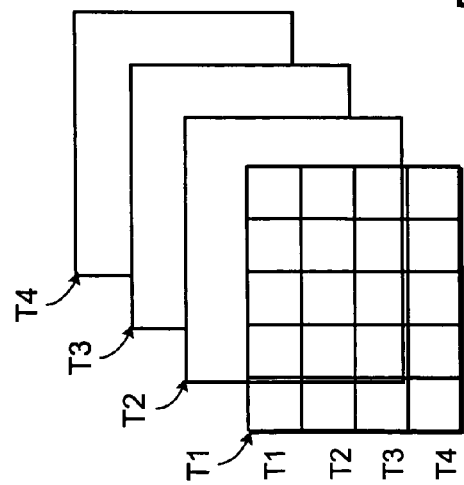
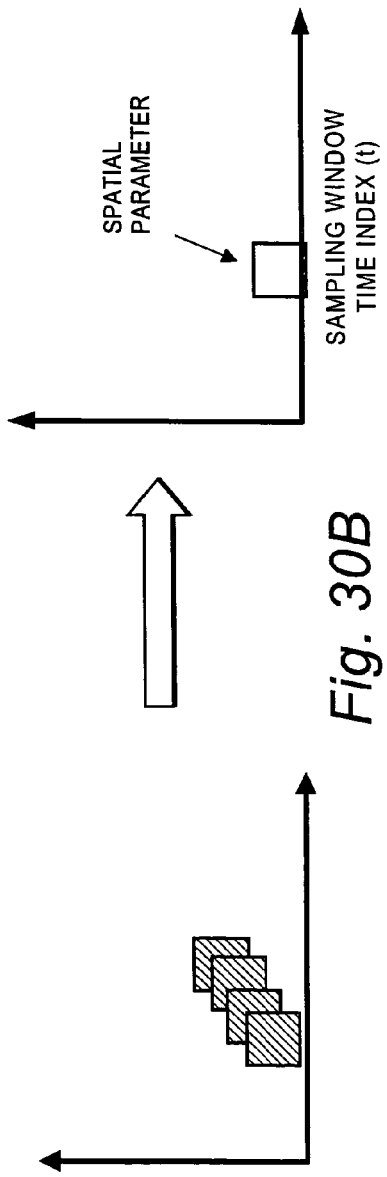
Fig. 30B

MULTI-DIMENSIONAL JOINT SEARCHER AND CHANNEL ESTIMATORS

This application is related to the following U.S. patent applications, all simultaneously filed herewith: U.S. patent application Ser. No. 10/717,203, entitled "Spatial Joint Searcher And Channel Estimators"; U.S. patent application Ser. No. 10/717,205, entitled "Temporal Joint Searcher And Channel Estimators", U.S. patent application Ser. No. 10/717,212, entitled "Spatio-Temporal Joint Searcher And Channel Estimators", all of which are incorporated by reference herein.

BACKGROUND

1. Field of the Invention

The present invention pertains to wireless telecommunications, and particularly to apparatus and method for determining a channel estimate for use in reconstructing data symbols transmitted over a channel.

2. Related Art and other Considerations

A wireless telecommunications unit typically includes both a transmitter and receiver for communicating with other wireless telecommunications units over a communication link. For wireless communications, the communication link is typically over an air interface (e.g., radio frequency interface). As used herein, a "wireless telecommunications unit" with its "wireless telecommunications receiver" can be included in a network node (e.g., a radio access network node such as a base station node, also called Node-B) or a terminal. Such "terminals" include mobile terminals such as user equipment units (UEs), which have also been called mobile stations, and include by way of example mobile telephones ("cellular" telephones), laptops with mobile termination. Thus, terminals can be, for example, portable, pocket, hand-held, computer-included, or car-mounted mobile devices which communicate voice and/or data with radio access network. Alternatively, the terminals can be fixed wireless devices, e.g., fixed cellular devices/terminals which are part of a wireless local loop or the like.

As shown simply in FIG. 32, a wireless telecommunications system includes a transmitting antenna 2300T and a receiving antenna 2300R. Channel 2302 describes the relation between the transmitting antenna 2300T and the receiving antenna 2300R, including the wireless interface. A signal, typically modulated into pulses, is transmitted over channel 2302 from transmitting antenna 2300T to receiving antenna 2300R. The signal can comprise a "symbol" or a string of series of symbols, depicted as "m" in FIG. 32. The signal can carry user data and/or certain control data (e.g., a pilot bit or pilot sequence). The signal m as transmitted by the transmitting antenna 2300T is convoluted with a channel impulse response h of the channel, so that the received signal at the receiving antenna 2300R is m*h (e.g., m convoluted with h). The received signal m*h is applied to base band processing functionality 2304 of the receiver where the received signal undergoes radio frequency processing. The data portions of the received signal are applied to a detector 2306, which may be, for example, a demodulator such as a RAKE receiver.

Most modern detectors attempt to recover a symbol estimate $\hat{m}$ from the received signal m*h. To do so, most sophisticated detectors expect to receive a "channel estimate" for use in modeling the channel over which the signal was transmitted. The accuracy of this channel estimate influences the accuracy and performance of the detector in estimating the actual symbol received over the channel.

The modeling of the channel (which is necessary for most detectors) is facilitated by the control data, often in the form of a pilot bit or pilot sequence, which is transmitted by the transmitter. The control data, hereinafter referenced as "pilot data" for simplicity, is of a known or recognizable format or pattern. The pilot data is typically transmitted periodically by the transmitter source, and thus receipt of repetitions of the pilot data can be expected at the receiver at successive intervals. In view of factors such as relative motion of the transmitter and receiver, the successive intervals are not necessarily constant. The pilot data can be transmitted simultaneously with, or otherwise interspersed with, the user data.

In order to utilize the pilot data, wireless receivers typically include both a searcher and a channel estimator, such as searcher 2308 and channel estimator 2310 shown in FIG. 32. For control data, the received signal m*h is applied to the searcher 2308, which determines a time of arrival (TOA). The time of arrival is then applied to the channel estimator 2310, which uses the time of arrival to determine the channel estimate $\hat{h}$ and then provides the channel estimate $\hat{h}$ to the detector 2306. Using the channel estimate $\hat{h}$, the detector develops its estimate of the symbol, e.g., $\hat{m}$.

The receiver may receive the an original signal (e.g., short pulse signal) from the transmitter source through open space over a single, direct propagation path. Alternatively, in another environment having obstacles or other surfaces, the receiver may receive the same original signal over multiple propagation paths. In the multiple path case, the received signal appears at the receiver as a stream of pulses, each pulse having a different time delay in view of the corresponding propagation multipath over which the signal travelled, as well as possibly different amplitude and phase.

Multipaths are created in a mobile radio channel by reflection of the signal from obstacles in the environment such as buildings, trees, cars, people, etc. Moreover, the mobile radio channel is dynamic in the sense that it is time varying because of relative motion affecting structures that create the multipaths, or due to movement of structures and objects in the surroundings (even if the transmitter and receiver are fixed). For a signal transmitted over a time varying multipath channel, the received corresponding multiple paths vary in time, location, attenuation, and phase.

Some wireless telecommunications receivers capitalize upon the existence of the multipaths in order to achieve various advantages. Such receivers typically operate on the baseband signal to search for and identify the strongest multipaths along with their corresponding time delays. The receiver has a filter which operates on a power delay profile of the signal. The power delay profile can be conceptualized as a time-averaged refinement or other derivation of the channel impulse response. The searcher attempts to locate peaks in the power delay profile, each peak corresponding to arrival of a wavefront of the signal from a respective multipath. In many searchers the peaks also correspond to a channel tap of the filter.

A channel estimate $\hat{h}$ as applied to the detector therefore comprises a set of both time of arrivals (TOA) and complex channel coefficients, each pair of TOA and channel coefficients being associated with one of the arriving wavefronts. In other words, each arriving wavefront has a pair of members in the set, e.g., a TOA and a channel coefficient. The channel coefficients thus actually form a channel impulse response vector, so that the terms "channel coefficient" and "channel coefficients" as used hereinafter should be understood to refer to a channel impulse response vector. If there is only one wavefront, there is only one TOA and one channel coefficient in the set (one channel coefficient in the channel impulse response vector). But for plural arriving wavefronts, there are a corresponding plurality of TOAs and channel coefficients. Ideally, the channel estimate ĥ should provide as good an estimate of the channel impulse response as possible, thereby increasing performance of the detector as the detector makes its estimate m̂ of the transmitted symbol m.

The channel estimate is then supplied to the detector, such as RAKE type of demodulators. A RAKE demodulator typically allocates a number of parallel demodulators (called RAKE fingers) to the strongest multipath components of the received multipath signal as determined by the multipath search processor. In a wideband code division multiple access (WCDMA) radio access network, the outputs of each of the RAKE fingers are diversity-combined after corresponding delay compensation to generate a "best" demodulated signal that considerably improves the quality and reliability of the radio communications system.

Conventionally, wireless telecommunications receivers first use their searchers to ascertain time of arrival of a wavefront. Subsequently, after the time of arrival has been determined by the searcher, the channel estimator utilizes the time of arrival to calculate a channel coefficient, which expresses both amplitude and phase of the signal.

Some wireless telecommunications units have more than one antenna for receiving a same signal. In the prior art, the searcher attempts to locate peaks in the power delay profile for each antenna separately. In other words, for each antenna the searcher works more or less independently. See, for example, U.S. Patent Publication US 2002/0048306, which is incorporated herein by reference. As such, the prior art searchers are essentially one dimensional.

As indicated above, the performance of a wireless receiver is considerably dependent upon the accuracy of the peak determination, i.e., time of arrival determination, performed by the searcher. The better the peak determination of the searcher, the better will be the overall performance of the receiver (e.g., less error rate). But in many instances it may be difficult for a searcher to find an actual peak in a power delay profile. As mentioned previously, in many searcher algorithms the peak corresponds to a channel tap. With such difficulty there is considerable risk of incorrectly choosing a peak. Moreover, it can then be difficult to estimate the actual channel tap value. Channels with low signal to noise ratios (SINRS) are particularly susceptible to these difficulties.

What is needed, therefore, and an object of the present invention, is provision of apparatus and method for providing an improved channel estimate for a wireless telecommunications receiver.

BRIEF SUMMARY

A wireless communication receiver comprises an antenna structure and a joint searcher and channel estimator. The antenna structure acquires dimensionally differentiated signals which are concurrently utilized by the joint searcher and channel estimator for determining both a time of arrival and channel coefficient. The wireless communication receiver can be either a mobile terminal or a network node (e.g., a radio access network node such as a base station node, also called Node-B).

In some embodiments, the antenna structure comprises an array of plural antennas. The signals acquired by different antennas of the array are dimensionally differentiated with regard to a spatial dimension. As such, the joint searcher and channel estimator of these embodiments are "spatial" joint searcher and channel estimators. The time of arrival and the channel coefficient are essentially concurrently determined by the joint searcher and channel estimator. The time channel coefficient is a composite channel coefficient which takes into consideration channel impulse responses for channels associated with each of the plural antennas in the antenna array.

In other embodiments, the antenna structure comprises an antenna which provides signals for each of successive sets of pilot data received by the antenna as the dimensionally differentiated signals. The signals acquired by the antenna are dimensionally differentiated with regard to a temporal dimension. As such, the joint searcher and channel estimator of this embodiment is a "temporal" joint searcher and channel estimator.

In one of its aspects, the joint searcher and channel estimator comprises an antenna signal matrix; a matrix analyzer; and a channel estimate generator. Complex values indicative of the dimensionally differentiated signal received in a sampling window are stored in the antenna signal matrix as a function of a sampling window time index and a dimensional differentiation index. In differing embodiments, the matrix analyzer can employ non-parametric or parametric techniques.

In non-parametric embodiments, the matrix analyzer can take the form a correlator which performs to produce a vector or matrix. The correlator locates value(s) in the antenna signal matrix for use in determining the time of arrival and the channel coefficient. Specifically, the correlator locates "tones" in the antenna signal matrix corresponding to arriving wavefronts. The channel estimate generator uses the value(s) located by the correlator to generate the time of arrival and the channel coefficient.

In locating values in the antenna signal matrix corresponding to an arriving wavefront, the correlator considers a dimensional reception vector formed from the antenna signal matrix with respect to a sampling window time index. The dimensional receptivity vector has a frequency related to a difference between phase components of complex values of the dimensional receptivity vector, there being plural possible frequencies for the dimensional receptivity, the plural possible frequencies being represented by a frequency index. In the spatial embodiments, the plural possible frequencies correspond to plural possible directions of arrival (DOA) of a wavefront. In the temporal embodiments, the plural possible frequencies correspond to plural possible frequency shifts for an arriving wavefront. The frequency shifts are primarily attributable to doppler shifts, but can also include frequency shifts in the transmitter and receiver oscillators. For simplification, such frequency shifts are hereinafter referred to as "doppler shifts" or "doppler frequency shifts".

In one example non-parametric type correlator implementation for a joint searcher and channel estimator, for each combination of plural possible frequencies and plural time indexes the correlator calculates a Fast Fourier Transform according to the expression $Y(n,t)=FFT(n,X(:,t))$. In this expression, t is the sampling window time index; $X(:,t)$ is the complex antenna matrix, with : representing all dimensional differentiation indexes for one sampling window time index; and n is the frequency index. For a CDMA wireless communication system, the correlator calculates the expression $Y(n,t)=\Sigma C_j^* FFT(n,X(:,t))$, $j=1,K$, wherein $C_j$ is a coding sequence symbol value j, and K is a length of the coding sequence. In spatial embodiments, the dimensional differentiation indexes are the antenna indexes, and each of the plural possible frequencies for the dimensional receptivity vector represents a different possible direction of arrival of the arriving wavefront. In temporal embodiments, the dimensional differentiation indexes are pilot set indexes, and each of the plural possible frequencies for the dimensional receptivity vector represents a different possible doppler shift values for an arriving wavefront.

The non-parametric type correlator output comprises $Y(n,t)$. The analyzer determines a maximum absolute value $|Y(n,t)|_{max}$. The analyzer uses a sampling window time index t_max at which $|Y(n,t)|_{max}$ occurs as the time of arrival of the arriving wavefront. In the spatial embodiments, the analyzer uses the a frequency index n_max at which $|Y(n,t)|_{max}$ occurs as the direction of arrival of the arriving wavefront and obtains an amplitude for the arriving wavefront by dividing $|Y(n,t)|_{max}$ by a number of antennas comprising the antenna array. In the spatial embodiments, the direction of arrival is used to derive the channel coefficient. In the temporal embodiments, the analyzer uses the a frequency index n_max at which $|Y(n,t)|_{max}$ occurs as the doppler shift for the arriving wavefront and obtains an amplitude for the arriving wavefront by dividing $|Y(n,t)|_{max}$ by a number of sets of pilot data in the series. In the temporal embodiments, the doppler shift is used to derive the channel coefficient.

In parametric embodiments, the matrix analyzer can take the form of a estimator which estimates a parameter in the signal, and thereby generates a parameter output estimation value (e.g., a parametic estimation output vector). The parametic estimation output vector typically includes spatial frequency, spatial amplitude, temporal frequency and temporal amplitude or spatio-temporal frequency and spatio-temporal amplitude. The parametic estimation output vector could include other parameters. The parametric matrix analyzer generates the parametric estimation output vector. The channel estimate generator uses the parametric estimate output vector to generate the time of arrival and the channel coefficient. The channel estimate generator uses amplitude and frequency values of elements of the parametric estimation output vector to determine the time of arrival and channel coefficient of an arriving wavefront.

For the spatial embodiments, the parametric estimation output vector generated by the parametric estimator has a sampling window time index and a spatial parameter value for each time index. The spatial parameter includes spatial frequency and spatial amplitude. For an element of the parametric estimation output vector having a sufficiently high absolute value, i.e. the spatial amplitude, the channel estimate generator uses a sampling window time index for an element of the parametric estimation output vector having a sufficiently high spatial amplitude value to determine the time of arrival of the arriving wavefront. The direction of arrival of the arriving wavefront is enhanced from the spatial frequency parameter value of the identified time of arrival.

For the temporal embodiments, the parametric estimation output vector generated by the parametric estimator has a sampling window time index and a temporal parameter value for each time index. The temporal parameters includes temporal frequency and temporal amplitude. For an element of the parametric estimation output vector having a sufficiently high absolute value, the channel estimate generator uses a sampling window time index for an element of the parametric estimation output vector having a sufficiently high absolute value, i.e. the temporal amplitude, to determine the time of arrival of the arriving wavefront. The doppler shift of the arriving wavefront is the temporal frequency parameter value of the identified time of arrival.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8A, FIG. 8B, FIG. 8C(1), FIG. 8C(2), and FIG. 8C(3) and are diagrammatic views depicting results of a comparative operational evaluation contrasting performance of a spatial joint searcher and channel estimator with a conventional searcher.

FIG. 15 is a flowcharting showing representative basic steps performed by a matrix analyzer and channel estimate generator of an example embodiment of a temporal joint searcher and channel estimator, with the matrix analyzer using a non-parametric analysis technique.

FIG. 17 is a flowcharting showing representative basic steps performed by a matrix analyzer and channel estimate generator of an example embodiment of a temporal joint searcher and channel estimator, with the matrix analyzer using a parametric analysis technique.

FIG. 22A and FIG. 22B are diagrammatic views depicting operation of a first alternative implementation of a non-parametric, sequential spatio-temporal joint searcher and channel estimator.

FIG. 23 describes the procedure of non-parmetric approach for spatio-temporal sequenced method where the spatial processing is followed by the temporal processing.

FIG. 28A and FIG. 28B are diagrammatic views depicting operation of a first alternative implementation of a parametric, sequential spatio-temporal joint searcher and channel estimator.

FIG. 30A and FIG. 30B are diagrammatic views depicting operation of a second alternative implementation of a parametric, sequential spatio-temporal joint searcher and channel estimator.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures.

Figure 1:
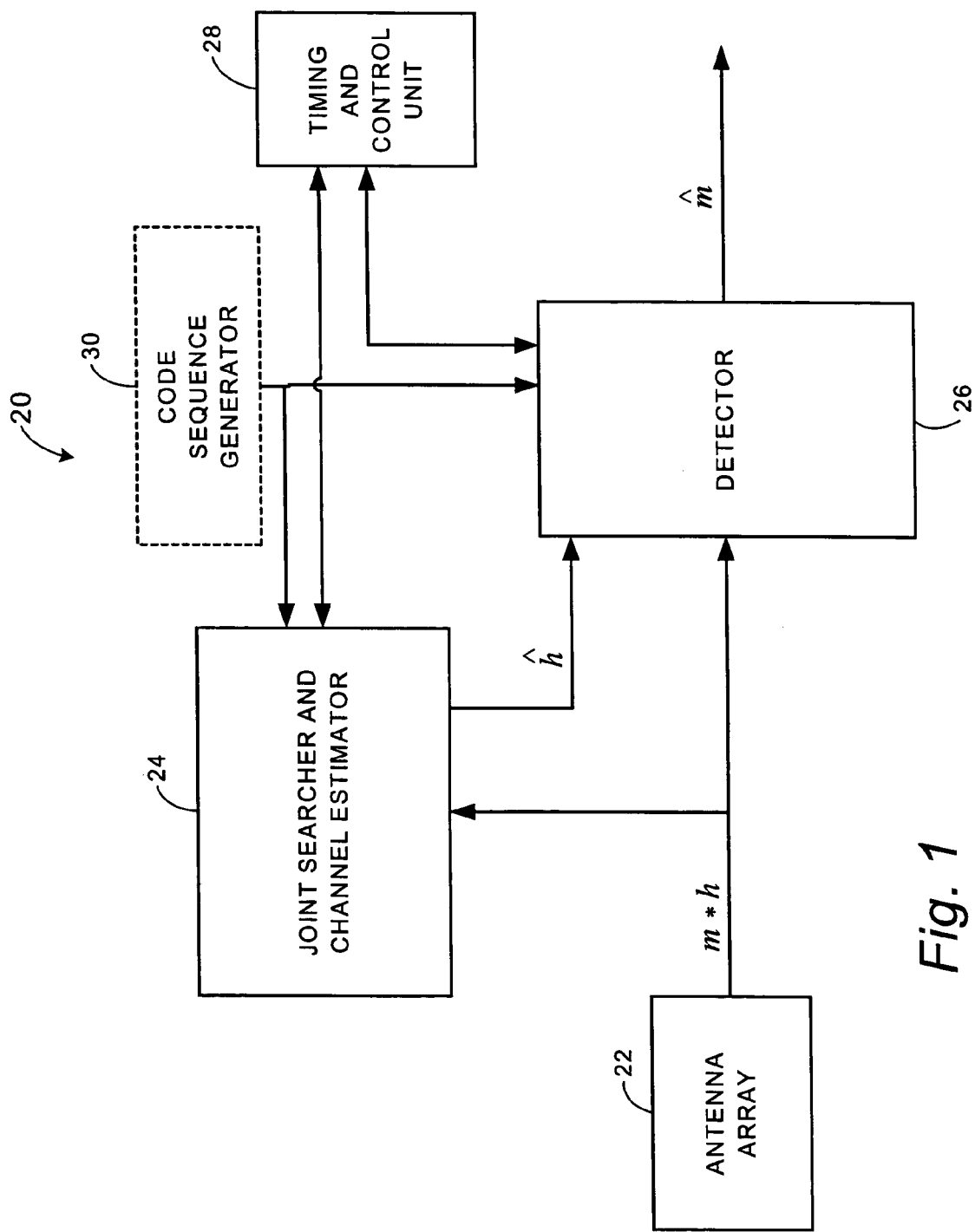
FIG. 1 is a schematic view of an example, generic wireless telecommunications receiver which includes a joint searcher and channel estimator.

FIG. 1 shows an example, generic wireless telecommunications receiver 20 which, as mentioned before, can be included in a network node or a terminal, e.g. mobile terminal. The wireless telecommunications receiver 20 includes an antenna structure or array 22; a joint searcher and channel estimator 24; a detector 26; and, a timing and control unit 28. Optionally, as depicted by broken line, the receiver 20 may include a code sequence generator 30.

As broadly employed herein, the antenna array 22 can comprise one or more antenna elements. Signal(s) from the antenna array 22 are applied both to joint searcher and channel estimator 24 and detector 26. The signal(s) from the antenna array 22 comprise a channel impulse response vector if the antenna array 22 comprises more than one antenna element.

In the likely event that the signal(s) have been encoded by, e.g., a spreading code or the like, both joint searcher and channel estimator 24 and detector 26 are connected to operate in conjunction with code sequence generator 30. The timing and control unit 28 generates timing (e.g., synchronization) and control signals which are provided to detector 26 and to joint searcher and channel estimator 24.

It will be appreciated that the receiver may include, e.g., downstream from the antenna array, certain radio frequency processing functionality and radio frequency demodulating functionality, so that the signals applied to joint searcher and channel estimator 24 and detector 26 are baseband signals. The illustrated structure of wireless telecommunications receiver 20 of FIG. 1 thus essentially concerns processing of the baseband signal(s).

Various non-limiting, representative examples of differing embodiments of joint searcher and channel estimators are described below. Ensuing descriptions of operation of wireless telecommunications receivers with these differing embodiments are premised on certain assumptions. Some of these assumptions are related to a channel model which conceptualizes electromagnetic fields as arriving in a discrete number of wavefronts at the wireless telecommunications receiver, and particularly arriving at one or more antenna elements which may be employed in the antenna array 22.

As used herein, a "sampling window" comprises consecutive time slots (or, in a CDMA system, for example, "chips") obtained from a given antenna and analyzed by a joint searcher and channel estimator. As described in more detail hereinafter, embodiments of joint searcher and channel estimators operate upon an antenna signal matrix formed from plural sampling windows. In some embodiments, hereinafter referenced as "spatial" joint searcher and channel estimators, the antenna signal matrix is formed from sampling windows obtained from plural antennas. In other embodiments, hereinafter referenced as "temporal" joint searcher and channel estimators, the antenna signal matrix is formed with respect to a single antenna, but formed from sampling windows obtained by that antenna for successive sets of pilot data (occurring over time). In yet other embodiments, hereinafter referenced as spatio-temporal joint searcher and channel estimators, the antenna signal matrix is formed both spatially and temporally.

For purposes of the technology described herein, the antenna array 22 is conceptualized as acquiring "dimensionally differentiated" signals. The joint searcher and channel estimator essentially concurrently uses the dimensionally differentiated signals provided by the antenna array for determining, for each arriving wavefront, both a time of arrival (TOA) and a channel coefficient. For the spatial joint searcher and channel estimator, wherein the antenna structure comprises an array of plural antennas having spaced apart or spatially separated antenna elements, the signals acquired by different antennas of the array are dimensionally differentiated with regard to a spatial dimension. For the temporal joint searcher and channel estimator, wherein the antenna structure comprises an antenna which provides signals for each of successive sets of pilot data received at separated time intervals, the signals acquired by the antenna are dimensionally differentiated with regard to a temporal or time dimension. For the spatio-temporal joint searcher and channel estimator, having both the antenna structure comprising an array of plural antennas and one or more antennas receiving the successive sets of pilot data, the signals acquired by the antenna are dimensionally differentiated with regard both to a spatial dimension and a temporal or time dimension.

The joint searcher and channel estimators are, in some instances, said to perform a "concurrent" determination of time of arrival and some other quantity, e.g., direction of arrival or doppler shift frequency. In this sense "concurrent" means that the quantities or determinations could be derived in parallel from a result of an outcome-determinative operation, e.g. a non-parametric technique such as a Fast Fourier Transform or a parametric technique.

Spatial Joint Searchers/Estimators

In some embodiments, the joint searcher and channel estimator contemporaneously processes the signals from plural antennas over a sampling window in order to determine both time of arrival and the channel coefficient. In these embodiments the joint searcher and channel estimator is essentially a two dimensional unit, with a second dimension being a spatial dimension imparted by the spacing of the plural antennas of the array. This spatial dimension, which involves essentially simultaneous and concurrent processing of signals from the plural antennas for the array in order to determine the time of arrival and channel coefficient, bestows on these embodiments of the joint searcher and channel estimator the distinction of being a "spatial" joint searcher and channel estimator.

Figure 2A:
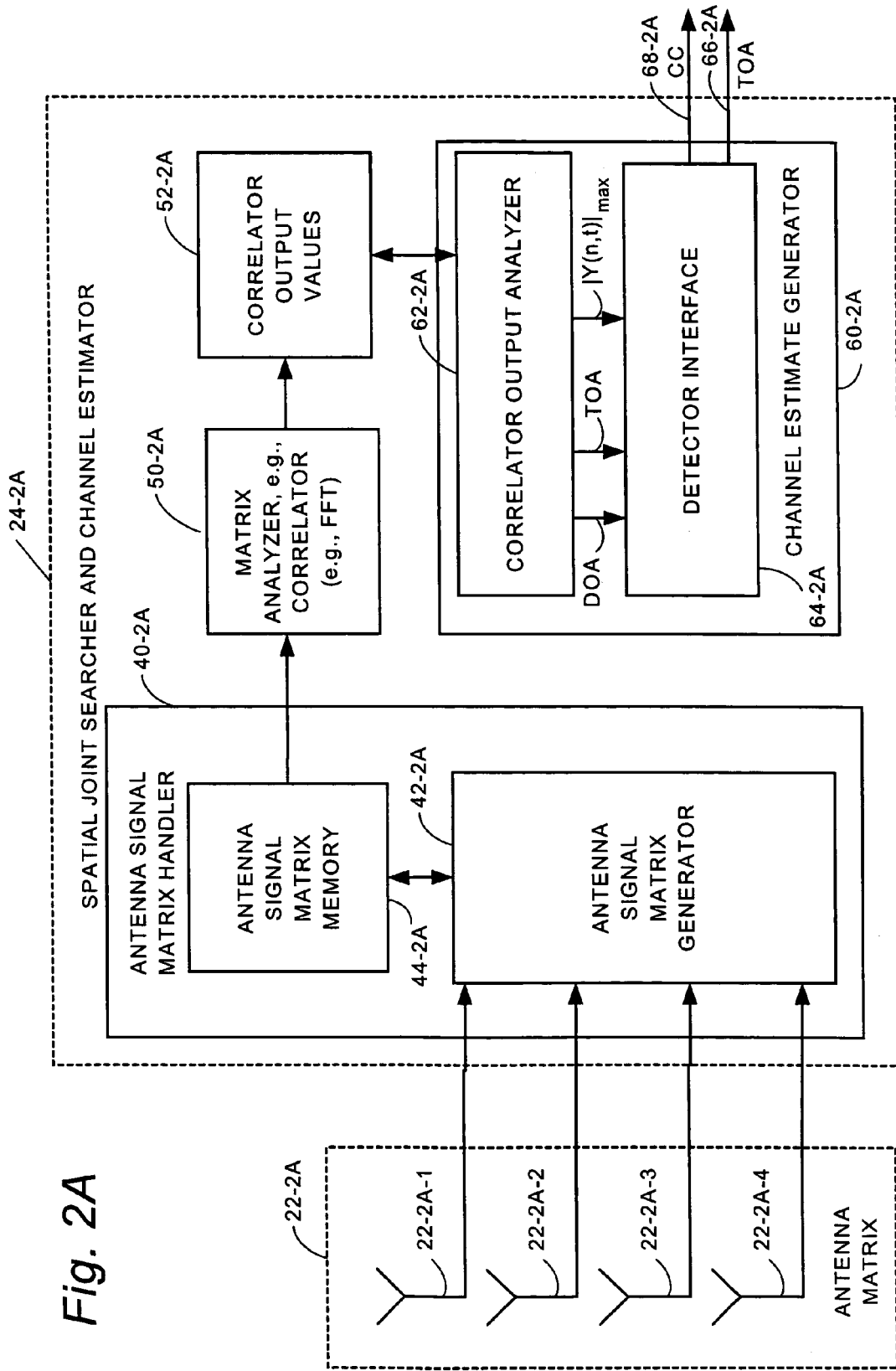
FIG. 2A and FIG. 2B are schematic views of differing example embodiments of spatial joint searcher and channel estimators, each shown with an antenna array.

The spatial joint searcher and channel estimator may take differing embodiments and have differing implementations. In one example, illustrative embodiment the joint searcher and channel estimator includes a non-parametric type correlator (e.g., a correlator which performs a Fast Fourier Transform (FFT) calculation). In another example, illustrative embodiment the joint searcher and channel estimator utilizes a parametric approach FIG. 2A illustrates one example embodiment of a spatial joint searcher and channel estimator 24-2A which uses a non-parametric technique for determining time of arrival and channel estimate, as well as an associated example antenna array 22-2A. The antenna array 22-2A includes, by way of non-limiting example, four antenna elements 22-2A-1 through 22-2A-4. While the antenna elements 22-2A-1 through 22-2A-4 are shown as forming a uniform linear array (ULA), it should be understood that antenna configurations other than a uniform linear are possible, and that the number of antenna elements in the antenna array may vary (e.g., the number of antenna elements is not limited to four).

There are coherency requirements for the antenna elements of antenna array 22-2A, and for antenna elements for all other plural antenna arrays described herein. The coherency requirement can be fulfilled by the plural antenna elements being synchronized. Alternatively, even if the plural antenna elements are not synchronized, but their phase differences are known, the coherency requirement can be fulfilled by compensating for the known phase difference.

The complex baseband signals obtained from the antenna elements are each applied to joint searcher and channel estimator 24-2A, as well as to a detector (not illustrated in FIG. 2A). The joint searcher and channel estimator 24-2A comprises an antenna signal matrix handling unit 40-2A. In one particular example manifestation, antenna signal matrix handling unit 40-2A includes antenna signal matrix generator 42-2A and antenna signal matrix memory 44-2A. A matrix analyzer, which for the non-parametric technique of FIG. 2A can be a correlator 50-2A, operates on complex values stored in antenna signal matrix memory 44-2A. The correlator 50-2A preferably comprises a filter. The correlator 50-2A generates certain output values, which may be stored, e.g., in correlator output value memory 52-2A. The joint searcher and channel estimator 24-2A further comprises a channel estimate (CE) generator 60-2A. In the illustrated example embodiment, the channel estimate (CE) generator 60-2A comprises a correlator output analyzer 62-2A and a detector interface 64-2A. The detector interface 64-2A generates, for each wavefront, both a time of arrival (TOA) and a channel coefficient (CC). In FIG. 2A, the time of arrival and channel coefficient output by detector interface 64 are applied to the detector on lines 66-2A and 68-2A, respectively.

Figure 3:
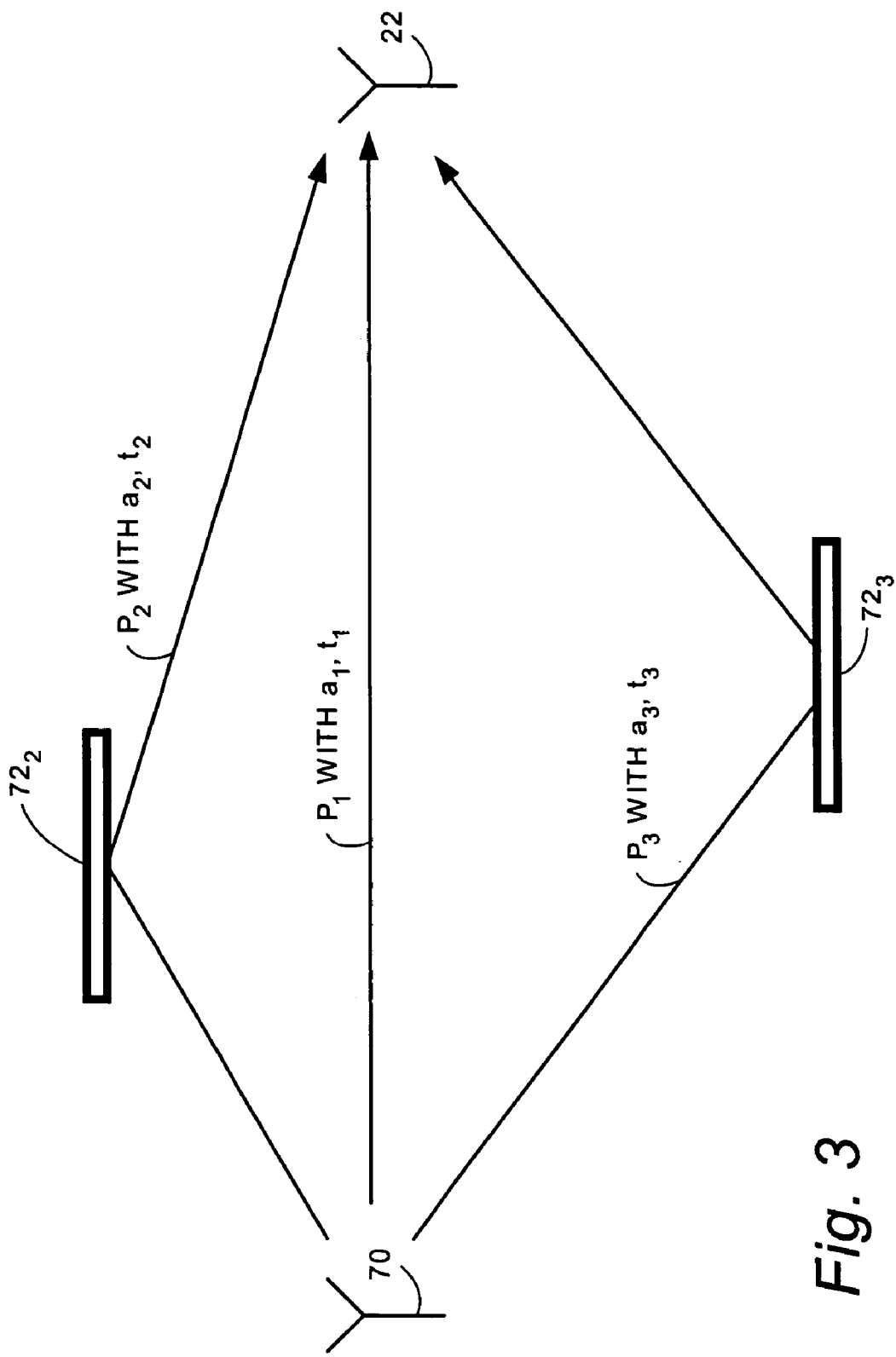
FIG. 3 is a diagrammatic view illustrating a signal emanating from a transmitting antenna along three separate multipaths to an antenna array of a wireless telecommunications receiver.

In FIG. 2A, and other embodiments described herein, the transmitted electromagnetic signal is assumed to arrive at the receiver in a number of discrete electromagnetic wavefronts. A number of discrete electromagnetic wavefronts is presumed in order to accommodate the multipath phenomena discussed above. For example, FIG. 3 illustrates a signal emanating from a transmitting antenna 70 along three separate multipaths $P_1$, $P_2$, and $P_3$ to antenna array 22. Each multipath has its individual amplitude, and accordingly has an associated complex number "a" of the baseband signal and a time delay τ. For example, multipath $P_1$ has associated complex number $a_1$ and associated time delay $τ_1$; multipath $P_2$ has associated complex number $a_2$ and associated time delay $τ_2$; and so forth. As illustrated in FIG. 3, multipath $P_1$ is a relatively direct path between transmitting antenna 70 and antenna array 22; while multipath $P_2$ and multipath $P_3$ are reflected off obstacles $72_2$ and $72_3$, respectively. Thus, the time delay $τ_1$ for multipath $P_1$ is shorter than the time delay $τ_2$ for multipath $P_2$, which in turn is shorter than the time delay $τ_3$ for multipath $P_3$. Similarly, barring other phenomena, it would be expected that the complex number $a_1$ for multipath $P_1$ is greater than the complex number $a_2$ for multipath $P_2$, and so forth.

Figure 4:
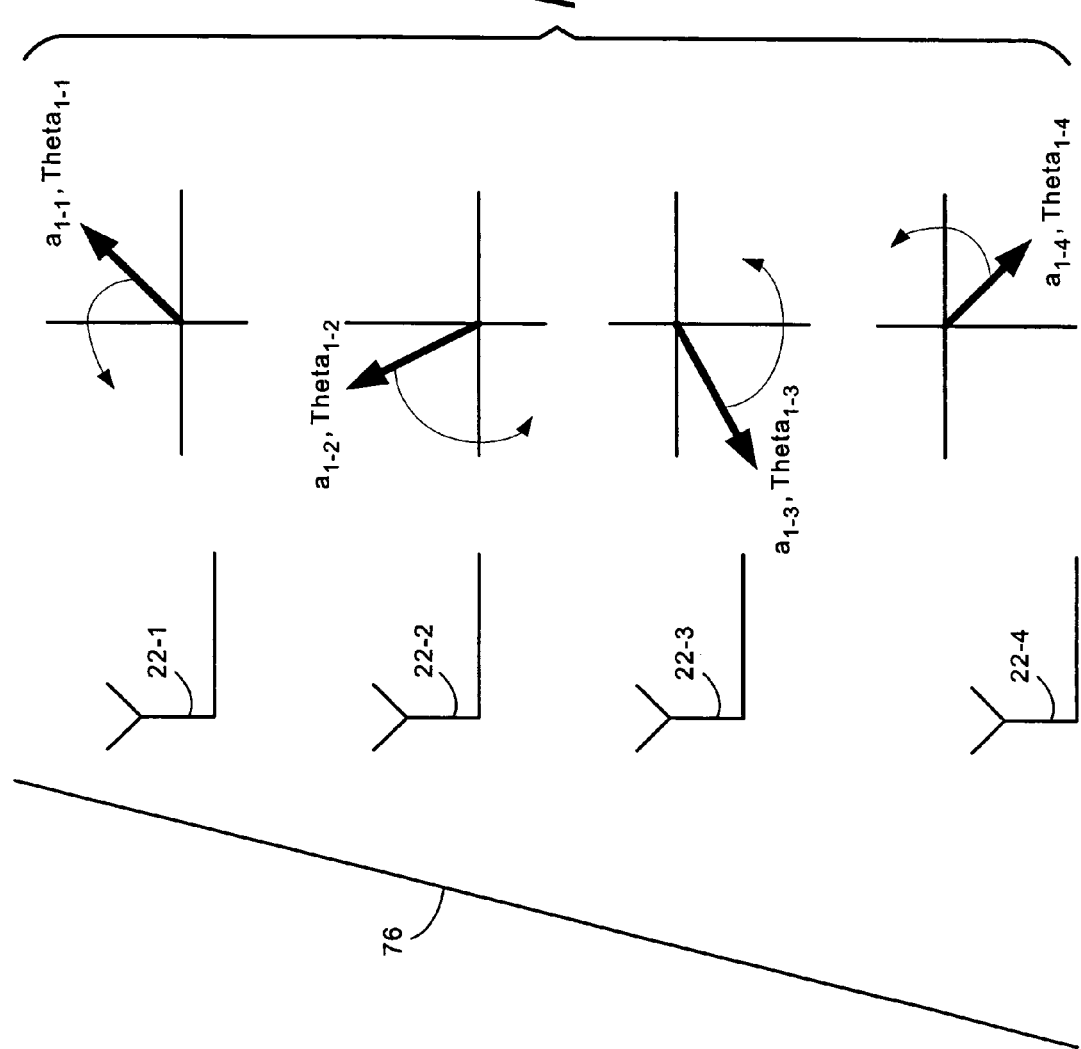
FIG. 4 is a diagrammatic view of a wavefront travelling toward an antenna array.

For sake of discussion, the electromagnetic wavefronts are assumed to be plane ("planar") electromagnetic wave fronts, such as the single wavefront 76 illustrated in FIG. 4 as traveling toward the antenna array. In all embodiments described herein it should be understood that the wavefronts need not be planar wavefronts, but that any other known form of wavefront may be considered in similar manner. Moreover, it should be kept in mind that FIG. 4 represents arrival of only one wavefront, but typically plural wavefronts are incident on an antenna array.

As further shown by FIG. 4, due to incidence of an individual wavefront, the output (e.g., signal) from each antenna element has its version of the complex number for the wavefront. For example, for a wavefront for the first multipath $P_1$ of FIG. 3, the antenna element 22-1 outputs a complex number $a_{1-1}$, antenna element 22-2 outputs a complex number $a_{1-2}$, and so forth. The numbers are complex, and in the particular case that (1) the antenna elements are identical; (2) there is coherency, and (3) the plane wave has constant amplitude within the width of array, the absolute values of the numbers are the same. Furthermore, with respect to the same arriving wavefront, each antenna detects the arriving signal as having a phase. For example, for the wavefront for the first multipath $P_1$ of FIG. 3, the output of antenna element 22-1 has a phase $θ_{1-1}$, the output of antenna element 22-2 has a phase $θ_{1-2}$, and so forth.

Figure 5:
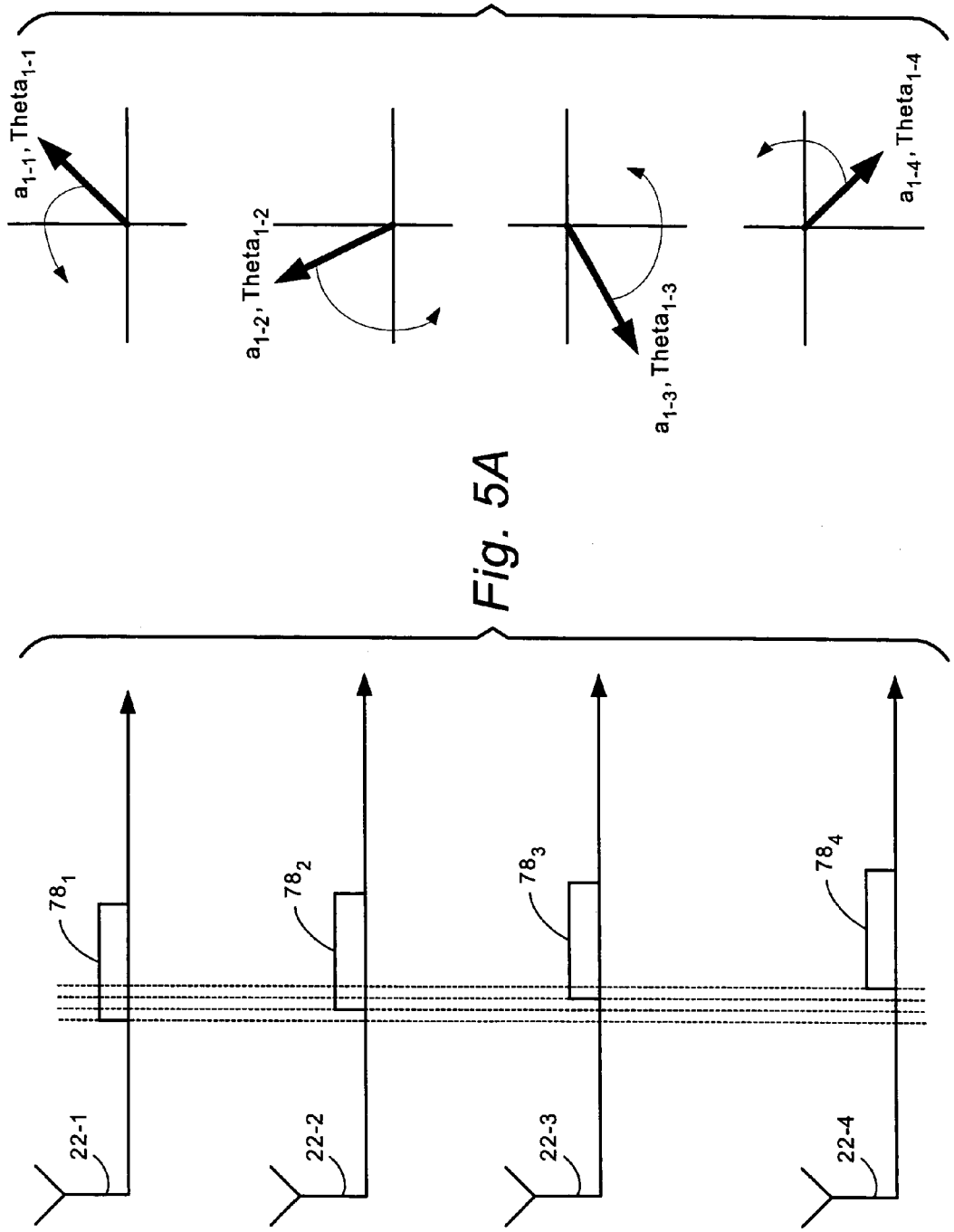
FIG. 5A and FIG. 5B are diagrammatic views depicting signals obtained upon arrival of a wavefront at an antenna array.

Signals obtained upon arrival of a wavefront at a uniform linear array (ULA) antenna array are illustrated both in FIG. 5A and in FIG. 5B. FIG. 5A particularly shows, for each of four antennas 22-1 through 22-4, plane wave propagation over the antenna elements for a fixed time (chip) index, and resulting respective output pulses 78 (e.g., output pulses $78_1$ through $78_4$). For each corresponding antenna, FIG. 5B shows the pulse as a complex number and with the argument, θ, of the complex number. The argument (θ) corresponds to the phase of the received signal. The rate at which the θ values change (e.g., the rate at which the phase rotates) over time is known as the phase rotation speed, or frequency. The phase rotation for the wavefront with this array of antennas is depicted by the increasing angular value of θ through the range of $θ_1$, $θ_2$, $θ_3$, $θ_4$, and thus the frequency is the rate of change of this angular value over time. The phase rotation speed is constant. The speed of the linear phase propagation is dependent on the direction of arrival (DOA) of the incident wavefront.

In the joint searcher and channel estimator 24-2A of FIG. 2A, the antenna matrix handling unit 40-2A samples the complex baseband signals from each antenna element. Using the sampled complex baseband signals, antenna signal matrix generator 42-2A generates an antenna signal matrix such as antenna signal matrix 80 illustrated in FIG. 6. The antenna signal matrix 80 may be stored in any convenient fashion, such as antenna matrix memory 44-2A.

Figure 6:
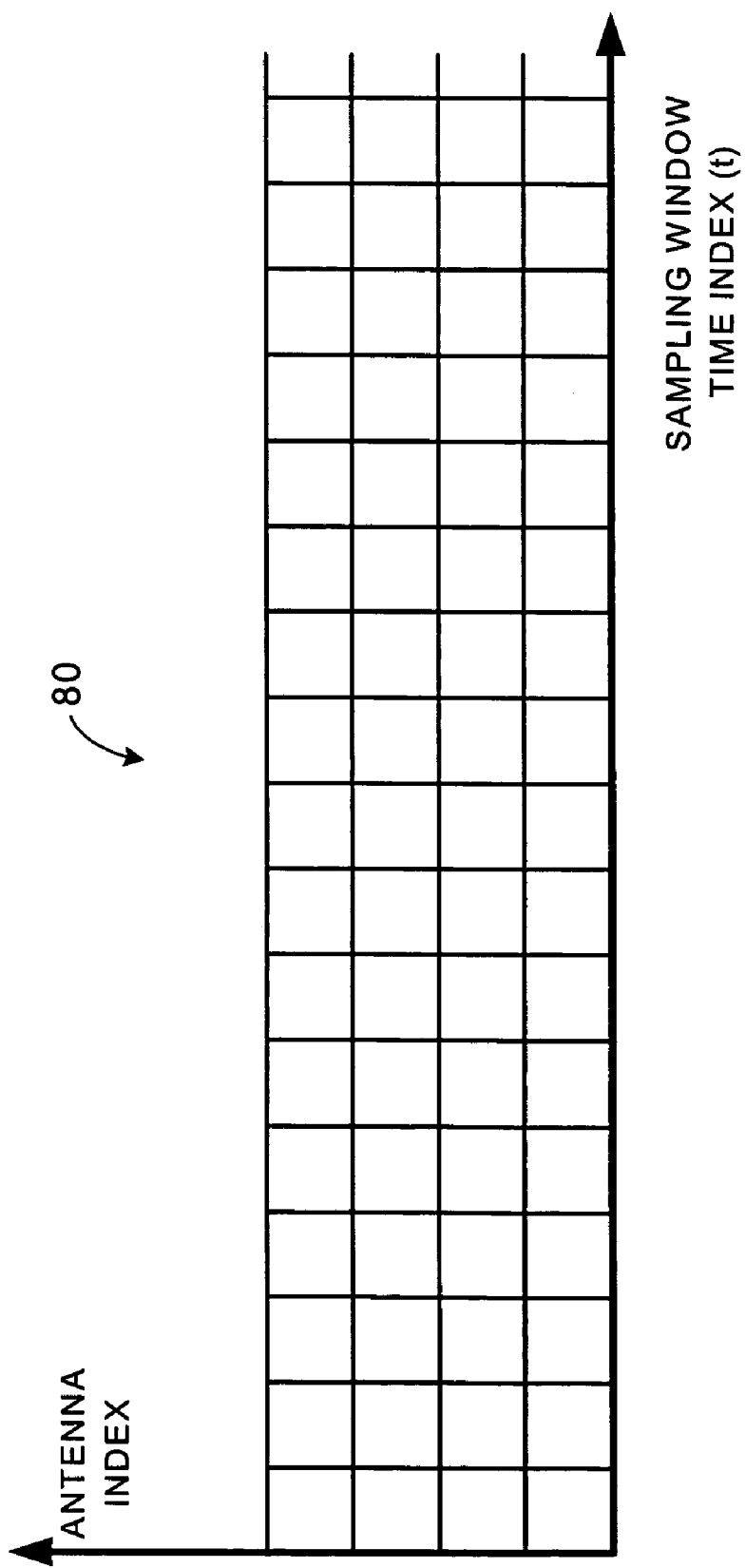
FIG. 6 is a diagrammatic view of an antenna signal matrix.

The antenna signal matrix 80 is a two dimensional functionally dependent matrix. In other words, complex samples are stored in antenna signal matrix 80 as a function of two different indexes. For the antenna signal matrix 80 shown in FIG. 6, a first index is a sampling window time index, illustrated along the X axis of FIG. 6. For embodiments which utilize spreading codes or similar codes, the first index may be, for example, a chip index. Thus, the sampling window time index points to a time in the sampling window relative to a start of the sampling window. In the antenna signal matrix 80 of FIG. 6, a second index, shown along the Y axis, is an antenna index (which serves as a dimensional differentiation index). The antenna index points to a different row of the antenna signal matrix 80, each row being associated with a different antenna element in antenna array 22. FIG. 6 shows four rows in antenna signal matrix 80 for consistency with the previous examples of an antenna array comprising four antenna elements. It is reiterated, however, that the number of antennas in an antenna array, and thus the number of rows in antenna signal matrix 80 and the maximum value of the antenna index, can vary from receiver to receiver, and that the choice of four antenna is only illustrative for sake of example.

The antenna signal matrix 80 is conceptualized as storing "dimensionally differentiated" signals acquired from the antenna array. For the spatial joint searcher and channel estimator, wherein the antenna structure comprises an array of plural antennas having spaced apart or spatially separated antenna elements, the signals acquired by different antennas of the array are dimensionally differentiated with regard to a spatial dimension. That is, for a given column of antenna signal matrix 80, the values in each row are dimensionally differentiated in the sense that they are acquired from different antenna elements which are separated in a spatial dimension in view of the separate physical placement of each antenna element with respect to other antenna elements of the array.

For sake of simplicity, the complex values stored in antenna signal matrix 80, including the complex values obtained from the antennas, are not illustrated in FIG. 6. Such complex values would be illustrated in a third dimension, e.g., out of the plane of FIG. 6. The antenna signal matrix 80 includes both complex white noise and (for the sake of the present illustration) a complex sample for at least one wavefront (planar or other known shape). As stored in antenna signal matrix 80, the wavefronts have known phase (temporal, non-coherent detection), and are modulated code sequences.

In conjunction with the antenna signal matrix 80 of FIG. 6, and particularly a WCDMA case in which spacing of the antenna elements in the antenna array is not too far apart, the plane wavefront arriving at the antenna array can be considered to arrive in the same sampling window time index (or chip index).

The complex values stored for each column of the antenna signal matrix 80 of FIG. 6 can be conceptualized as a dimensional receptivity vector. That is, a dimensional receptivity vector is formed with respect to a single sampling window time instance and with complex values from each of the plural antennas of the antenna array. Each element taken from a unique row of antenna signal matrix 80 has a different phase in the manner of the differing θ values illustrated in FIG. 5. As received by the differing antenna elements, for the spatial joint searcher and channel estimator the change in phase over time is the frequency for the dimensional receptivity vector. If the wave arrives e.g. straight ahead, the angles could be the same. The phase rotation speed, or frequency, of the dimensional receptivity vector, for the sampling window time instance can be interpreted as the direction of arrival (DOA). Thus, each dimensional receptivity vector corresponds to a separate direction of arrival. There are plural possible frequencies for the dimensional receptivity vector, each of the plural possible frequencies corresponding to a different possible direction of arrival (DOA) of a wavefront. For the non-parametric techniques herein employed, the plural possible frequencies can be a continuous range of frequencies. For sake of differentiating the plural possible frequencies, the plural possible frequencies are each represented by a frequency index.

The channel estimate generator 60-2A (see FIG. 2A) seeks to develop a "composite" channel estimate based on the complex values stored in antenna signal matrix 80. At this point it should be appreciated that, since the antenna array 22-2A has plural antenna elements, there are a corresponding plurality of channels through which wavefronts are received, and accordingly there could also be a separate channel impulse response or separate channel estimate for each of the plural channels. But by storing the complex samples in antenna signal matrix 80 in the manner aforedescribed, and by concurrently finding the time of arrival (TOA) and channel coefficients over the entire antenna signal matrix 80, the channel estimate generator 60-2A provides a channel estimate which encompasses all channels for all antenna elements and for this reason is known as a "composite" channel estimate.

The composite channel estimate comprises, as mentioned before, a time of arrival (TOA) and channel coefficient for each arriving wavefront in the sampling window (e.g., a channel coefficient mapped to a time of arrival (TOA)). Therefore, the channel estimate may comprise a set (of one or more) pairs of data, each pair including a time of arrival (TOA) and channel coefficient. The task for correlator 50-2A is thus to locate a value or "tone" in antenna signal matrix 80 that best corresponds to an arriving wavefront, e.g., to locate a value or tone for each arriving wavefront in the sampling window.

The task of locating a value or "tone" in antenna signal matrix 80 that best corresponds to an arriving wavefront can be accomplished by various techniques, including both parametric and non-parametric techniques. A Fast Fourier Transform (FFT) technique as discussed below is just one representative and illustrative example non-parametric type of correlator which can be utilized.

Figure 7:
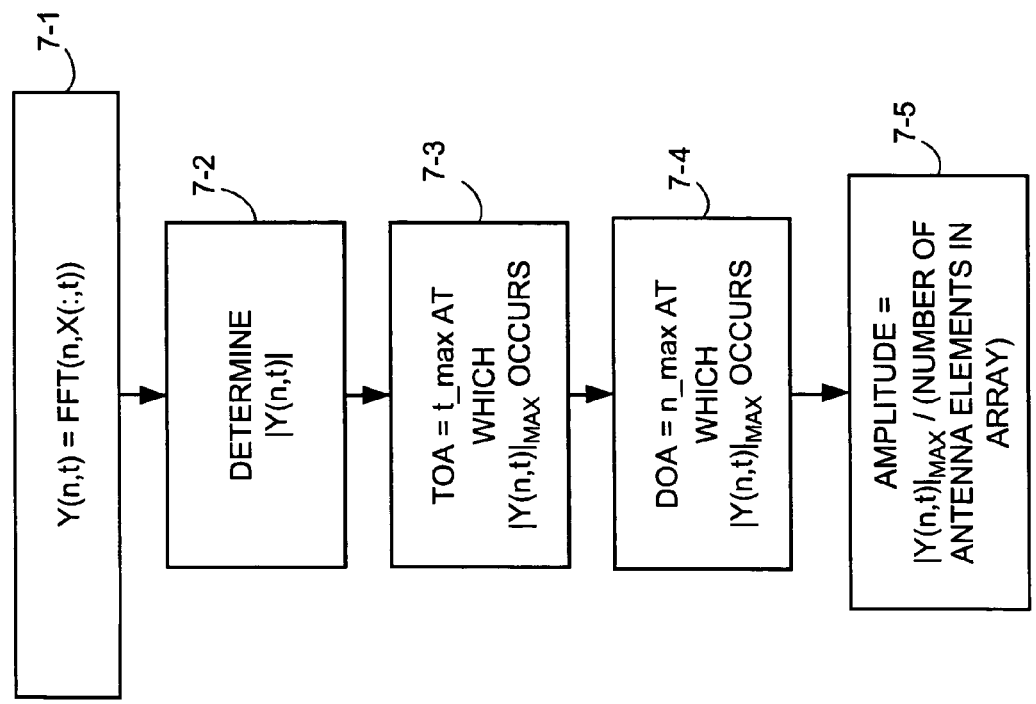
FIG. 7 is a flowcharting showing representative basic steps performed by a matrix analyzer and channel estimate generator of an example embodiment of a spatial joint searcher and channel estimator, with the matrix analyzer using a non-parametric analysis technique.

FIG. 7 depicts example basic steps performed by an example correlator 50-2A and correlator output analyzer 62-2A in conjunction with the Fast Fourier Transform (FFT) calculation. As step 7-1, the correlator 50-2A of FIG. 2A calculates Expression 1.

$$Y(n,t)=FFT(n,X(:,t))$$ Expression 1

In Expression 1, t is the sampling window time index; $X(:,t)$ is the complex antenna matrix (with the colon ":" representing all antenna indexes for one sampling window time index); and, n is the frequency index. Each FFT calculation is thus a one dimensional FFT calculation on the baseband signal, and corresponds to a specific direction of arrival (as depicted by the frequency index) and set of antenna weights which, in practice, are the FFT weights.

The output of correlator 50-2A, i.e., the Y(n,t) values computed using Expression 1, are stored as correlator output values. The correlator output values can be stored, for example, in the correlator output value memory 52-2A of FIG. 2A.

The correlator output analyzer 62-2A of channel estimate (CE) generator 60-2A searches the correlator output values and (as step 7-2) determines therefrom a maximum absolute value $|Y(n,t)|_{max}$. This maximum absolute value $|Y(n,t)|_{max}$ is utilized by correlator output analyzer 62-2A to determine both the direction of arrival (DOA) and time of arrival (TOA) for an arriving wavefront seen in the sampling window. In particular, as step 7-3 correlator output analyzer 62-2A chooses a sampling window time index t_max at which $|Y(n,t)|_{max}$ occurs to be the time of arrival of the arriving wavefront. In addition, as step 7-4 correlator output analyzer 62-2A chooses the frequency index n_max at which $|Y(n,t)|_{max}$ occurs to represent the direction of arrival (DOA) of the arriving wavefront. The frequency index corresponds to a direction of arrival (e.g., $\theta$). An amplitude for the arriving wavefront is determined as correlator output analyzer 62-2A divides $|Y(n,t)|_{max}$ by the number of antennas comprising the antenna array (as step 7-5).

Expression 1 and the steps of FIG. 7 represent a generic non-parametric FFT calculation. In a CDMA-specific situation which utilizes a coding generator (such as coding generator 30 of FIG. 1), a comparable FFT calculation can be made using a refinement of Expression 1 which appears as Expression 2.

$$Y(n,t)=\Sigma C_j * FFT(n,X(:,t)), j=1,K$$ Expression 2

Expression 2 is understood from Expression 1, it being further mentioned that $C_j$ is a coding sequence symbol value j; and K is a length of the coding sequence.

As a result of operation of joint searcher and channel estimator 24-2A, an accurate channel estimate can be provided to the detector as a spatial signature. The spatial signature includes the time of arrival (TOA), as well as the direction of arrival (DOA) and amplitude. As explained below, the channel coefficient (CC) for each wavefront is derived from the direction of arrival (DOA) and amplitude. The time of arrival (TOA) and channel coefficient (CC) are applied to the detector as represented by lines 66-2A and 68-2A, respectively, in FIG. 2A.

As mentioned above, the channel coefficient (CC) for each wavefront is derived from the direction of arrival (DOA) and amplitude. Recall that at step 7-4 correlator output analyzer 62-2A chose the frequency index n_max at which $|Y(n,t)|_{max}$ occurs to represent the direction of arrival (DOA) of the arriving wavefront, with the chosen frequency index corresponding to a direction of arrival (e.g., $\theta$). The channel impulse response vector (i.e., array propagation vector) x is therefore generated by detector interface 64-2A in accordance with Expression 3 (for identical isotropic antenna elements).

$$x=[1, e^{(jkd*\sin\theta)}, e^{(jkd*2\sin\theta)}, \ldots e^{(jkd*(K-1)\sin\theta)}]*C$$ Expression 3

Figure 9A:
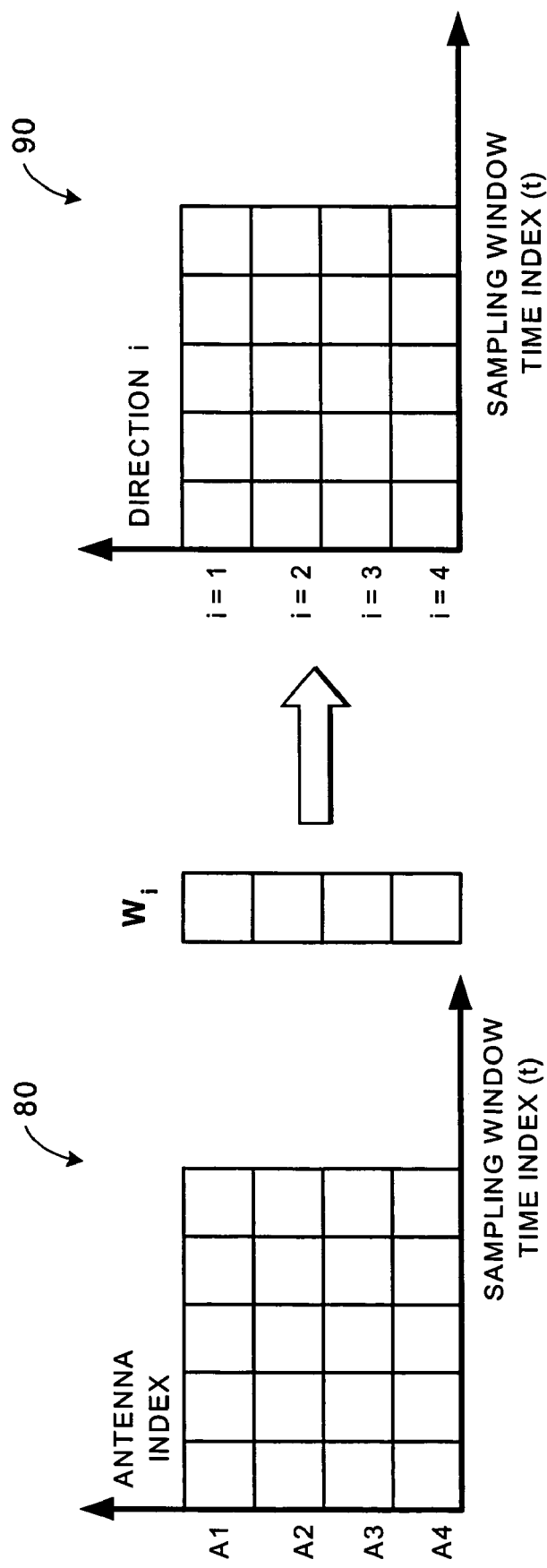
FIG. 9A is a diagrammatic view of an antenna signal matrix; an antenna weight vector; and a non-parametric output estimation vector.

In Expression 3, j is the conventional imaginary notation; $k=2*\pi\lambda$; d is a spacing distance between elements of the antenna array; $\lambda$ is the wavelength of the received/transmitted electromagnetic signal: ($f*\lambda=c$) and, K is the antenna element index (illustrated as antenna numbers A1, A2, A3, A4 in FIG. 9A, for example) In Expression 3, C is a complex constant in which |C|=|FFT_max|/number of antennas; the argument of C, i.e., arg(C)=arg(FFT_max), wherein |FFT_max is the FFT value computed at step 7-1 of FIG. 7.

In the foregoing description it is the role of channel estimate (CE) generator 60-2A, and particularly detector interface 64-2A, to generate both a time of arrival (TOA) and a channel coefficient (CC), the channel coefficient being derived from the direction of arrival, e.g., as above described in conjunction with Expression 3. In an alternate implementation of this and other embodiments described herein, the detector itself (such as detector 26 illustrated in FIG. 1), upon receiving the time of arrival (TOA) and direction of arrival (DOA) for each arriving wavefront, may have the intelligence to compute the channel coefficient for each wavefront from the corresponding direction of arrival (DOA) information. In such case, the time of arrival and direction of arrival are output by detector interface 64 to the detector.

Thus, considering the aspects above discussed, the joint searcher and channel estimator 24-2A looks in a discrete number of possible directions of arrival, and picks the direction of arrival with the highest correlation (highest absolute value). A comparative operational evaluation was preformed to illustrate the efficacy of a joint searcher and channel estimator such as joint searcher and channel estimator of 24-2A of FIG. 2A. A first scenario of the comparative operational evaluation involved a conventional searcher functioned essentially in prior art fashion for a sampling window. In so doing, with respect to each antenna for the sampling window the conventional search merely picked the time (e.g., chip) which had the greatest absolute value. In other words, the signals from each antenna were processed separately. A second scenario of the comparative operational evaluation was performed in the manner above described with respect to the joint searcher and channel estimator 24-2A of FIG. 2 and Expression 1. The same signal was applied in both scenarios to an antenna array having eight antenna elements. The length of the sampling window for both scenarios was twenty chips, and a coding sequence of {1} was utilized (e.g., only one of the chips contained the signal, the remainder of the chips contained complex white noise).

Figure 8A:
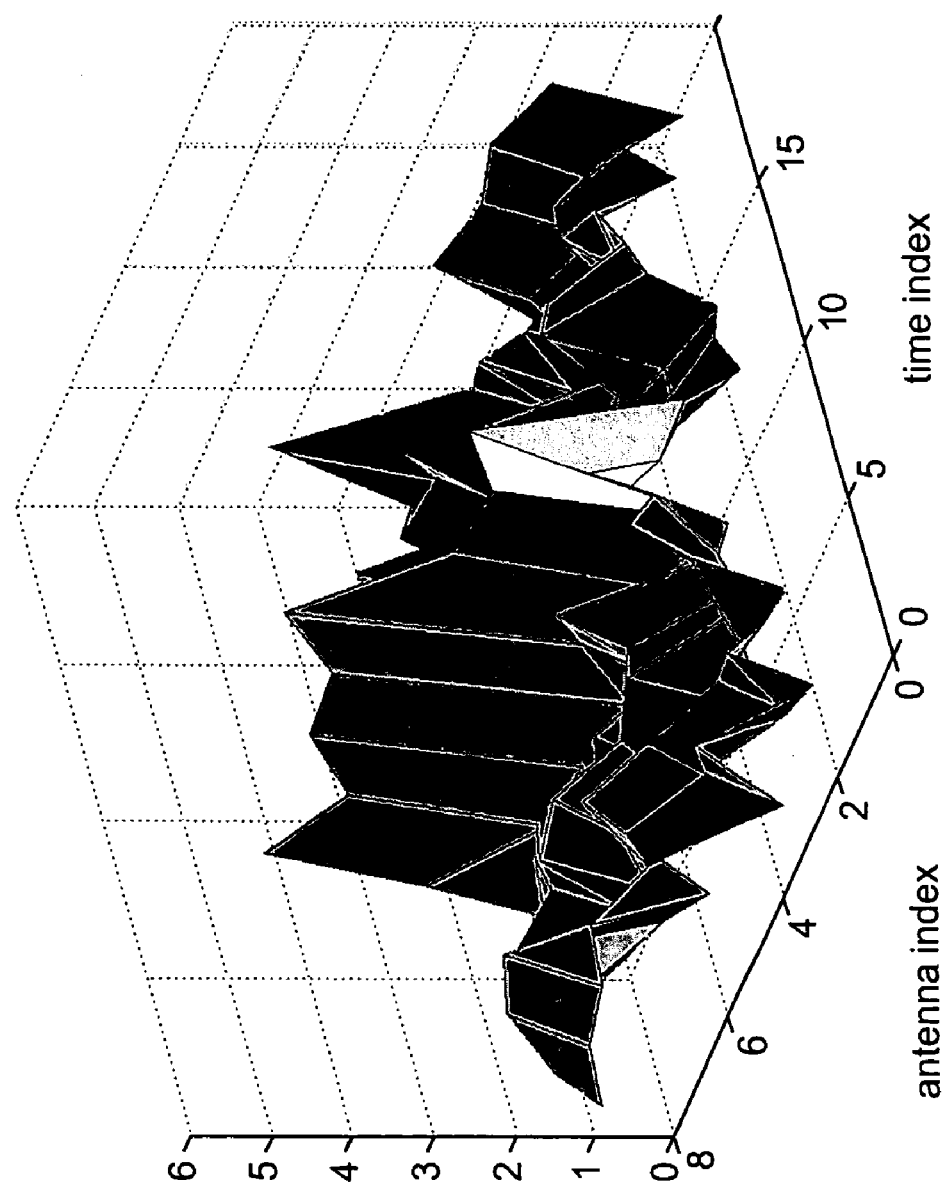
Figure 8B:
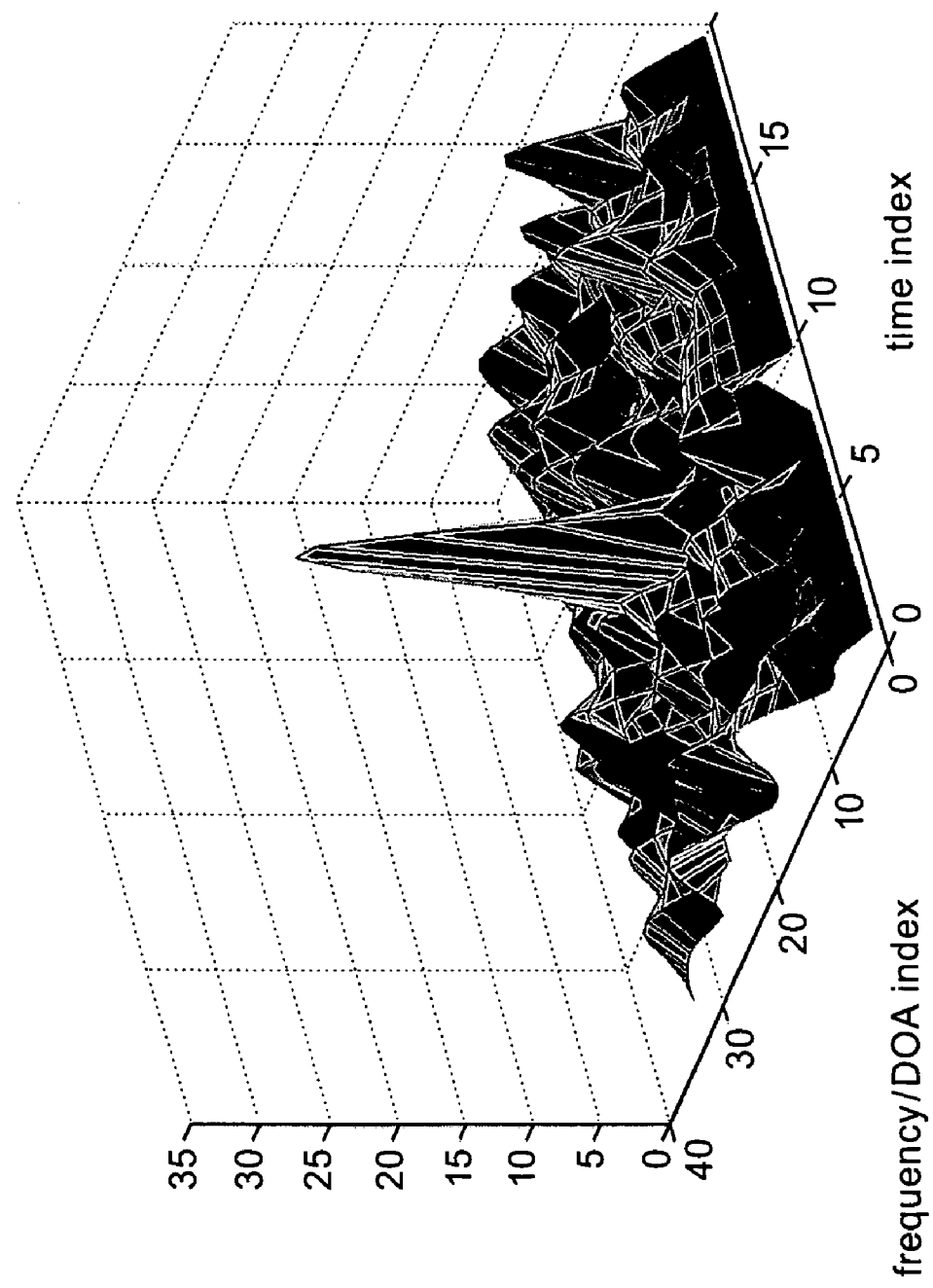

FIG. 8A illustrates the first scenario which utilized the conventional searcher. In contrast, FIG. 8B illustrates the spatial joint searcher and channel estimator 24-2A of FIG. 2A utilized for the second scenario. The superiority of the second scenario (and thus the spatial joint searcher and channel estimator) is evident by a comparison of FIG. 8A and FIG. 8B, due to the higher SNR for the signal of interest in FIG. 8B. In the second scenario, it is much easier to pick out the tone or value for the arriving wavefront. For the second scenario, FIG. 8C(1) shows the absolute value of the complex channel impulse response taps; FIG. 8C(2) shows phase errors of the complex channel impulse response taps; and FIG. 8C(3) shows the detected time of arrival.

Whereas the joint searcher and channel estimator of FIG. 2A includes a non-parametric type matrix analyzer, e.g., a correlator (e.g., a filter which performs a Fast Fourier Transform (FFT) calculation), in other example embodiments the matrix analyzer of the joint searcher and channel estimator implements parametric techniques. As does the FIG. 2A embodiment, the spatial joint searcher and channel estimator 24-2B of FIG. 2B (which uses a parametric technique) is shown along with its associated example antenna array 22-2B. Again by way of example, antenna array 22-2B includes four antenna elements 22-2B-1 through 22-2B-4. The signals obtained from the antenna elements are each applied to joint searcher and channel estimator 24-2B, as well as to a detector (not illustrated in FIG. 2B).

Similar to the earlier described embodiment, joint searcher and channel estimator 24-2B can comprise an antenna signal matrix handling unit 40-2B, which in turn comprises antenna signal matrix generator 42-2B and antenna signal matrix memory 44-2B, which function much in the manner previously described. For example, the complex baseband values stored in antenna signal matrix memory 44-2B can also be conceptualized as matrix 80, and as such has a sampling window time index. The antenna signal matrix 80 has been previously discussed in conjunction with FIG. 6, and is now also discussed with reference to FIG. 9A for sake of expounding the joint searcher and channel estimator 24-2B of FIG. 2B.

Figure 2B:
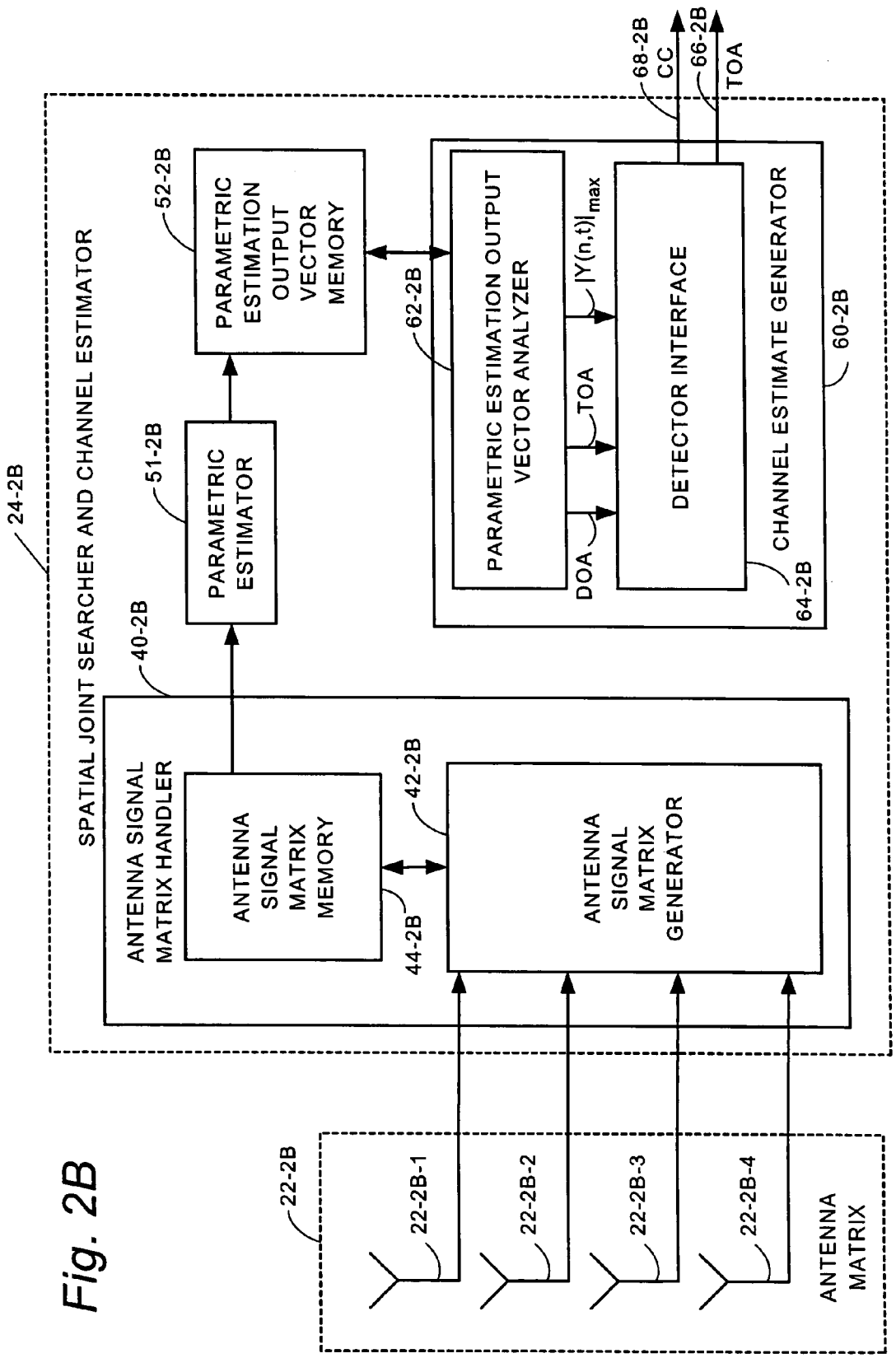
Figure 10:
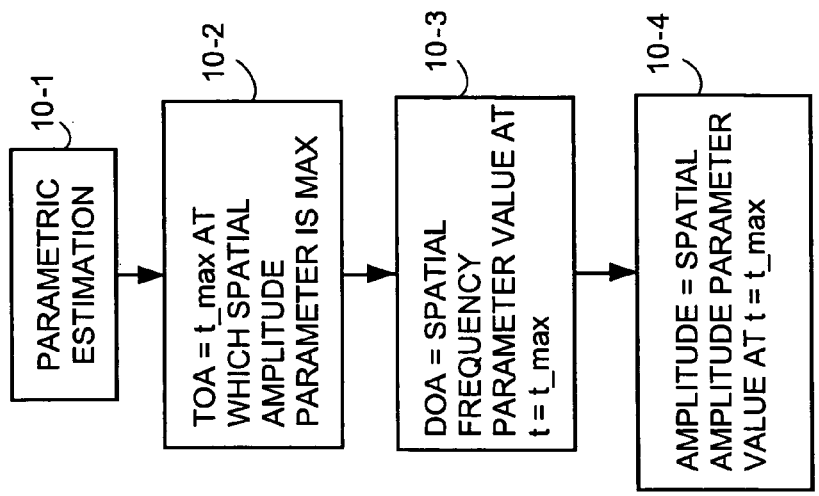
FIG. 10 is a flowcharting showing representative basic steps performed by matrix analyzer and channel estimate generator of an example embodiment of a spatial joint searcher and channel estimator, with the matrix analyzer using a parametric analysis technique.

The joint searcher and channel estimator 24-2B further comprises a matrix analyzer, e.g., parametric estimator 51-2B, which utilizes a parametric technique. In addition, in similar manner as the preceding embodiment, joint searcher and channel estimator 24-2B comprises a channel estimate generator 60-2B which has parametric estimation output vector analyzer 62-2B and a demodulator interface 64-2B. Basic steps performed by parametric estimator 51-2B and parametric estimation output vector analyzer 62-2B of the joint searcher and channel estimator 24-2B of FIG. 2B are illustrated in FIG. 10.

Figure 9B:
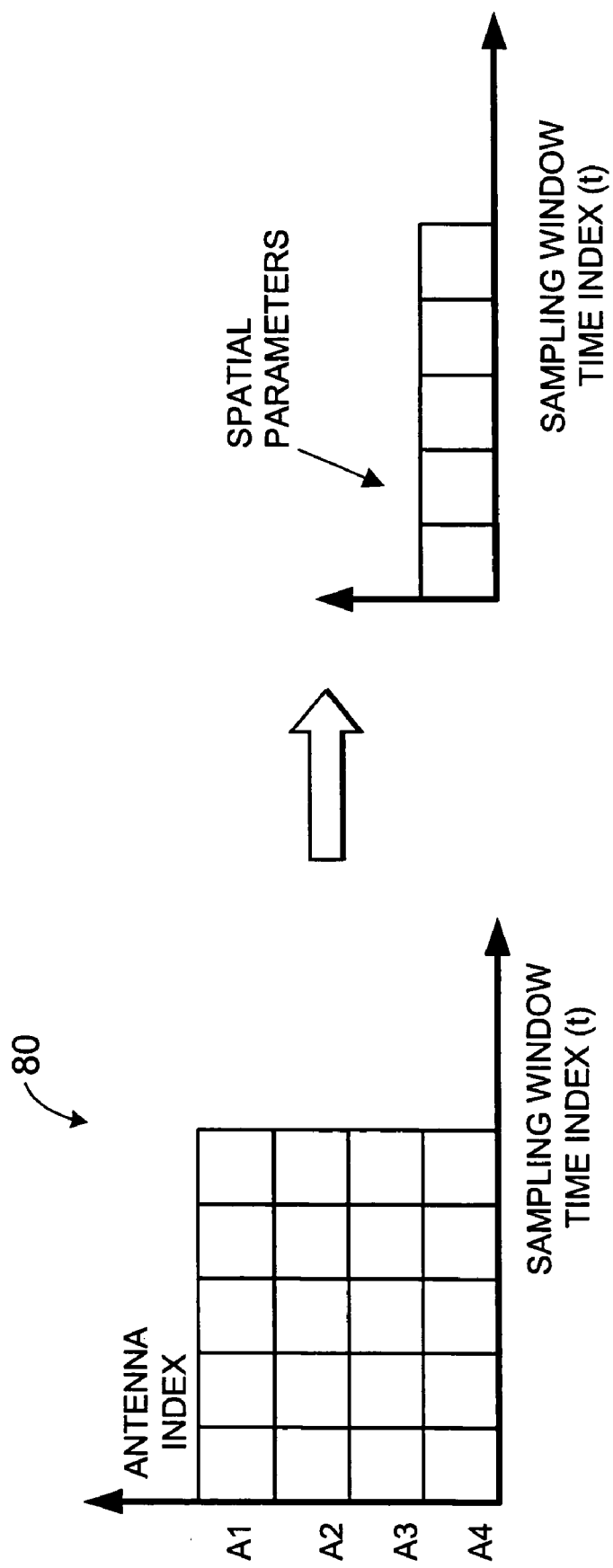
FIG. 9B is a diagrammatic view of an antenna signal matrix and a parametric output estimation vector.

For each sampling window time index of the antenna signal matrix 80, as step 10-1 the parametric estimator 51-2B estimates, e.g. two parameters at each time instant: a spatial frequency parameter parameter and a spatial amplitude parameter. The spatial frequency parameter estimates the frequency the incident waves creates when arriving at the ULA. The spatial amplitude parameter estimates the amplitude of this frequency. The spatial frequency parameter and spatial amplitude parameter are considered to be a parameter pair and in FIG. 9B, they are illustrated as one parameter per sample along the sampling time index. The parameters can be calculated by an appropriate strategy or goal criteria, e.g., by a minimum mean square error technique (MMSE).

As step 10-2, parametric estimation output vector analyzer 62-2B finds certain "qualifying" values in parametric estimation output vector, i.e. high or maximum values of the spatial amplitude parameter. The qualifying values can be, for example, values whose absolute values are sufficiently high or are a maximum. Each qualifying value of parametric estimation output vector 90 can correspond to an arriving wavefront for the sampling window.

For each qualifying value, as step 10-3 the parametric output estimation vector analyzer 62-2B chooses a time of arrival (TOA) as corresponding to the sampling window time index t for the qualifying value, e.g., the time index at which the maximum/qualifying absolute value of the parametric estimation output vector occurs.

Similarly, for each qualifying value, as step 10-4 the analyzer 62-2B chooses a direction of arrival (DOA) as the spatial frequency parameter value at the time of arrival, decided in 10-3.

As step 10-5, the parametric estimation output vector analyzer 62-2B determines the amplitude as the value of the spatial amplitude value divided by the number of antenna elements in the array.

The joint searcher and channel estimator 24-2B thus looks for an optimum direction, and prepares a channel estimate which can be provided to the detector as a spatial signature. The spatial signature includes the direction of arrival (DOA) and amplitude. The channel coefficient (CC) for each wavefront is derived from the direction of arrival (DOA) and amplitude in the manner explained above with reference to Expression 3. The time of arrival (TOA) and channel coefficient (CC) are applied to the detector as represented by lines 66-2B and 68-2B, respectively, in FIG. 2B.

It should be understood from the foregoing that information indicative of more than one incident wavefront may be seen in a sampling window. For example, with reference to the parametric estimation output vector 90 of FIG. 9B, the parametric estimation output vector analyzer 62-2B may see other high numbers and for each of those high numbers which qualify, an arriving wavefront may be ascertained. For example, if there were two high numbers, then the channel impulse response may reflect two arriving wavefronts. For each of the two arriving wavefronts the joint searcher and channel estimator would pick out both a time of arrival (TOA) and direction of arrival (DOA), as well as amplitude, which are mapped to two different channel coefficients, with these two different channel coefficients forming part of the channel estimate.

Figure 12:
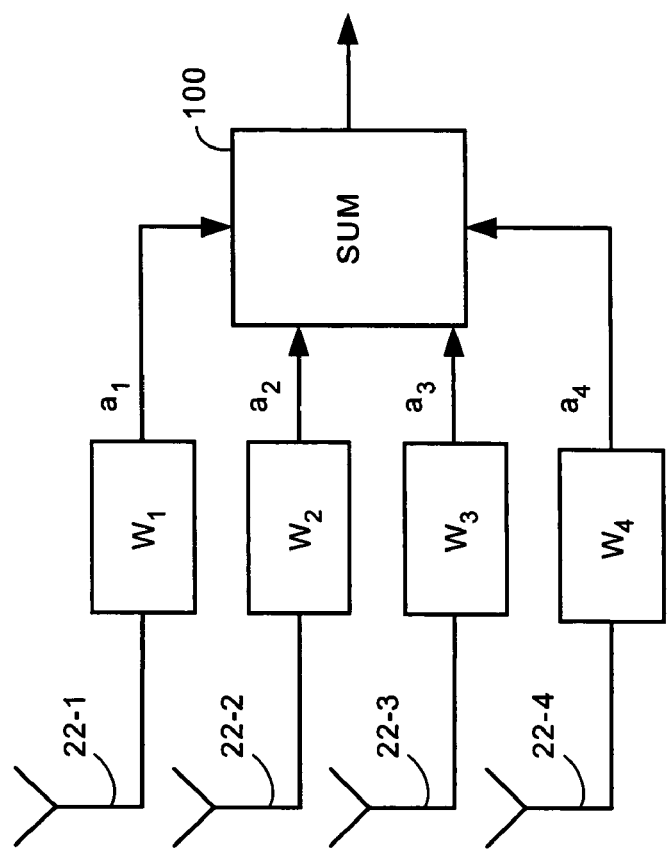
FIG. 12 is a schematic view for illustrating how an antenna weight vector facilitates the coherent combination illustrated in FIG. 11.

FIG. 4 showed that a wavefront individually reached each of four example antenna elements of an antenna array, providing a different antenna output (complex baseband signal) for each antenna element. For example, the output of antenna element 22-1 with the complex vector $a_{1-1}$, (and phase $\theta_{1-1}$); the output of antenna element 22-2 is the complex vector $a_{1-2}$ (and phase $\theta_{1-2}$), and so forth. The linear combination, of the complex antenna baseband signal and the antenna weight vectors $W_i$ have the effect of a summation, or coherent combination in the time and space domain, shown as summation function 100 in FIG. 12.

Figure 11:
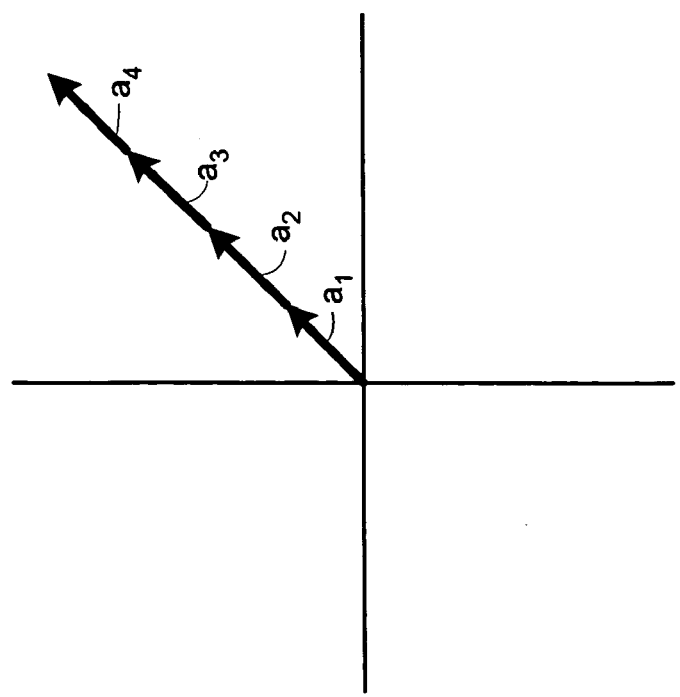
FIG. 11 is a diagrammatic view illustrating a coherent combination of signal outputs by a joint searcher and channel estimator.

The coherent combination facilitated by the antenna weight vectors $W_i$ is illustrated in FIG. 11. In the example case of the four antenna elements shown in FIG. 12, the effect of weight belonging to antenna index 2, here denoted as $W_2$ is to rotate the output of antenna element 22-2 so that its phase $\theta_{1-2}$ lines up with the phase $\theta_{1-1}$ of the output of antenna element 22-1, in the manner shown in FIG. 11. Similarly, the effect of weight $W_3$ is to rotate the output of antenna element 22-3 so that its phase $\theta_{1-3}$ lines up with the phase $\theta_{1-1}$ of the output of antenna element 22-1. The effect of weight $W_4$ is to rotate the output of antenna element 22-4 so that its phase $\theta_{1-4}$ lines up with the phase $\theta_{1-1}$ of the output of antenna element 22-1. For simplicity, FIG. 11 ignores noise considerations, which tend to make the resultant vector less than straight. Note that in the preciding paragraph, the weight vectors are denoted with Wi, where i denotes the antenna index of the weight vector W, which is denoted without index.

In the spatial joint searcher and channel estimators, the SINR for finding channel taps (peaks) should be proportional to the number of antenna elements comprising the array. The operation of the spatial joint searcher and channel estimators can be adapted to take into consideration channel variations over time, e.g., spatial variations in the environment (e.g., in the sending and receiving antennas).

The non-parametric FFT-type correlator and the parametric techniques illustrated above, e.g., by FIG. 2A and FIG. 2B, respectively, are only two example techniques for finding the values or "tones" in antenna signal matrix 80 which are associated with arriving wavefronts. Other parametric approaches are described by or understood from Stocia, Petre and Moses, Randolph, *Introduction To Spectral Analysis*, ISBN-013-258419-0, Prentice Hall, which is incorporated by reference in its entirety, particularly Chapter 4 thereof.

The spatial joint searcher and channel estimator and techniques of operation thereof as described above are suitable for any receiver unit which has plural receiving antennas. Thus, the spatial joint searcher and channel estimator is particularly well suited for, but not limited to, a base station which has plural antennas. Also encompasses are mobile terminals which have plural antennas.

Temporal Joint Searchers/Estimators

In other embodiments, the joint searcher and channel estimator contemporaneously processes the signals received at an antenna element from plural, successive sets of pilot data (each set of pilot data being received in its own sampling window) in order to determine both time of arrival and the channel coefficient. In so doing, the joint searcher and channel estimator takes into consideration a doppler shift or frequency shift (the terms "doppler shift" and "frequency shift" being used interchangeably in conjunction with the description of the temporal joint searcher and channel estimator). The frequency shift is primarily attributable to a doppler shift, but can also include a frequency shift in the transmitter and receiver oscillators. For simplification, such frequency shifts are hereinafter referred to as "doppler shifts" or "doppler frequency shifts".

The doppler shift can be occasioned by movement such as relative movement of one of the transmitter and the receiver (for example, by movement of a mobile terminal), or movement of a signal path-affecting object or structure in the surroundings (which can cause a doppler shift even for a fixed transmitter and fixed receiver).

In providing the channel estimate, the joint searcher and channel estimator essentially concurrently considers plural signals (e.g., plural sets of pilot data) received by the antenna element. The joint searcher and channel estimator applies the channel coefficient and the time of arrival to a detector which provides, e.g., a symbol estimate.

In these embodiments, the joint searcher and channel estimator is essentially a two dimensional unit, with a second dimension being a temporal dimension imparted by the time intervals at which the successive sets of pilot data arrive. This temporal dimension, which involves essentially simultaneous and concurrent processing together of signals received at the antenna element from each of the plural sets of pilot data, bestows on these embodiments of the joint searcher and channel estimator the distinction of being a "temporal" joint searcher and channel estimator.

The temporal joint searcher and channel estimator may take differing embodiments and have differing implementations. In one example, illustrative embodiment the temporal joint searcher and channel estimator includes a non-parametric type correlator (e.g., a correlator which performs a Fast Fourier Transform (FFT) calculation). In another example, illustrative embodiment the temporal joint searcher and channel estimator utilizes a parametric approach.

Figure 13A:
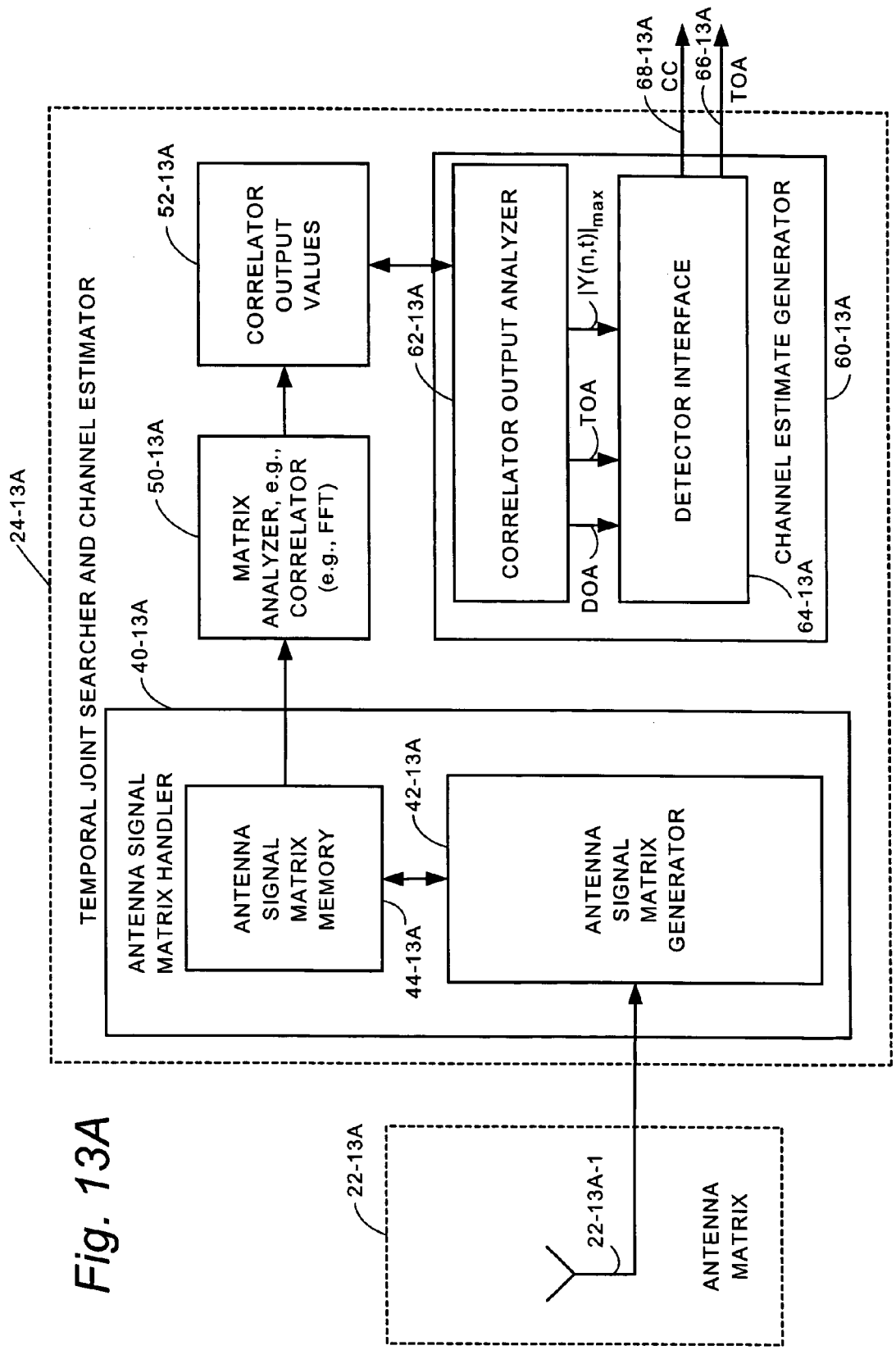
FIG. 13A is a schematic view of an example embodiment of a temporal joint searcher and channel estimator shown with an antenna array, the temporal joint searcher and channel estimator comprising a matrix analyzer which employs a non-parametric analysis technique.

FIG. 13A illustrates one example embodiment of a spatial joint searcher and channel estimator 24-13A which uses a non-parametric technique for determining time of arrival and channel estimate, as well as an associated example antenna array 22-13A. In the example of FIG. 13A, the antenna array 22-13A is shown as having one antenna element 22-13A-1. As explained hereinafter, complex baseband signals obtained from the same antenna element (e.g., antenna element 22-13A-1) upon receipt of each of successive sets of pilot data (as hereinafter described) are each applied to joint searcher and channel estimator 24-13A, as well as to a detector (not illustrated in FIG. 13A).

The joint searcher and channel estimator 24-13A comprises an antenna signal matrix handling unit 40-13A. In one particular example manifestation, antenna signal matrix handling unit 40-13A includes antenna signal matrix generator 42-13A and antenna signal matrix memory 44-13A. A matrix analyzer, which for the non-parametric technique of FIG. 2A can be correlator 50-13A, operates on complex values stored in antenna signal matrix memory 44-13A. The correlator 50-13A preferably comprises a filter. The correlator 50-13A generates certain output values, which may be stored, e.g., in correlator output value memory 52-13A. The joint searcher and channel estimator 24-13A further comprises a channel estimate (CE) generator 60-13A. In the illustrated example embodiment, the channel estimate (CE) generator 60-13A comprises a correlator output analyzer 62-13A and a detector interface 64-13A. The detector interface 64-13A generates, for each wavefront, a channel estimate which includes both a time of arrival (TOA) and a channel coefficient (CC). In FIG. 13A, the time of arrival and channel coefficient output by detector interface 64-13A are applied to the detector on lines 66-13A and 68-13A, respectively.

Figure 14:
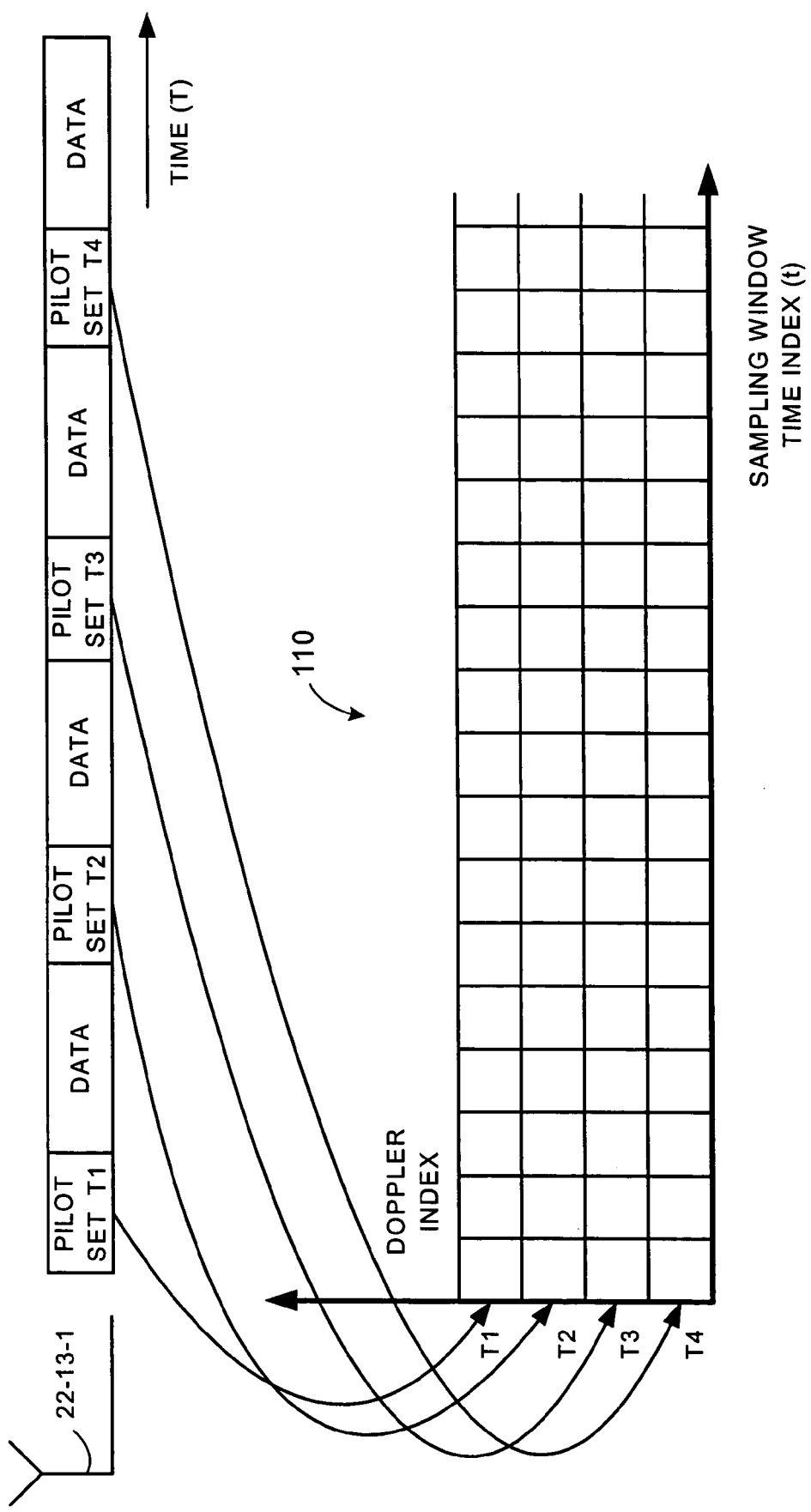
FIG. 14 is a diagrammatic view depicting a sequence of sets of pilot data and user data received by a receiver which utilizes a temporal joint searcher and channel estimator, as well as an antenna signal matrix utilized by the temporal joint searcher and channel estimator.

As shown in FIG. 14, the temporal joint searcher and channel estimators such as joint searcher and channel estimator 24-13A of FIG. 13A watch the channel response from an antenna (e.g., antenna 22-13-1) for sets of pilot data which are interpersed or otherwise transmitted with other data (e.g., user data). For sake of simplicity, it is assumed that each set of pilot data is received in a separate sampling window. Such need not be the case, however, as differing sets of pilot data can be received simultaneously if the different streams are, e.g., code multiplexed. Merely as an illustrative example, FIG. 14 shows four sets of pilot data, i.e., pilot sets T1-T4, interspersed with user data and received at unique global times (as indicated by the "T" axis in FIG. 4).

Each set of pilot data is typically in a different frame from another set of pilot data. For example, pilot set T1 may be in frame 1; pilot set T2 may be in frame 11; pilot set T3 may be in frame 21; etc. "Frame transmission interval" refers to the time between two successive frames which contain pilot data. The time between two successive frames which contain pilot data is typically specified by a standard or other specification.

FIG. 14 thus reflects the typical periodic transmission of pilot data by the transmitter source, and also the expected receipt of repetitions of the pilot data at the receiver at successive intervals. In view of factors such as relative motion of the transmitter and receiver, the successive intervals between differing sets of pilot data are not necessarily constant.

As further shown in FIG. 14, an antenna matrix handling unit (such as antenna matrix handling unit 40-13A of the FIG. 13A embodiment) samples the signals received by the antenna element for each of the successive sets of pilot data, i.e., for pilot sets T1-T4. Using the sampled signals, antenna signal matrix generator 42-13A generates an antenna signal matrix such as antenna signal matrix 110 illustrated in FIG. 14. The antenna signal matrix 110 may be stored in any convenient fashion, such as antenna signal matrix memory 44-13A.

The antenna signal matrix 110 is a two dimensional functionally dependent matrix. In other words, complex samples are stored in antenna signal matrix 110 as a function of two different indexes. For the antenna signal matrix 110 shown in FIG. 14, a first index is a sampling window time index, illustrated along the X axis of FIG. 14. For embodiments which utilize spreading codes or similar codes, the first index may be, for example, a chip index. Thus, the sampling window time index points to a time in the sampling window relative to a start of the respective sampling window. In the antenna signal matrix 110 of FIG. 14, a second index, shown along the Y axis, is a pilot set index (which serves as a dimensional differentiation index). The pilot set index indicates which one of the sets of pilot data the sample was obtained. In other words, a pilot set index=T1 indicates that the sample was obtained from pilot set T1; a pilot set index=T2 indicates that the sample was obtained from pilot set T2; and so on as depicted by the arrows which connect the matrix 110 with the received signal depiction with its illustrative successive sets of pilot data. As can be seen, the pilot set index points to a different row of the antenna signal matrix 110, each row being associated with a different set of pilot data.

FIG. 14 shows four rows in antenna signal matrix 110 for consistency with the illustrated example wherein the antenna signal matrix encompasses four successive sets of pilot data. The number of sets of pilot data subsumed in a given antenna signal matrix, and thus the maximum value of the pilot set index, can vary from receiver to receiver, so that the present example's choice of four sets of pilot data is only illustrative for sake of example. In general, the choice of the number of sets of pilot data to be apprehended simultaneously by a temporal joint searcher and channel estimator depends on how quickly the doppler is expected to change. The number of taps/incident waves depends on the multipath. In other words in an open space we have one direct path and thus only one channel/tap coefficient in the channel impulse response.

The antenna signal matrix 110 is also conceptualized as storing "dimensionally differentiated" signals acquired from a single antenna element of the antenna array. For the temporal joint searcher and channel estimator, wherein the antenna structure comprises an antenna which provides signals for each of successive sets of pilot data received at separated time intervals, the signals acquired by the antenna are dimensionally differentiated with regard to a temporal or time dimension. For example, the signals acquired by the antenna are dimensionally differentiated by being acquired in differing frame transmission intervals.

For sake of simplicity, the complex values stored in antenna signal matrix 110, including the complex values obtained from the antennas, are not illustrated in FIG. 14. Such complex values would be illustrated in a third dimension, e.g., out of the plane of FIG. 14. The antenna signal matrix 110 includes both complex white noise and (for the sake of the present illustration) a complex sample for at least one wavefront (planar or other known shape). The wavefronts have known phase (temporal, non-coherent detection), and are modulated code sequences.

The complex values stored for each column of the antenna signal matrix 110 of FIG. 14 can be conceptualized as a dimensional receptivity vector. That is, a dimensional receptivity vector is formed with the complex values taken with respect to a same single sampling window time index for each of the sets of pilot signals included in the sampling window (e.g., for sets T1-T4 in FIG. 14). Each element taken from a unique row of antenna signal matrix 110 has a different phase in the manner of the differing θ values illustrated in FIG. 5. As received by the differing antenna elements, for the temporal joint searcher and channel estimator the change in phase over time is the doppler frequency for the dimensional receptivity vector. The phase rotation speed, or frequency, of the dimensional receptivity vector, for the sampling window time instance can be interpreted as the doppler shift (DS). Thus, each dimensional receptivity vector corresponds to a separate doppler shift frequency. There are plural possible frequencies for the dimensional receptivity vector, each of the plural possible frequencies corresponding to a different possible doppler shift for a wavefront. For the non-parametric techniques herein employed, the plural possible frequencies can be a continuous range of frequencies. For sake of differentiating the plural possible frequencies, the plural possible frequencies are each represented by a frequency index.

For the temporal joint searcher and channel estimator, the channel estimate comprises, as mentioned before, a time of arrival (TOA) and doppler shift for each arriving wavefront in the sampling window (e.g., a channel coefficient mapped to a doppler shift). Therefore, the channel estimate may comprise a set (of one or more) pairs of data, each pair including a time of arrival (TOA) and a channel coefficient. The task for the temporal joint searcher and channel estimator is thus to locate a value or "tone" in antenna signal matrix 110 that best corresponds to an arriving wavefront, e.g., to locate a value or tone for each arriving wavefront in the sampling window. This task of locating a value or "tone" in antenna signal matrix 110 that best corresponds to an arriving wavefront can be accomplished by various techniques, including both parametric and non-parametric techniques. A Fast Fourier Transform (FFT) technique as discussed below is just one representative and illustrative example non-parametric type of correlator which can be utilized.

FIG. 15 depicts example basic steps performed by an example correlator 50-13A and correlator output analyzer 62-13A in conjunction with the Fast Fourier Transform (FFT) calculation. As step 15-1, the correlator 50-13A of FIG. 13A calculates Expression 5.

$$Y(n,t)=FFT(n,X(n,t)) \quad \text{Expression 5}$$

wherein t is the sampling window time index; $X(n,t)$ is the complex antenna matrix; and, n is the doppler frequency index. Each FFT calculation is thus a one dimensional FFT calculation on the baseband signal, and corresponds to a specific doppler shift frequency.

The output of correlator 50-13A, i.e., the $Y(n,t)$ values computed using Expression 1, are stored as correlator output values. The correlator output values can be stored, for example, in the correlator output value memory 52-13A of FIG. 13A.

The correlator output analyzer 62-13A of channel estimate (CE) generator 60-13A searches the correlator output values and (as step 15-2) determines therefrom a maximum absolute value $|Y(n,t)|_{max}$. This maximum absolute value $|Y(n,t)|_{max}$ is utilized by correlator output analyzer 62-13A to determine both the doppler shift (DS) and time of arrival (TOA) for an arriving wavefront. In particular, as step 15-3 the correlator output analyzer 62-13A chooses a sampling window time index t_max at which $|Y(n,t)|_{max}$ occurs to be the time of arrival of the arriving wavefront. In addition, as step 15-4 the correlator output analyzer 62-13A chooses the doppler index n_max at which $|Y(n,t)|_{max}$ occurs to determine the doppler shift (DS) of the arriving wavefront. An amplitude for the arriving wavefront is determined as correlator output analyzer 62-13A divides $|Y(n,t)|_{max}$ by the number of sets of pilot data comprising the antenna signal matrix (as step 15-5).

Expression 5 and the steps of FIG. 15 represent a generic FFT calculation. In a CDMA-specific situation which utilizes a coding generator (such as coding generator 30 of FIG. 1), a comparable FFT calculation can be made using a refinement of Expression 5 such as that which appears as Expression 2, previously discussed, but applied for the temporal joint searcher and channel estimator rather than for the spatial joint searcher and channel estimator.

As a result of operation of joint searcher and channel estimator 24-13A, an accurate channel estimate can be provided to the detector as a temporal signature. For each wavefront, the temporal signature includes the time of arrival (TOA) mapped to a doppler (frequency) shift. As explained below, the channel coefficient (CC) for each time of arrival and wavefront is derived from the doppler frequency shift. The time of arrival (TOA) and channel coefficient (CC) are applied to the detector as represented by lines 66-13A and 68-13A, respectively, in FIG. 13A.

As mentioned above, the channel coefficient (CC) for each wavefront is derived from the doppler frequency shift (DS). Recall that at step 15-4 the correlator output analyzer 62-2B chose the frequency index n_max at which $|Y(n,t)|_{max}$ occurs to represent the doppler shift frequency (DSF) of the arriving wavefront, with the chosen frequency index corresponding to a doppler shift (e.g., θ', i.e., the derivative of θ). The channel impulse response vector (i.e., array propagation vector) x is therefore generated by detector interface 64-2B in accordance with Expression 6.

$$C[e^{j2\pi fT+H)}, e^{j2\pi fT2+H)}, e^{j2\pi fT3+H)}, \ldots e^{j2\pi fN+H)}] \quad \text{Expression 6}$$

In Expression 6, C is the amplitude of the wavefront, f is the frequency of the signal (including doppler shift); T is the period time between two pilot symbols/sequences (which are assumed to be periodical, in analogy to the uniform array of the spatial embodiment), and H is a complex value of the signal at the first pilot symbol/sequence, H being arg(FFT max). For sake of simplicity, noise has been excluded from Expression 6, and C is assumed to be constant within the time TN.

In the foregoing description it is the role of channel estimate (CE) generator 60-2A, and particularly detector interface 64-2A, to generate both a time of arrival (TOA) and a channel coefficient (CC), the channel coefficient being derived from the doppler shift, e.g., as above described in conjunction with Expression 6. In an alternate implementation of this and other embodiments described herein, the detector itself (such as detector 26 illustrated in FIG. 1), upon receiving the time of arrival (TOA) and doppler shift (DS) for each arriving wavefront, may have the intelligence to compute the channel coefficient for each wavefront from the corresponding direction of arrival (DOA) information. In such case, the time of arrival and direction of arrival are output by detector interface 64-13A to the detector.

Thus, the joint searcher and channel estimator 24-13A looks at a discrete number of possible doppler frequency shifts, and picks the doppler frequency with the highest correlation (highest absolute value).

Figure 13B:
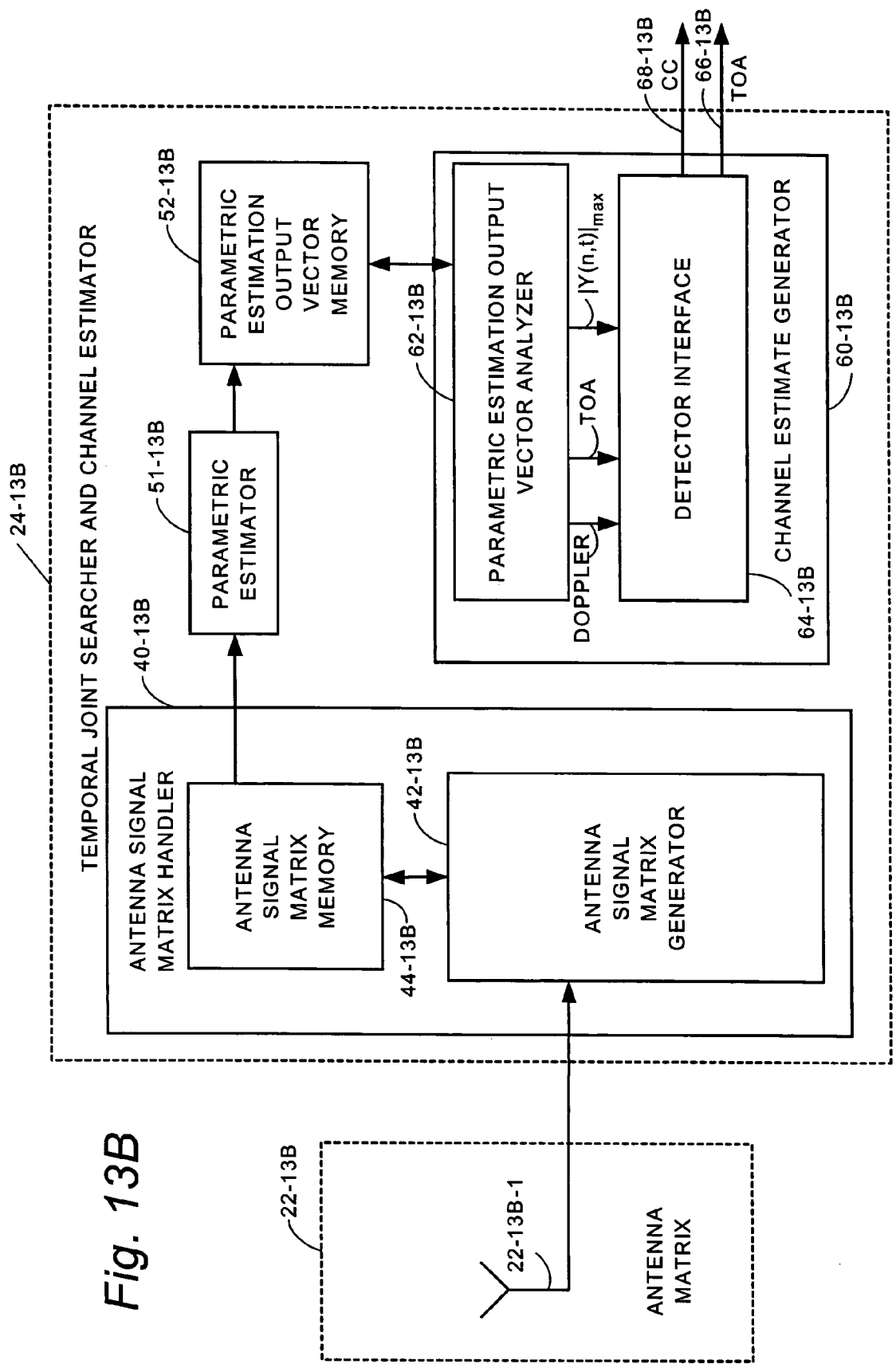
FIG. 13B is a schematic view of an example embodiment of a temporal joint searcher and channel estimator shown with an antenna array, the temporal joint searcher and channel estimator comprising a matrix analyzer which employs a parametric analysis technique.

Whereas the joint searcher and channel estimator of FIG. 13A includes a non-parametric correlator (e.g., a filter) which performs a Fast Fourier Transform (FFT) calculation, in other example embodiments the temporal joint searcher and channel estimator implements parametric techniques. As does the FIG. 13A embodiment, the spatial joint searcher and channel estimator 24-13B of FIG. 13B is shown along with its associated example antenna array 22-13B comprising an antenna element 22-13B-1 which receives the successive sets of pilot data in the manner of FIG. 14.

Figure 16A:
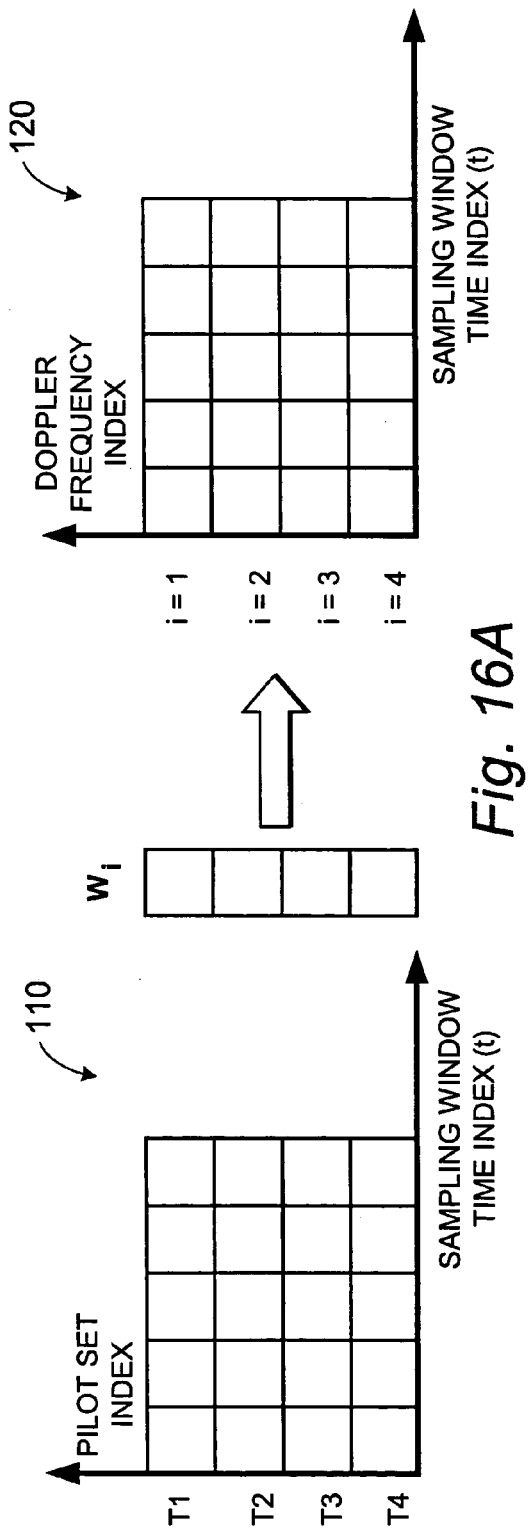
FIG. 16A is a diagrammatic view of an antenna signal matrix; a doppler weight vector; and a non-parametric estimation output vector for a temporal joint searcher and channel estimator.

Similarly to the earlier described embodiment, joint searcher and channel estimator 24-13B can comprise an antenna signal matrix handling unit 40-13B, which in turn comprises antenna signal matrix generator 42-13B and antenna signal matrix memory 44-13B, which function much in the manner previously described. For example, the complex baseband values stored in antenna signal matrix memory 44-13B can also be conceptualized as matrix 110, and as such has a sampling window time index. The antenna signal matrix 110 has been previously discussed in conjunction with FIG. 14, and is now also discussed with reference to FIG. 16A for sake of expounding the joint searcher and channel estimator 24-13B of FIG. 13B.

The joint searcher and channel estimator 24-13B further comprises the parametric estimator 51-13B which outputs a parametric output estimation vector for storage in memory 52-13B. In addition, in similar manner as the preceding embodiment, joint searcher and channel estimator 24-13B comprises a channel estimate generator 60-13B which has parametric output estimation vector analyzer 62-13B and a demodulator interface 64-13B. Basic steps performed by parametric estimator 51-13B and parametric output estimation vector analyzer 62-13B of the joint searcher and channel estimator 24-13B of FIG. 13B are illustrated in FIG. 17.

Figure 16B:
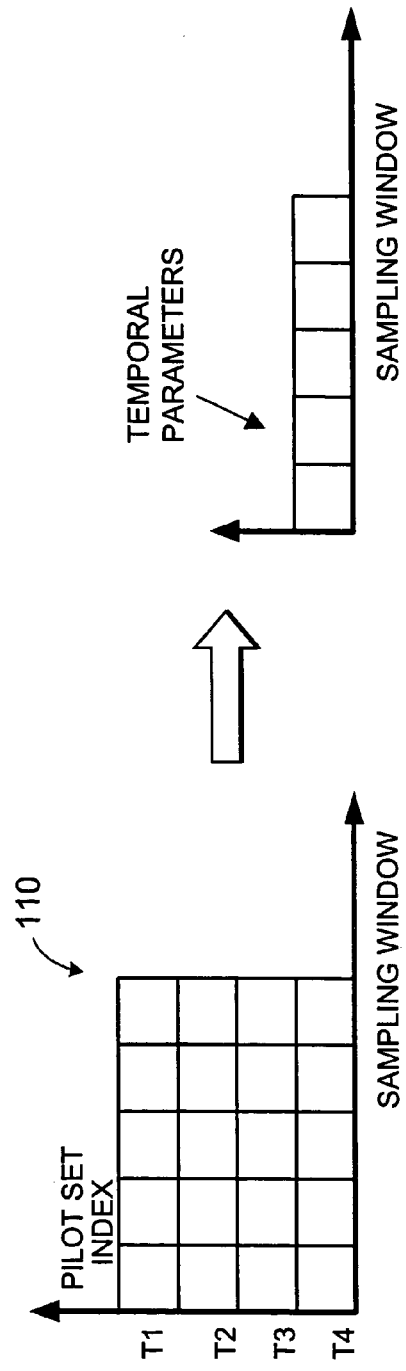
FIG. 16B is a diagrammatic view of an antenna signal matrix and a parametric estimation output vector for a temporal joint searcher and channel estimator.

For each sampling window time index of the antenna signal matrix 110. As step 17-1, the parametric estimator 51-13B estimates, e.g., two parameters at each time instant: a temporal frequency parameter parameter and a temporal amplitude parameter. The temporal frequency parameter estimates the frequency the incident waves creates when arriving at the antenna for the consecutive pilot symbols. The temporal amplitude parameter estimates the amplitude of this frequency. The temporal frequency parameter and temporal amplitude parameter are considered to be a parameter pair and in FIG. 16B, they are illustrated as one parameter per sample along the sampling time index.

As step 17-2 performed by joint searcher and channel estimator 24-13B, analyzer 62-13B finds certain "qualifying" values in parametric output estimation vector 120, i.e. maximum value of temporal amplitude vector. Each qualifying value of parametric output estimation vector 120 can correspond to an arriving wavefront for the sampling window.

For each qualifying value, as step 17-3 the parametric output estimation vector analyzer 62-13B chooses a time of arrival (TOA) as corresponding to the sampling window time index t for the qualifying value, e.g., the time index at which the maximum/qualifying absolute value of the parametric estimation output vector occurs.

Similarly, for each qualifying value, as step 17-4 the parametric output estimation vector analyzer 62-13B chooses a a doppler shift frequency (DS) as the temporal frequency parameter value at the time of arrival decided in 17-3.

As step 17-5, the parametric estimation output vector analyzer 62-13B determines the amplitude as being the maximum/qualifying absolute value divided by the number of pilot data sets in the series.

The joint searcher and channel estimator 24-13B thus looks for an optimum doppler (shift) frequency, and prepares a channel estimate which can be provided to the detector as a temporal signature. The temporal signature includes the time of arrival (TOA), as well as the doppler shift frequency (DSF) and amplitude. The channel coefficient (CC) for each time of arrival and wavefront is derived from the doppler shift (DS) in the manner described above with reference to Expression 6. The time of arrival (TOA) and channel coefficient (CC) are applied to the detector as represented by lines 66-13B and 68-13B, respectively, in FIG. 13B.

It should be understood from the foregoing that information indicative of more than one incident wavefront may be seen in a sampling window. For example, with reference to the parametric output estimation vector 120 of FIG. 16B, the parametric output estimation vector analyzer 62-13B may see other high numbers and for each of those high numbers which qualify, an arriving wavefront may be ascertained. For example, if there were two high numbers, then the channel impulse response may reflect two arriving wavefronts. For each of the two arriving wavefronts the joint searcher and channel estimator would pick out both a time of arrival (TOA) and doppler shift frequency (DSF), as well as amplitude, which are mapped to two different channel coefficients, with these two different channel coefficients forming part of the channel estimate for the channel impulse response.

The operation of the temporal searcher and channel estimator has been described above for one antenna element of an antenna array 22. It should be understood that the antenna array 22 may comprise plural antenna elements, and that the operations described above may be performed separately with respect to one or more antenna elements of the array. Moreover, as described later, principles of the foregoing operation may be performed in a combined manner with respect to plural antennas of the antenna array.

The temporal joint searcher and channel estimator and techniques of operation thereof as described above is particularly well suited for, but not limited to, a receiver unit which has only one antenna element, e.g., a mobile terminal with only one antenna. As indicated above, however, the temporal joint searcher and channel estimation techniques can be utilized separately but in parallel by plural antennas for a receiver.

Consider, for example, the situation reflected in FIG. 11 in which the output of antenna element 22-13A-1 (or 22-13B-1) for a pilot data set T1 with the complex vector $a_{1-1}$ (and phase $\theta_{1-1}$); the output of the same antenna element for a pilot data set T2 with the complex vector $a_{1-2}$ (and phase $\theta_{1-2}$), and so forth. In this situation, the linear combination of the complex antenna baseband signal and the doppler weight vectors $W_i$ also has the effect of a summation, or coherent combination in the time domain, shown as summation function 100 in FIG. 12. By adding these complex vectors coherently, the temporal joint searcher and channel estimator increases the performance of the search and the channel estimate.

In situations in which there is no doppler shift (e.g., the mobile terminal stands still or moves in a radial direction relative to the base station), the doppler shift frequency may be zero. In such cases the pilot data of the arriving wavefront(s) have essentially the same complex values. The situation of no doppler shift is just one special case of the generic operation of the temporal joint searcher and channel estimator described above. When the mobile starts to move, a doppler shift may occur, the temporal joint searcher and channel estimators obtains the doppler shift frequency, and thereby enhances the channel estimate. The channel estimate is enhanced by considering the doppler shift, regardless of the magnitude of the doppler shift.

The non-parametric FFT-type correlator and the parametric estimator techniques illustrated above, e.g., by FIG. 13A and FIG. 13B, respectively, are only two example techniques for finding the values or "tones" in antenna signal matrix 110. Other parametric approaches are described by or understood from Stocia, Petre and Moses, Randolph, *Introduction To Spectral Analysis*, ISBN-013-258419-0, Prentice Hall, which is incorporated by reference in its entirety, particularly Chapter 4 thereof.

Spatial-Temporal Joint Searchers/Estimators

In some further embodiments, which combine features from both the spatial and temporal embodiments discussed above, plural antenna elements of an antenna array provide respective plural series of signals for successive sets of pilot data. The joint searcher and channel estimators of these further embodiments essentially concurrently consider the plural series of signals provided by the plural antennas for determining both a time of arrival and channel coefficient.

By concurrently considering the signals provided by plural antennas, the channel estimate takes into consideration direction of arrival in determining the time of arrival and channel coefficient. By concurrently considering the series of signals provided by each antenna, in which each series comprises successive sets of pilot data, the channel estimate further takes into consideration a frequency shift which may be a doppler shift (occasioned by relative movement of a transmitter and the receiver or of an object in a field between the transmitter and receiver). The channel estimate is performed by considering spatial and temporal domain jointly and concurrently.

Since it processes the series of signals from plural antennas, with each series comprising successive sets of pilot data, the joint searcher and channel estimator is considered a three dimensional unit. A first dimension is with reference to a time index of a sampling window, i.e., a sampling window time index. A second dimension is a spatial dimension imparted by the spacing of the plural antennas of the array. This spatial dimension, which involves essentially simultaneous and concurrent processing together of signals from the plural antennas for the array in order to determine the time of arrival and channel coefficient, bestows on the joint searcher and channel estimator the distinction of being a "spatial" joint searcher and channel estimator. A third dimension is a temporal dimension imparted by the time interval reflected by the successive sets of pilot data. This temporal dimension, which involves essentially simultaneous and concurrent processing together of signals for each of the successive sets of pilot data in order to determine the time of arrival and channel coefficient, bestows on the joint searcher and channel estimator the distinction of being a "temporal" joint searcher and channel estimator. In view of being both a spatial and temporal joint searcher and channel estimator, the joint searcher and channel estimator is also referred to as a "combined" spatial/temporal joint searcher and channel estimator, or spatio/temporal joint searcher and channel estimator.

Concurrent consideration of the plural series of signals may be either in a three dimensional essentially concurrent mode or a sequenced mode. The three dimensional essentially concurrent mode involves a single step determination of the time of arrival and channel coefficient by simultaneously considering signals from all antennas of the array for all of the plural series. The sequenced mode involves a two step determination of the time of arrival and channel coefficient. In the sequenced mode, a first step comprises determining a time of arrival and direction of arrival by concurrently considering the plural signals provided by the plural antennas for a first of the plural series. A second step of the sequenced mode comprises refining the estimation of the channel coefficient based on doppler shift by concurrently considering the elements of the plural series having the direction of arrival determined in the first step. This procedure could also be performed the other way around: first determining the time of arrival and Doppler shift and then refining the channel estimate by concurrently considering the elements of the plural series having the Doppler shift determined in the first step.

Figure 18A:
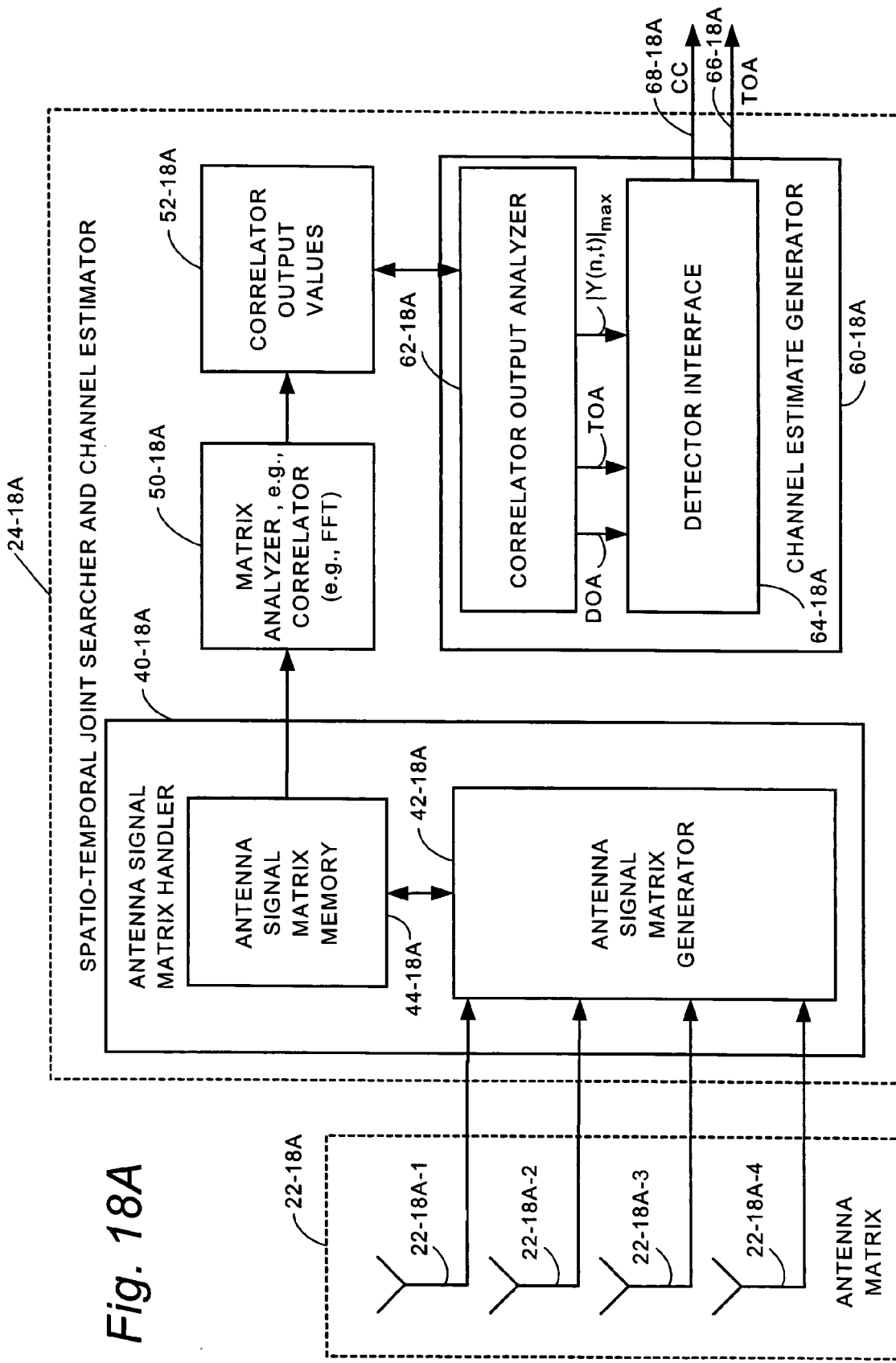
FIG. 18A is a schematic view of an example embodiment of a spatio-temporal joint searcher and channel estimator shown with an antenna array, the spatio-temporal joint searcher and channel estimator comprising a matrix analyzer which employs a non-parametric analysis technique.

FIG. 18A illustrates one example embodiment of a spatio-temporal joint searcher and channel estimator 24-13A, as well as an associated example antenna array 22-18A. The antenna array 22-18A includes, by way of non-limiting example, four antenna elements 22-18A-1 through 22-18A-4. While the antenna elements 22-18A-1 through 22-18A-4 are shown as forming a uniform linear array (ULA), it should be understood that antenna configurations other than a uniform linear are possible, and that the number of antenna elements in the antenna array may vary (e.g., the number of antenna elements is not limited to four). After suitable radio frequency processing, the signals obtained from the antenna elements are each applied as baseband signals to joint searcher and channel estimator 24-18A, as well as to a detector (not illustrated in FIG. 18A).

The joint searcher and channel estimator 24-18A comprises an antenna signal matrix handling unit 40-18A. In one particular example manifestation, antenna signal matrix handling unit 40-18A includes antenna signal matrix generator 42-18A and antenna signal matrix memory 44-18A. A matrix analyzer, which for the non-parametric technique of FIG. 18A can be a correlator 50-18A, operates on complex values stored in antenna signal matrix memory 44-18A. The correlator 50-18A preferably comprises a filter. The correlator 50-18A generates certain output values, which may be stored, e.g., in correlator output value memory 52-18A. The joint searcher and channel estimator 24-18A further comprises a channel estimate (CE) generator 60-18A. In the illustrated example embodiment, the channel estimate (CE) generator 60-18A comprises a correlator output analyzer 62-18A and a detector interface 64-18A. The detector interface 64-18A generates, for each wavefront, a channel estimate which includes both a time of arrival (TOA) and a channel coefficient (CC). In FIG. 18A, the time of arrival and channel coefficient output by detector interface 64 are applied to the detector on lines 66-18A and 68-18A, respectively.

In the joint searcher and channel estimator 24-18A of FIG. 18A, for each series of sets of pilot data (represented by pilot data sets T1-T4), the antenna matrix handling unit 40-18A samples the signals from each antenna element. Using the sampled signals, antenna signal matrix generator 42-18A generates an antenna signal matrix such as antenna signal matrix 130 illustrated in FIG. 19. The antenna signal matrix 130 may be stored in any convenient fashion, such as antenna matrix memory 44-18A.

The antenna signal matrix 130 is a three dimensional functionally dependent matrix. In other words, complex samples are stored in antenna signal matrix 130 as a function of three different indexes. For the antenna signal matrix 130 shown in FIG. 19, a first index is a sampling window time index, illustrated along the X axis of FIG. 19. For embodiments which utilize spreading codes or similar codes, the first index may be, for example, a chip index. Thus, the sampling window time index points to a time in the sampling window relative to a start of the sampling window.

Figure 19:
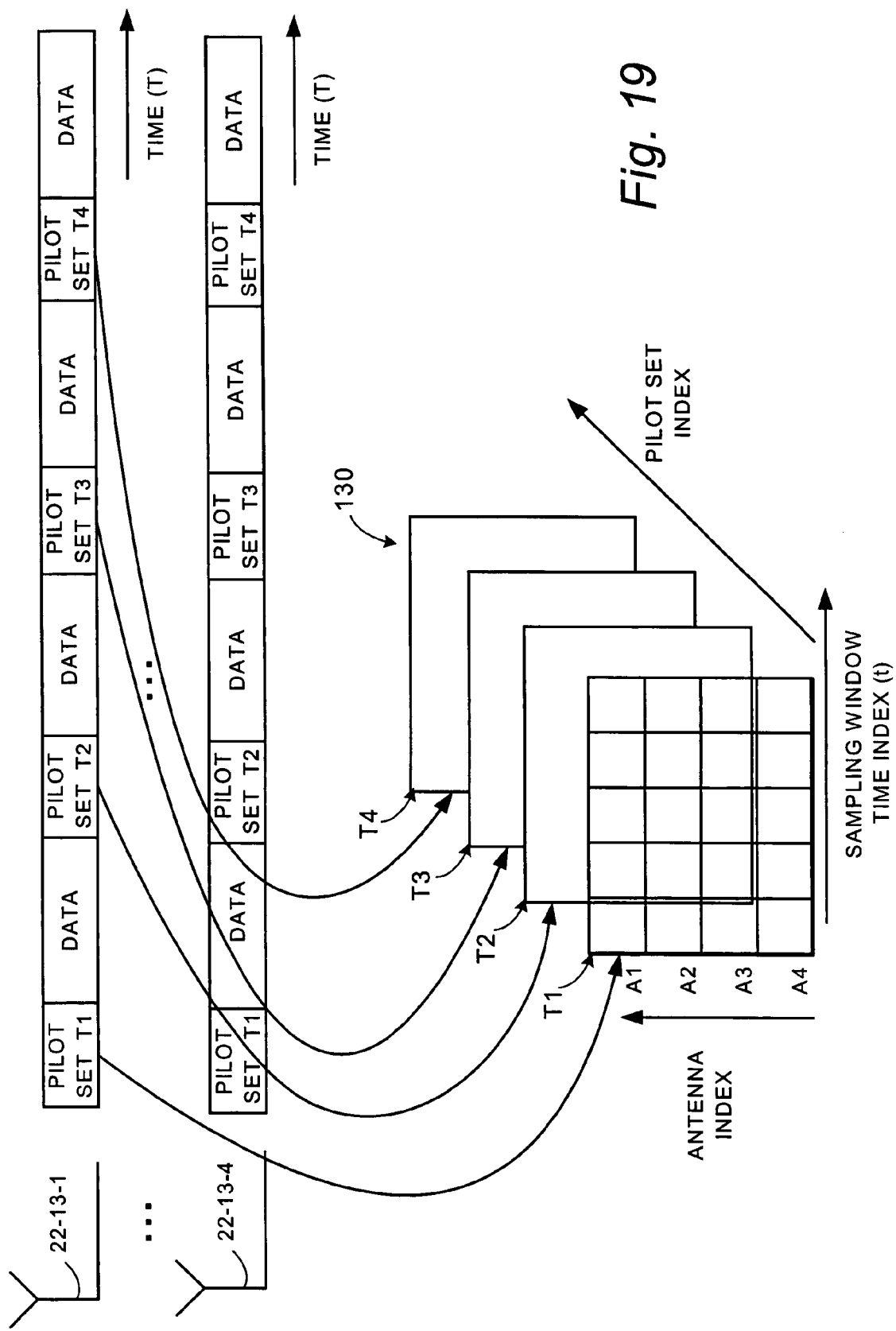
FIG. 19 is a diagrammatic view depicting a sequence of sets of pilot data and user data received by a receiver which utilizes a combined spatial/temporal joint searcher and channel estimator, as well as an antenna signal matrix utilized thereby.

In the antenna signal matrix 130 of FIG. 19, a second index, shown along the Y axis, is an antenna index. The antenna index points to a different row of the antenna signal matrix 130, each row being associated with a different antenna element in antenna array 22. FIG. 19 shows four rows in antenna signal matrix 130 for consistency with the previous examples of an antenna array comprising four antenna elements. It is reiterated, however, that the number of antennas in an antenna array, and thus the number of rows in antenna signal matrix 130 and the maximum value of the antenna index, can vary from receiver to receiver, and that the choice of four antenna is only illustrative for sake of example.

In the antenna signal matrix 130 of FIG. 19, a third index, shown along the Z axis, is a pilot set index. The pilot set index indicates which one of the sets of pilot data the sample was obtained. In other words, a pilot set index=T1 indicates that the sample was obtained from pilot set T1; a pilot set index=T2 indicates that the sample was obtained from pilot set T2; and so on as depicted by the arrows which connect the matrix 110 with the received signal depiction with its illustrative successive sets of pilot data. As can be seen, the pilot set index points to a different plane of the antenna signal matrix 110, each plane being associated with a different set of pilot data.

FIG. 19 shows four planes in antenna signal matrix 130 for consistency with the illustrated example wherein the antenna signal matrix encompasses four successive sets of pilot data. The number of sets of pilot data subsumed in a given antenna signal matrix, and thus the maximum value of the pilot set index, can vary from receiver to receiver, so that the present example's choice of four sets of pilot data is only illustrative for sake of example. In general, the choice of the number of sets of pilot data to be apprehended simultaneously by a spatio-temporal spatial/temporal joint searcher and channel estimator depends on how quickly the doppler is expected to change. The number of taps/incident waves depends on the multipath. In other words in an open space we have one direct path and thus only one channel/tap coefficient in the channel impulse response.

For sake of simplicity, the complex values stored in antenna signal matrix 130, including the complex values obtained from the antennas, are not illustrated in FIG. 19. Such complex values would be illustrated in a fourth dimension.

In conjunction with the antenna signal matrix 130 of FIG. 19, and particularly a WCDMA case in which spacing of the antenna elements in the antenna array is not too far apart, the plane wavefront arriving at the antenna array can be considered to arrive in the same sampling window time index (or chip index).

Assuming that the wavefront arrives at the antenna elements at different times (the time differences are small in comparison to the sampling time interval), the complex values stored for each column of the antenna signal matrix 130 of FIG. 19 have differing phase (e.g., θ) values in each row of the column. For a uniformly spaced array of antenna elements, the phase difference is essentially the same between adjacent rows of the same column (although noise may be a factor). But whatever the spacing, the rate of change of the phase with respect to time (time of travel of the approaching wavefront) is the phase rotation speed, or frequency, for the vector formed by the column, as previously explained. This per column frequency can be interpreted as a direction of arrival (DOA). There are plural possible frequencies for the columns of antenna signal matrix 130, with each of the plural possible frequencies corresponding to a possible direction of arrival (DOA) of a wavefront. The plural possible direction of arrival frequencies are represented by a frequency index "$n_1$".

In a similar manner, for each slice of antenna signal matrix 130 along the Z" direction the complex values have differing phase (e.g., θ) values. The Z-aligned elements of differing "Z" planes of antenna signal matrix 130 have differing phase values in view of a possible doppler shift as detected by the different sets of pilot data as gathered over plural sets of pilot data in a series. The rate of change over time of the phase along the Z direction between successive sets of pilot data is a frequency which is associated with the doppler shift. There are plural possible frequencies for the Z slices of antenna signal matrix 130, with each of the plural possible frequencies corresponding to a possible doppler shift (DS) for wavefront. The plural possible doppler shift frequencies are represented by a frequency index "$n_2$".

The channel estimate generator 60-18A (see FIG. 18A) seeks to develop a "composite" channel estimate based on the complex values stored in antenna signal matrix 130. As mentioned before, since an antenna array such as antenna array 22-18A has plural antenna elements, there are a corresponding plurality of channels through which wavefronts are received, and accordingly there could also be a separate channel impulse response or separate channel estimate for each of the plural channels. But by storing the complex samples in antenna signal matrix 130 in the manner aforedescribed, and by concurrently finding the time of arrival (TOA) and channel coefficients over the entire antenna signal matrix 130, the channel estimate generator 60-18A provides a channel estimate which encompasses all channels for all antenna elements and for this reason is known as a "composite" channel estimate.

The composite channel estimate comprises, as mentioned before, a time of arrival (TOA) and channel coefficient for each arriving wavefront in the sampling window (e.g., a channel coefficient mapped to a time of arrival (TOA)). Therefore, the channel estimate may comprise a set (of one or more) pairs of data, each pair including a time of arrival (TOA) and channel coefficient. The task for correlator 50-18A is thus to locate a value or "tone" in antenna signal matrix 130 that best corresponds to an arriving wavefront, e.g., to locate a value or tone for each arriving wavefront in the sampling window.

The task of locating, in an antenna signal matrix such as antenna signal matrix 130, a value or "tone" that best corresponds to an arriving wavefront can be accomplished by various techniques, including both parametric and non-parametric techniques. A Fast Fourier Transform (FFT)) performed in a three dimensional essentially concurrent mode is discussed below in conjunction with as just one representative and illustrative example of a non-parametric technique wherein correlator 50-18A is utilized.

Figure 20:
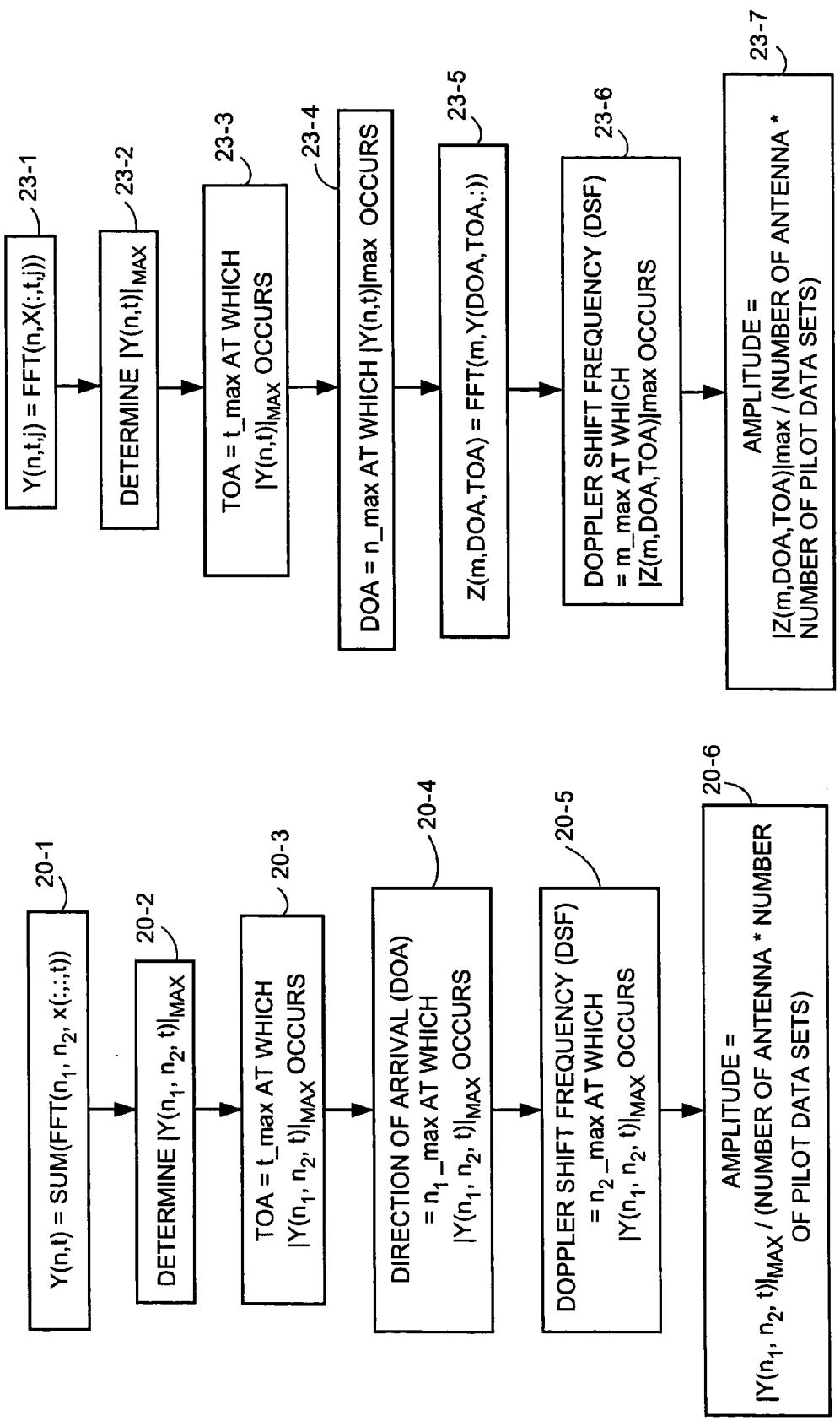
FIG. 20 is a flowcharting showing representative basic steps performed by a matrix analyzer and channel estimate generator of an example embodiment of a spatio-temporal joint searcher and channel estimator, with the matrix analyzer using a non-parametric analysis technique.
Figure 21:
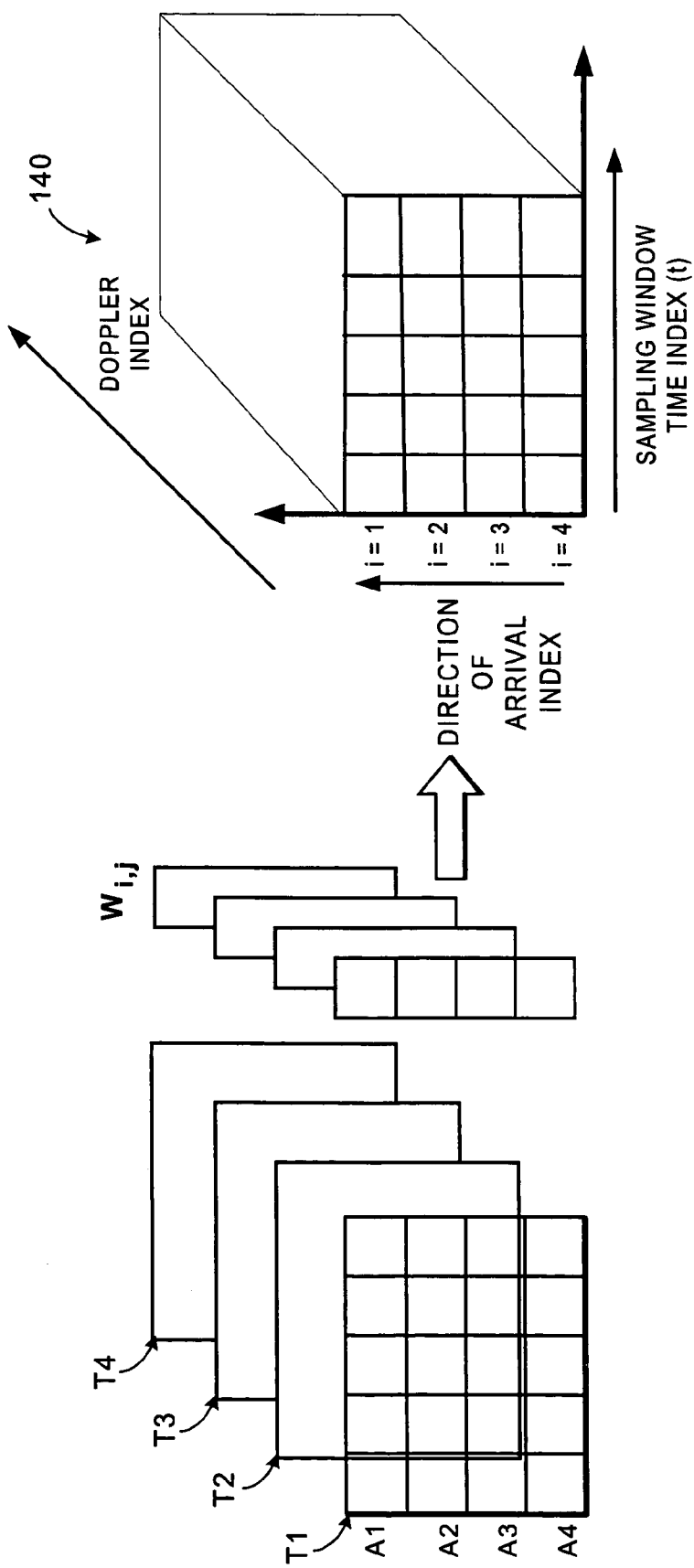
FIG. 21 is a diagrammatic view of an antenna signal matrix; a doppler weight and antenna weight vector; and a non-parametric estimation output vector for an example embodiment of a spatio-temporal joint searcher and channel estimator which operates in a three dimensional essentially concurrent mode.

FIG. 20 depicts example basic steps performed by an example correlator 50-18A and analyzer 62-18A in conjunction with the Fast Fourier Transform (FFT) calculation. In conjunction with FIG. 20, FIG. 21 shows an antenna signal matrix; a doppler weight and antenna weight vector; and a non-parametric estimation output vector for an example embodiment of a spatio-temporal joint searcher and channel estimator which operates in a three dimensional essentially concurrent mode. As step 20-1, the correlator 50-18A of FIG. 18A calculates Expression 8.

$$Y(n_1,n_2,t)=FFT(n_1,n_2,X(:,:,t)) \qquad \text{Expression 8}$$

In Expression 8, t is the sampling window time index; $X(:,:,t)$ is the complex antenna matrix (with the colon ":,:" representing all antenna indexes for one sampling window time index); $n_1$ is the direction of arrival frequency index; and $n_2$ is the doppler shift index. Each FFT calculation is thus a two dimensional FFT calculation on the baseband signal, corresponding both to a specific direction of arrival (as depicted by the frequency index $n_1$) and to a specific doppler shift (as depicted by the frequency index $n_2$).

The output of correlator 50-18A, i.e., the $Y(n_1,n_2,t)$ values computed using Expression 8, are stored as correlator output values. The correlator output values can be stored, for example, in the correlator output value memory 52-18A of FIG. 18A.

The correlator output analyzer 62-18A of channel estimate (CE) generator 60-18A searches the correlator output values $Y(n_1,n_2,t)$ and (as step 20-2) determines therefrom a maximum absolute value $|Y(n_1,n_2,t)|_{max}$. This maximum absolute value $|Y(n_1,n_2,t)|_{max}$ is utilized by correlator output analyzer 62-18A to determine both the direction of arrival (DOA) and time of arrival (TOA) for an arriving wavefront seen in the sampling window. In particular, as step 20-3 the correlator output analyzer 62-18A chooses a sampling window time index t_max at which $|Y(n_1,n_2,t)|_{max}$ occurs to be the time of arrival of the arriving wavefront. In addition, as step 20-4 the correlator output analyzer 62-18A chooses the frequency index $n_1$__max at which $|Y(n_1,n_2,t)|_{max}$ occurs to determine the direction of arrival (DOA) of the arriving wavefront. Further, as step 20-5 the correlator output analyzer 62-18A chooses the index $n_2$__max at which $|Y(n_1,n_2,t)|_{max}$ occurs to determine the doppler shift of the arriving wavefront. An amplitude for the arriving wavefront is determined as the correlator output analyzer 62-18A divides $|Y(n_1,n_2,t)|_{max}$ by the product of the number of antennas comprising the antenna array and the number of sets of pilot data included in the matrix 130 (as step 20-6).

Expression 8 and the steps of FIG. 20 represent a generic FFT calculation. In a CDMA-specific situation which utilizes a coding generator (such as coding generator 30 of FIG. 1), a comparable FFT calculation can be made using a refinement of Expression 8 which appears as Expression 9.

$$Y(n_1,n_2,t)=\Sigma C_j * FFT(n_1,n_2,X(:,:,t)), j=1,K \quad \text{Expression 9}$$

Expression 9 is understood from Expression 1, it being further mentioned that $C_j$ is a coding sequence symbol value j; and K is a length of the coding sequence.

As a result of operation of spatio-temporal joint searcher and channel estimator 24-18A, an accurate channel estimate can be provided to the detector as a spatio-temporal spatial and temporal signature. The spatial signature includes the direction of arrival; the temporal signature includes the doppler shift. The channel coefficient (CC) for each time of arrival and antenna element is derived from the direction of arrival (DOA) and the doppler shift. The time of arrival (TOA) and channel coefficient (CC) are applied to the detector as represented by lines 66-18A and 68-18A, respectively, in FIG. 18A.

As mentioned above, the channel coefficient (CC) for each wavefront is derived from the direction of arrival (DOA) and doppler shift (DS). Recall that at step 18-4 analyzer 62-18A chose the frequency index $n_1$__max at which $|Y(n_1,n_2,t)|_{max}$ occurs to represent the direction of arrival (DOA) of the arriving wavefront, with the chosen frequency index corresponding to a direction of arrival (e.g., θ). Further, analyzer 62-18A chose the frequency index $n_2$__max at which $|Y(n_1,n_2,t)|_{max}$ occurs to represent the doppler shift of the arriving wavefront, with the chosen frequency index corresponding to a doppler shift. The channel impulse response vector (i.e., array propagation vector) x is therefore generated by detector interface 64-18A in accordance with Expression 10 (for identical isotropic antenna elements).

$$x = [(1, e^{(jkd*\sin\theta)}, e^{(jkd*2\sin\theta)}, \ldots e^{(jkd*(K-1)\sin\theta)}]^* C0;$$

$$(1, e^{(jkd*\sin\theta)}, e^{(jkd*2\sin\theta)}, \ldots e^{(jkd*(K-1)\sin\theta)}]^* C1; \ldots$$

$$(1, e^{(jkd*\sin\theta)}, e^{(jkd*2\sin\theta)}, \ldots e^{(jkd*(K-1)\sin\theta)}]^* CN \quad \text{Expression 10}$$

In Expression 10, $CN = e^{j2\pi f TN = H}$, with H and other parameters being as previously defined.

In the foregoing description it is the role of channel estimate (CE) generator 60-18A, and particularly detector interface 64-18A, to generate both a time of arrival (TOA) and a channel coefficient (CC), the channel coefficient being derived from the direction of arrival and doppler shift, e.g., as above described in conjunction with Expression 11. In an alternate implementation of this and other embodiments described herein, the detector itself (such as detector 26 illustrated in FIG. 1), upon receiving the time of arrival (TOA), the direction of arrival (DOA), and the doppler shift for each arriving wavefront, may have the intelligence to compute the channel coefficient for each wavefront from the corresponding direction of arrival (DOA) and doppler shift information. In such case, the time of arrival, direction of arrival, and doppler shift are output by detector interface 64 to the detector.

The operation of the correlator 50-18A in calculating Expression 8 or Expression 9 is an example of a three dimensional essentially concurrent mode, since evaluation of Expression 8 (or Expression 9 for a WCDMA implementation) involves a single step determination of the time of arrival and channel coefficient by simultaneous considering signals from all antennas of the array for all of the plural series. In other words, in the illustrated example of the three dimensionally essentially concurrent mode, the Fast Fourier Transform (FFT) of Expression 8 or Expression 9 had three arguments: $n_1$, $n_2$, and X(:,:t), so that the FFT operated on all arguments essentially simultaneously.

In contrast to the three dimensional essentially concurrent mode, the sequenced mode involves a two step determination of the time of arrival and channel coefficient. In a first alternative way for implementing the sequenced mode, a first step comprises determining a time of arrival and direction of arrival by concurrently considering the plural signals provided by the plural antennas for a first of the plural series. For example, the first step of the first alternative of the sequenced mode can involve calculating a FFT such as that of Expression 1 (or, for WCDMA, Expression 2). From the results of the first step or first FFT calculation, a time of arrival (TOA) and tentative channel coefficient are determined. Then, as a second step of the first alternative of the sequenced mode, the tentative channel coefficient is refined by taking into consideration a possible frequency shift (e.g., doppler shift) by further considering the elements of the plural series having the direction of arrival determined in the first step. In a second alternative way of implementing the sequenced mode, the order of the steps is essentially reversed: first the FFT is performed in the temporal domain to decide time of arrival and tentative channel coefficient; and secondly the tentative channel coefficient is refined by FFT in the spatial domain.

The procedures of the first alternative implementation of the sequenced mode for the non-parametric technique are illustrated in FIG. 22A and FIG. 22B in conjunction with FIG. 23. FIG. 22A and FIG. 22B as a diagrammatic view of an antenna signal matrix; an antenna weight vector; and a non-parametric estimation output vector for an example embodiment of a sequential spatio-temporal joint searcher and channel estimator. In FIG. 22A, the FFT operates on the spatial domain and calculates the FFT (illustrated by the FFT vector Wi) for the antenna matrix for each time interval. The time of arrival is choosen by picking the direction of arrival index and time index with the highest absolute value. If this index does not coincide for all time intervals, the index can be chosen with some method, e.g. majority decision.

After having chosen the time of arrival index and direction of arrival index, these FFT-processed samples are further FFT-processed by a FFT calculation in the temporal domain (illustrated by FFT frequency vector Wj). FIG. 22B shows the spatially filtered samples for the identified time of arrival and direction (marked as grey in the figure) are filtered with the temporal vectors. After the second FFT, processing, the channel estimate is created from the sample with the highest magnitude. Step 23-1 through step 23-7 of FIG. 23 also describe the procedure of the first alternative implementation of the sequenced mode.

Figure 24A:
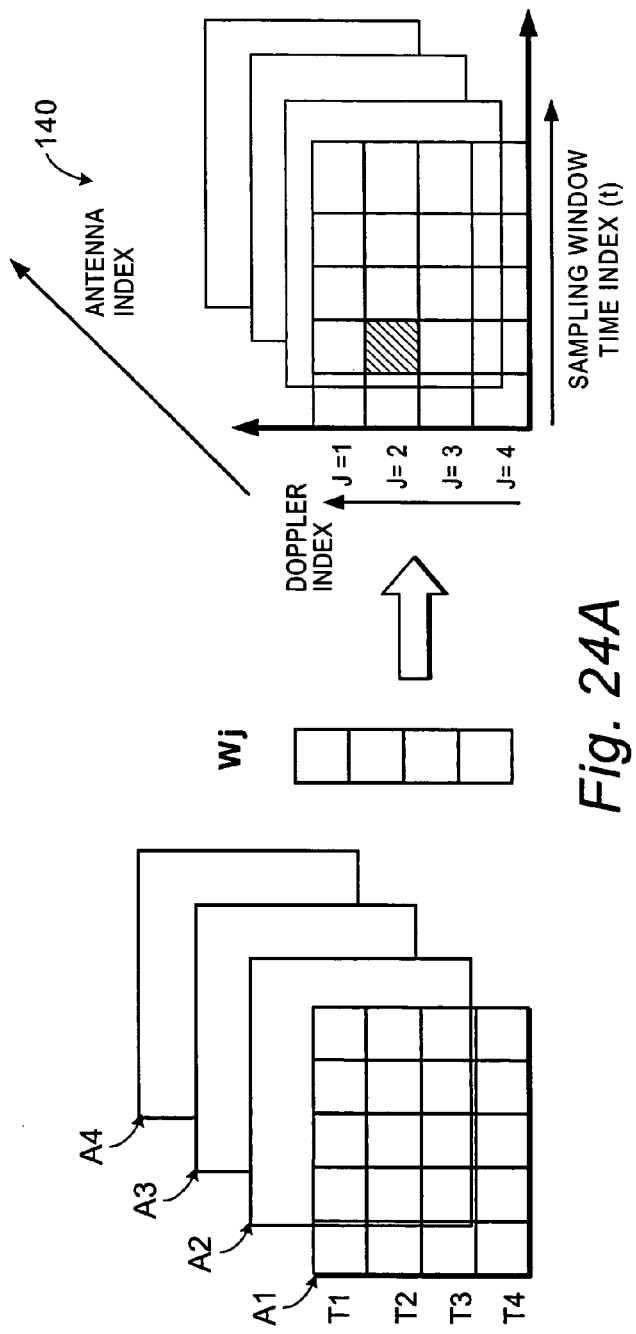
FIG. 24A and FIG. 24B are diagrammatic views depicting operation of a second alternative implementation of a non-parametric, sequential spatio-temporal joint searcher and channel estimator.
Figure 24B:
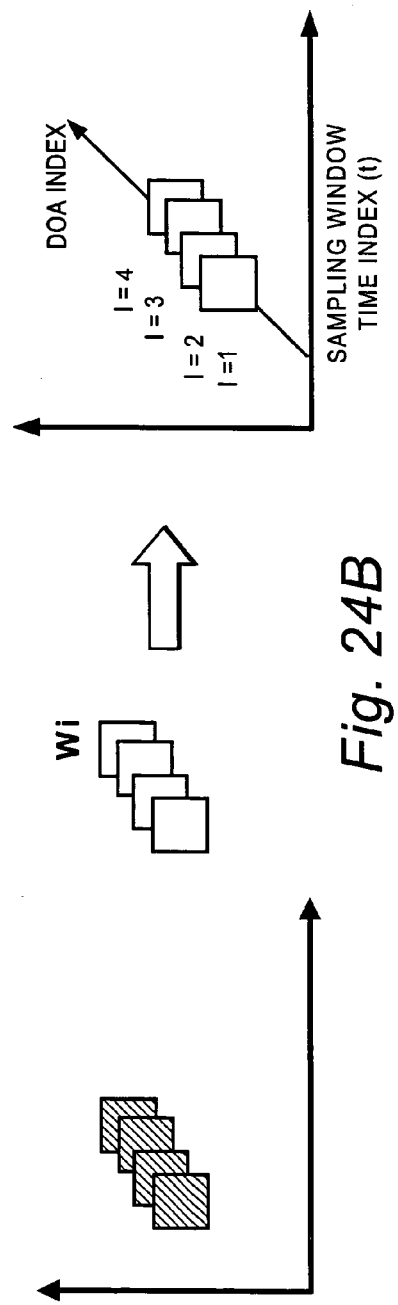
Figures 25, 27:
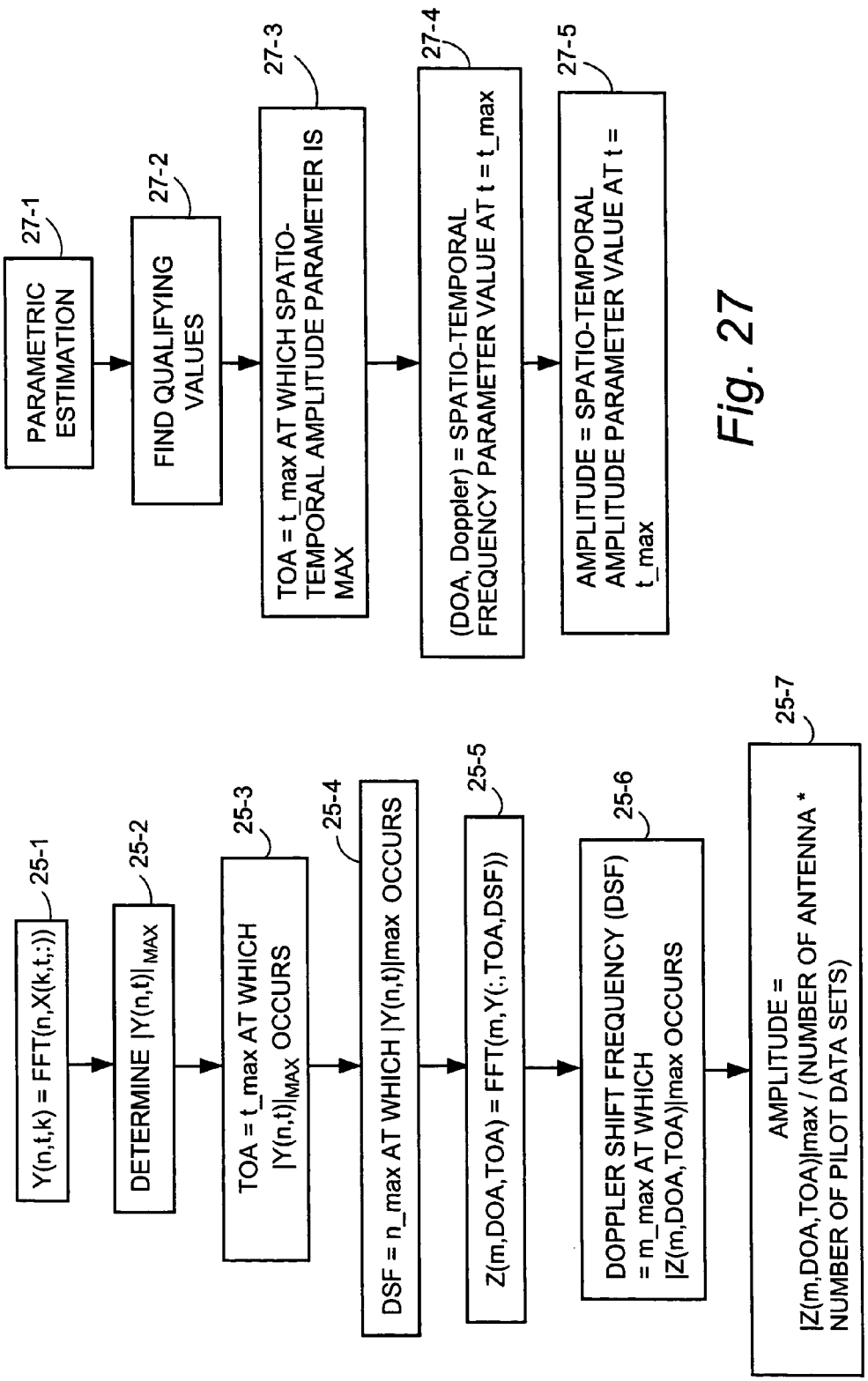
FIG. 25 describes the procedure of non-parmetric approach for spatio-temporal sequenced method where the temporal processing is followed by the spatial processing.
FIG. 27 is a flowcharting showing representative basic steps performed by a matrix analyzer and channel estimate generator of an example embodiment of a spatio-temporal joint searcher and channel estimator, with the matrix analyzer using a parametric analysis technique.

The procedures of the second alternative implementation of the sequenced mode for the non-parametric technique are illustrated in FIG. 24A and FIG. 24B in conjunction with FIG. 25. FIG. 24A and FIG. 24B show an antenna signal matrix; a Doppler weight vector; and a non-parametric estimation output vector. In FIG. 24A the FFT operates on the temporal domain and calculates the FFT, (illustrated by the FFT vector Wj) for the antenna matrix for each time interval. The time of arrival is chosen by picking the doppler index of and time index with the highest absolute value. If this index does not coincide for all time intervals, the index can be chosen with some method, e.g. majority decision. After having chosen the time of arrival index and doppler index, these FFT-processed samples are further FFT-processed by a FFT calculation in the spatial domain (illustrated by FFT frequency vector Wi). FIG. 24B shows the spatially filtered samples for the identified time of arrival and Doppler shift (marked as grey in the figure) are filtered with the spatial vectors. After the second FFT processing, the channel estimate is created from the sample with the highest magnitude. Step 25-1 through step 25-7 of FIG. 25 also describe the procedure of the second alternative implementation of the sequenced mode.

Figure 18B:
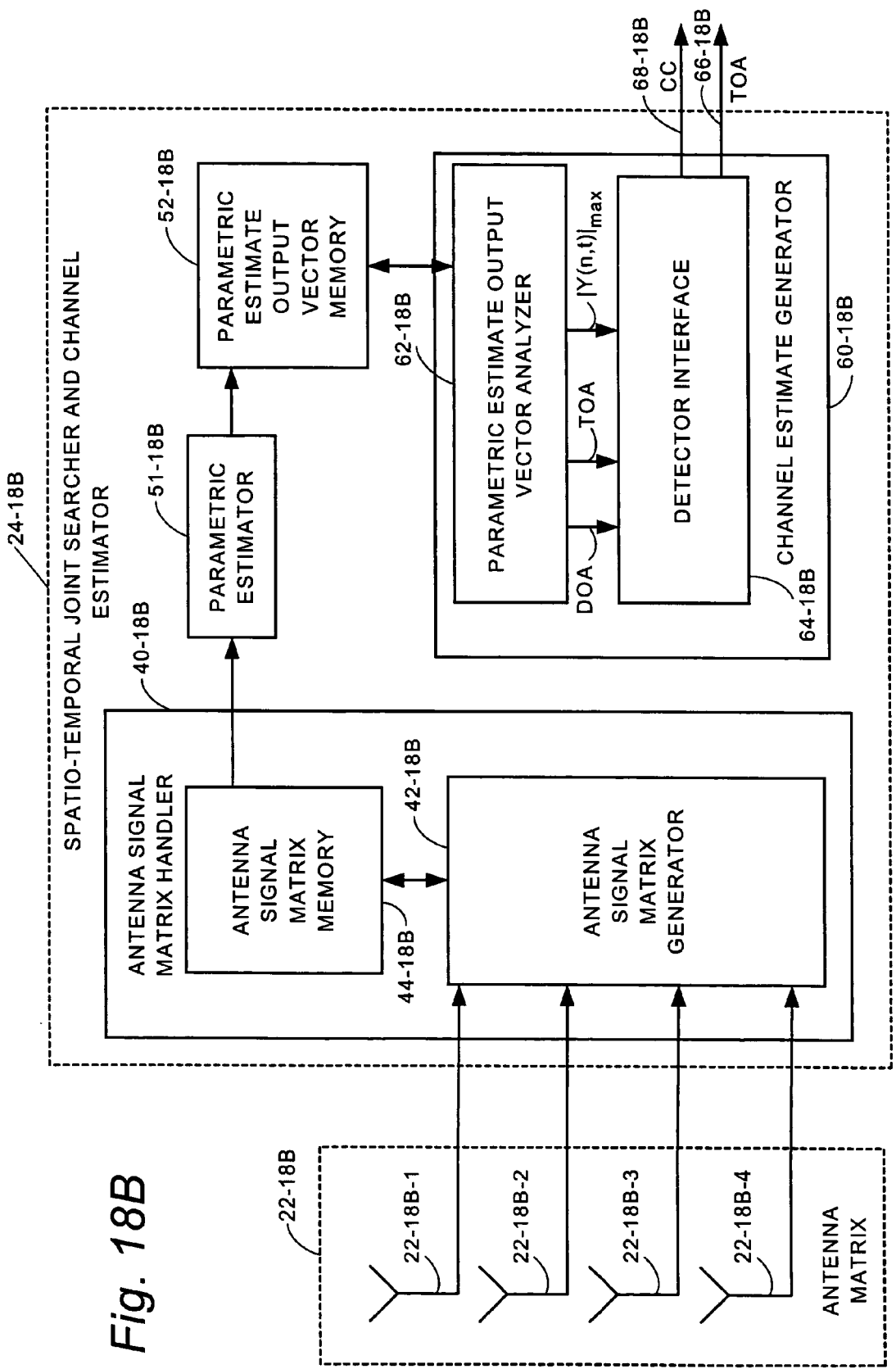
FIG. 18B is a schematic view of an example embodiment of a spatio-temporal joint searcher and channel estimator shown with an antenna array, the spatio-temporal joint searcher and channel estimator comprising a matrix analyzer which employs a parametric analysis technique.

Whereas the joint searcher and channel estimator of FIG. 18A includes a non-parametric type correlator (e.g., a filter which performs a Fast Fourier Transform (FFT) calculation), in other example embodiments the joint searcher and channel estimator implements parametric techniques. As does the FIG. 18A embodiment, the parametric temporal joint searcher and channel estimator 24-18B of FIG. 18B is shown along with its associated example antenna array 22-18B. Again by way of example, antenna array 22-18B includes four antenna elements 22-18B-1 through 22-18B-4. The signals obtained from the antenna elements are each applied to joint searcher and channel estimator 24-18B, as well as to a detector (not illustrated in FIG. 18B).

Similarly to the earlier described embodiment, joint searcher and channel estimator 24-18B can comprise an antenna signal matrix handling unit 40-18B, which in turn comprises antenna signal matrix generator 42-18B and antenna signal matrix memory 44-18B, which function much in the manner previously described. For example, the complex baseband values stored in antenna signal matrix memory 44-18B can also be conceptualized as matrix 130, and as such has a sampling window time index. The antenna signal matrix 80 has been previously discussed in conjunction with FIG. 19.

Figure 26:
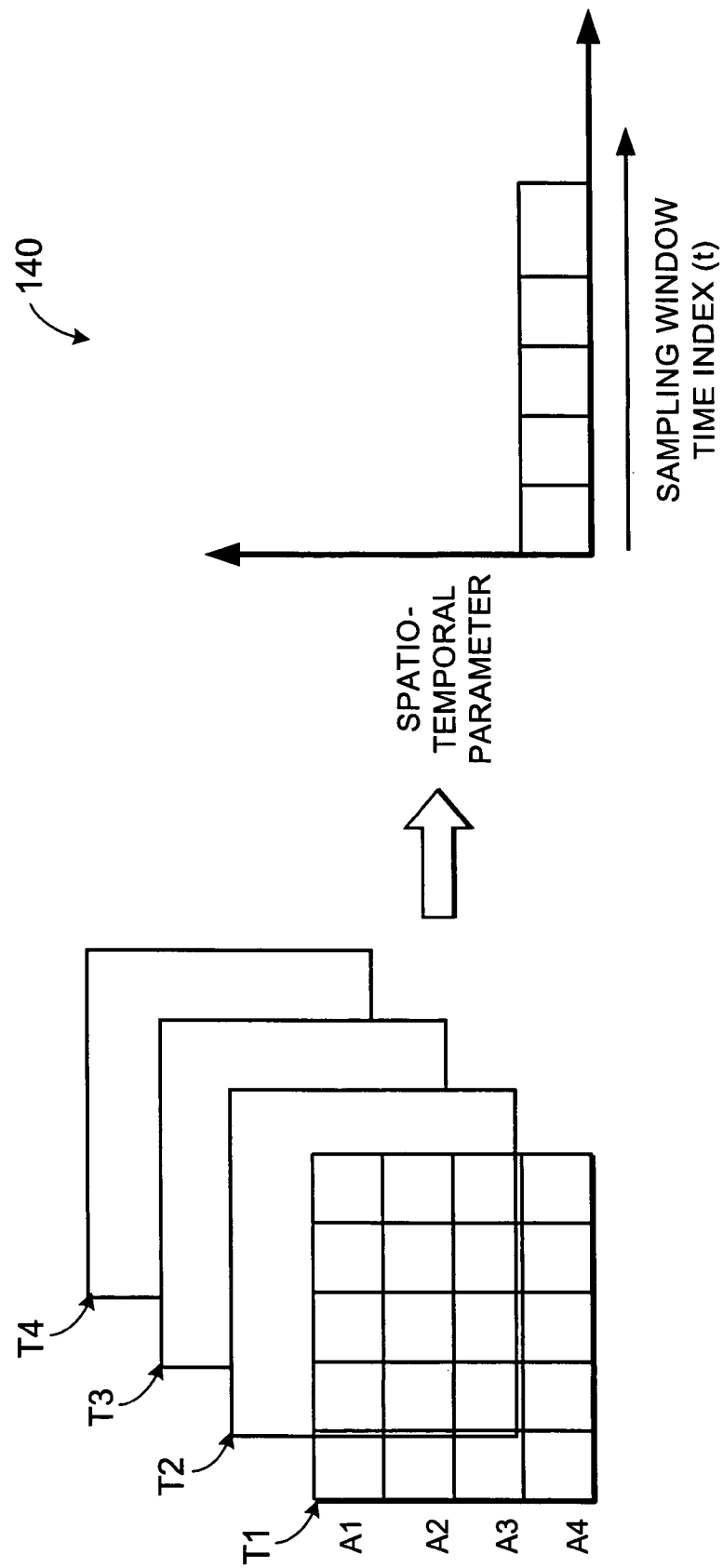
FIG. 26 is a diagrammatic view of an antenna signal matrix and a parametric estimation output vector for an example embodiment of a spatio-temporal joint searcher and channel estimator.

The joint searcher and channel estimator 24-18B further comprises a parametric estimator 51-18B which produces a parametric estimation output vector. In addition, in similar manner as the preceding embodiment, joint searcher and channel estimator 24-18B comprises a channel estimate generator 60-18B which has parametric output estimation vector analyzer 62-18B and a demodulator interface 64-18B FIG. 26 shows an antenna signal matrix and a parametric estimation output vector for an example embodiment of a spatio-temporal joint searcher and channel estimator. As with the non-parametric techniques, the parametric techniques can be implemented either in a three dimensional essentially concurrent mode or in a sequenced mode, with the sequence mode having two alternative implementations.

FIG. 27 shows basic, representative steps involved in a parametric three dimensional essentially concurrent mode. Step 27-1 shows the joint searcher and channel estimator 24-18B producing a parametric estimation output vector. Then, as step 27-2, analyzer 62-18B finds the "qualifying" values in the parametric estimation output vector.

For each qualifying value, as step 27-3 the parametric output estimation vector analyzer 62-18B chooses a time of arrival (TOA) as corresponding to the sampling window time index t for the qualifying value, e.g., the time index at which the maximum/qualifying absolute value of the parametric estimation output vector occurs.

For each qualifying value, as step 27-4 the parametric output estimation vector analyzer 62-18B chooses a spatio-temporal frequency parameter corresponding to the spatio-temporal frequency for the maximum/qualifying absolute value of the parametric estimation output vector.

As step 27-5, the parametric estimation output vector analyzer 62-13B determines the amplitude as the value for the spatio-temporal amplitude value for the time of arrival decided in step 27-2.

It should be understood from the foregoing that information indicative of more than one incident wavefront may be seen in a sampling window. For example, with reference to the parametric estimate output vector 140 of FIG. 26, the parametric output estimation vector analyzer 62-18B may see other (e.g., plural) high numbers, and for each of those high numbers which qualify, an arriving wavefront may be ascertained.

Figures 29, 31:
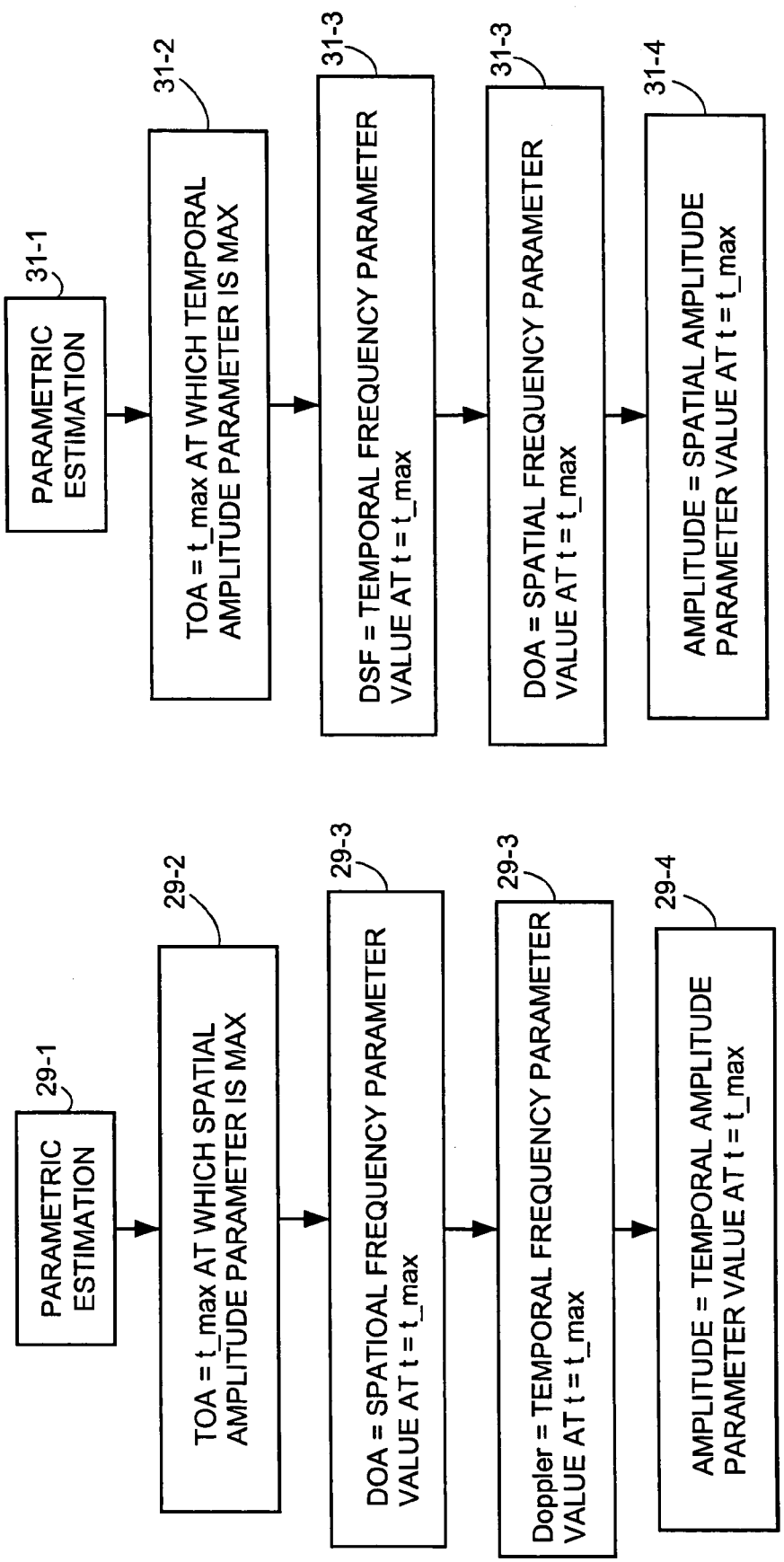
FIG. 29 describes the procedure of the parametric approach for spatio-temporal sequenced method where the spatial processing is followed by the temporal processing.
FIG. 31 describes the procedure of the parametric approach for spatio-temporal sequenced method where the temporal processing is followed by the spatial processing.
Figure 32:
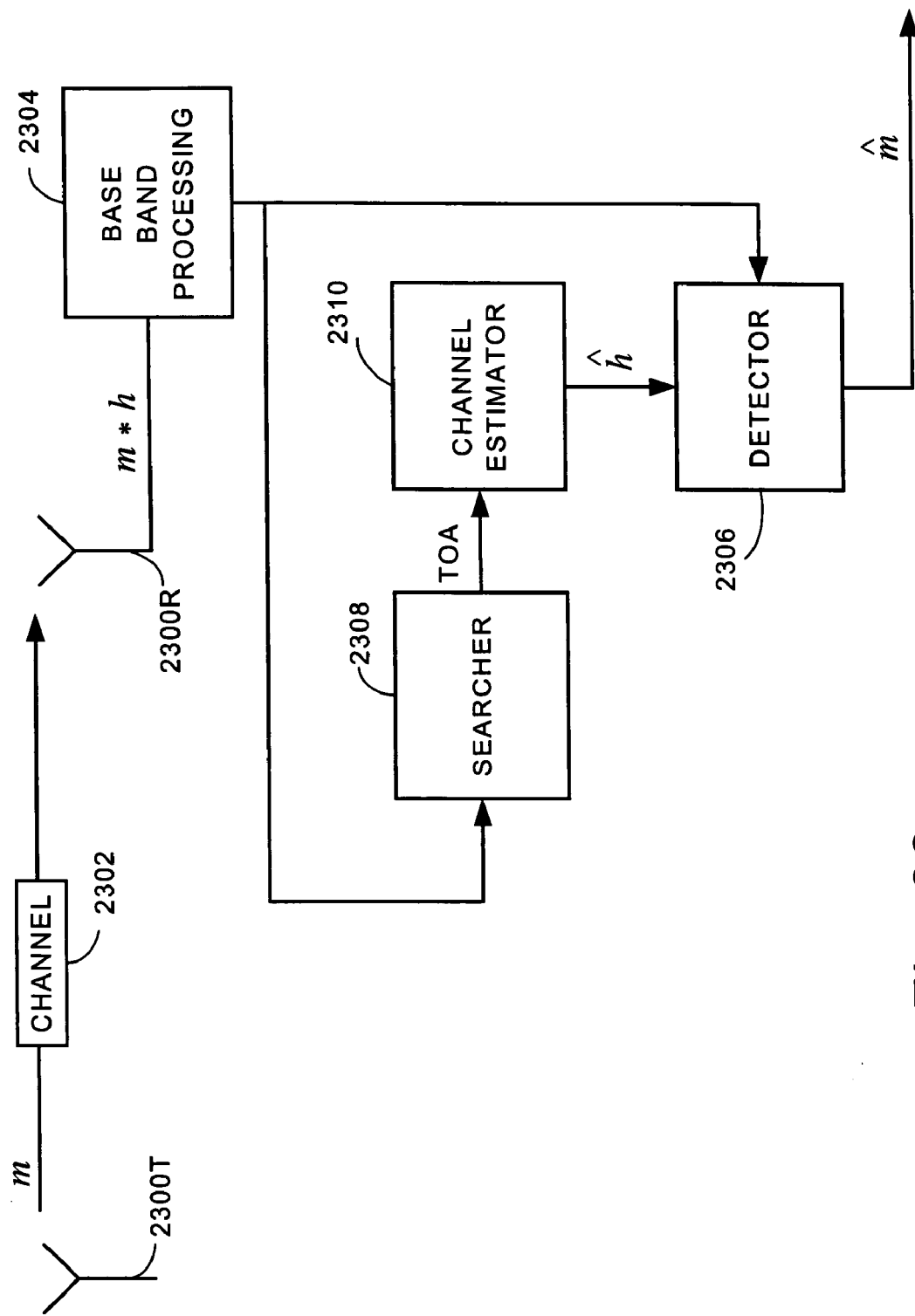
FIG. 32 is a schematic view of a conventional wireless telecommunications receiver.

The procedures of the first alternative implementation of the sequenced mode for the parametric technique are illustrated in FIG. 28A and FIG. 28B in conjunction with FIG. 29. FIG. 28A and FIG. 28B depict a parametric, sequential spatio-temporal joint searcher and channel estimator for this first alternative implementation. In FIG. 28A and FIG. 28B the parametric approach first operates on the spatial domain and calculates the spatial frequency parameters for each time instant over the time transmission intervals. The time of arrival is chosen by picking the spatial frequency amplitude value with the highest absolute value. The direction of arrival, DOA, is the value of the spatial frequency parameter. If this time of arrival does not coincide for all the time intervals, the time of arrival can be chosen with some method, e.g. majority decision. As shown in FIG. 28B, after having chosen the time of arrival index and direction of arrival, these samples are processed by the parametric approach applied in the temporal domain. After the second processing, the channel estimate is created from the temporal parameters. Step 29-1 through step 29-5 of FIG. 29 also describe the procedure of the first alternative implementation of the parametric sequenced mode.

FIG. 30A and FIG. 30B show a parametric, sequential spatio-temporal joint searcher and channel estimator for a second alternative implementation of a parametric, sequential spatio-temporal joint searcher and channel estimator. In FIG. 30A and FIG. 30B the paremetric approach first operates on the temporal domain and calculates the temporal frequency parameters for each time instant over the time transmission intervals. The time of arrival is chosen by picking the temporal frequency amplitude value with the highest absolute value. The Doppler shift frequency, DSF is the value of the temporal frequency parameter. If this time of arrival does not coincide for all the time intervals, the time of arrival can be chosen with some method, e.g. majority decision. As shown in FIG. 30B, after have chosen the time of arrival index and DSF, these samples are processed by parametric approach applied in the spatial domain. After the second processing, the channel estimate is created from the spatial parameters. Step 31-1 through step 31-7 of FIG. 31 also describe the procedure of the second alternative implementation of the parametric sequenced mode.

The non-parametric FFT-type correlator and the parametric linear combination logic techniques illustrated above are only two example techniques for finding the values or "tones" in antenna signal matrix 130 which are associated with arriving wavefronts. Other parametric approaches are described by or understood from Stocia, Petre and Moses, Randolph, *Introduction To Spectral Analysis*, ISBN-013-258419-0, Prentice Hall, which is incorporated by reference in its entirety, particularly Chapter 4 thereof.

The spatio-temporal joint searcher and channel estimator and techniques of operation thereof as described above are suitable for any receiver unit which has plural receiving antennas. Thus, the spatial joint searcher and channel estimator is particularly well suited for, but not limited to, a base station which has plural antennas. The spatio-temporal joint searcher and channel estimator and techniques of operation thereof also encompasses mobile terminals which have plural antennas.

The joint searcher and channel estimators thus employ a multi-dimensional and optimum detection and estimation approach. The multi-dimensional joint searcher and channel estimators typified by those described herein have better performance than traditional one dimensional searchers. The multi-dimensional joint searcher and channel estimators have a greater SNIR for detecting time of arrival, which increases the probability of that the correct time of arrival will be ascertained. This, in turn, leads to a better channel estimate.

In terms of implementation, the blocks, units, and functionalities of the differing embodiments of the joint searcher and channel estimator herein described can various forms. For example, those skilled in the art will appreciate that one or more of the functionalities of the joint searcher and channel estimator can be implemented using individual hardware circuits, using software functioning in conjunction with a suitably programmed digital microprocessor or general purpose computer, using an application specific integrated circuit (ASIC), and/or using one or more digital signal processors (DSPs). Furthermore, the functionalities of the joint searcher and channel estimator need not be delineated specifically in the manners illustrated, it being understood (for example) that the functionalities can be distributed, combined, subdivided, or otherwise rearranged for accomplishing essentially the same results.

Use and operation of the joint searcher and channel estimators is not confined to WCDMA transmission, although in some instances WCDMA has been described above as an example environment of implementation. The principles, techniques, methods, and apparatus described herein can be adapted or augmented for compatibility with various types of networks, not only WCDMA, but other networks as well (such as GSM, for example).

In the foregoing, it will be appreciated that other aspects of wireless receiver structure and operation which are tangential to matters described above have been omitted for clarity. Such aspects, well understood by persons skilled in the art, include without limitation pulse shaping, sampling frequency, time jitter, time alignment, demodulation, inter symbol interference (ISI), and co channel interference (CCI).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wireless communication receiver comprising:
   an antenna structure arranged to acquire dimensionally differentiated signals;
   a joint searcher and channel estimator arranged to essentially concurrently consider the dimensionally differentiated plural signals provided by the antenna structure for determining both a time of arrival and channel coefficient;
   wherein the joint searcher and channel estimator comprises:
      an antenna signal matrix in which complex values indicative of the dimensionally differentiated signal received in a sampling window are stored as a function of a sampling window time index and a dimensional differentiation index;
      a correlator arranged to locate value(s) in the antenna signal matrix for use in determining the time of arrival and the channel coefficient and to generate a correlator output;
      a correlator output analyzer arranged to use the value(s) located by the correlator to generate the time of arrival and the channel coefficient;
      wherein in locating the values the correlator output analyzer considers a dimensional reception vector formed from the antenna signal matrix with respect to a sampling window time index, the dimensional receptivity vector having a frequency related to a difference between phase components of complex values of the dimensional receptivity vector, there being plural possible frequencies for the dimensional receptivity, the plural possible frequencies being represented by a frequency index; and
      wherein for each combination of plural possible frequencies and plural time indexes, the correlator is arranged to calculate:
   $Y(n,t) = FFT(n, X(:,t))$
   wherein t is the sampling window time index;
   $X(:,t)$ is the complex antenna matrix, with : representing all antenna indexes for one sampling window time index;
   n is the frequency index.

2. The apparatus of 1, wherein the antenna structure comprises an array of plural antennas, and wherein the signals acquired by different antennas of the array are dimensionally differentiated with regard to a spatial dimension.

3. The apparatus of 2, wherein the antenna array comprises a uniform linear array of plural antennas.

4. The apparatus of 1, wherein the time channel coefficient is a composite channel coefficient which takes into consideration channel impulse responses for channels associated with each of the plural antennas in the antenna array.

5. The apparatus of 1, further comprising a detector arranged to utilize the channel coefficient and the time of arrival to provide a symbol estimate.

6. The apparatus of 1, wherein the wireless communication receiver is a mobile terminal.

7. The apparatus of 1, wherein the wireless communication receiver is a network node.

8. The apparatus of 1, wherein for each combination of plural possible frequencies and plural time indexes, the correlator is further arranged to calculate:

$Y(n,t) = \Sigma C_j * FFT(n,X(:,t)), j = 1, K$ wherein $C_j$ is a coding sequence symbol value j and K is a length of the coding sequence.

9. The apparatus of 1, wherein the antenna structure comprises an array of plural antennas, and wherein each of the plural possible frequencies for the dimensional receptivity vector represents a different possible direction of arrival of the arriving wavefront.

10. The apparatus of 9, wherein the correlator output comprises $Y(n,t)$, and wherein the correlator output analyzer is arranged to determine a maximum absolute value $|Y(n,t)|_{max}$, wherein the correlator output analyzer is arranged to use the a sampling window time index t_max at which $|Y(n,t)|_{max}$ occurs as the time of arrival of the arriving wavefront; and wherein the correlator output analyzer is arranged to use the frequency index n_max at which $|Y(n,t)|_{max}$ occurs as the direction of arrival of the arriving wavefront.

11. The apparatus of 9, wherein the correlator output comprises $Y(n,t)$, and wherein the correlator output analyzer is arranged to determine a maximum absolute value $|Y(n,t)|_{max}$, wherein the correlator output analyzer is arranged to obtain an amplitude for the arriving wavefront by dividing $|Y(n,t)|_{max}$ by a number of antennas comprising the antenna array.

12. The apparatus of claim 1, wherein the antenna structure comprises an antenna which provides signals for each of successive sets of pilot data received by the antenna as the dimensionally differentiated signals, and wherein each of the plural possible frequencies corresponds to a doppler shift.

13. The apparatus of 12, wherein the correlator output comprises $Y(n,t)$, and wherein the correlator output analyzer is arranged to determine a maximum absolute value $|Y(n,t)|_{max}$, wherein the correlator output analyzer is arranged to use a sampling window time index t_max at which $|Y(n,t)|_{max}$ occurs to determine the time of arrival of an arriving wavefront; and wherein the correlator output analyzer is arranged to use the a frequency index n_max at which $|Y(n,t)|_{max}$ to determine the doppler shift.

14. The apparatus of 12, wherein the correlator output comprises $Y(n,t)$, and wherein the correlator output analyzer is arranged to determine a maximum absolute value $|Y(n,t)|_{max}$, wherein the correlator output analyzer is arranged to obtain an amplitude for an arriving wavefront by dividing $|Y(n,t)|_{max}$ by a number of sets of pilot data in the series.

15. The apparatus of 1, wherein the antenna structure comprises an antenna which provides signals for each of successive sets of pilot data; wherein the joint searcher and channel estimator is arranged to essentially concurrently consider plural signals for the respective successive sets of pilot data for determining both the time of arrival and channel coefficient; wherein each of the sets of pilot data is represented by a pilot set index, and wherein in the dimensional differentiation index is the pilot set index; and wherein the dimensional receptivity vector is formed from the antenna signal matrix with respect to the sampling window time index for the successive sets of pilot data.

16. The apparatus of 1, wherein each of the plural possible frequencies corresponds to a doppler shift.

17. The apparatus of 16, wherein the correlator output comprises $Y(n,t)$, and wherein the correlator output analyzer is configured to determine a maximum absolute value $|Y(n,t)|_{max}$, wherein the correlator output analyzer uses a sampling window time index t_max at which $|Y(n,t)|_{max}$ occurs to determine the time of arrival of an arriving wavefront; and wherein the correlator output analyzer uses the a frequency index n_max at which $|Y(n,t)|_{max}$ to determine the doppler shift.

18. The apparatus of 1, wherein the correlator output comprises $Y(n,t)$, and wherein the correlator output analyzer determines a maximum absolute value $|Y(n,t)|_{max}$, wherein the correlator output analyzer obtains an amplitude for an arriving wavefront by dividing $|Y(n,t)|_{max}$ by a number of sets of pilot data in the series.

19. The apparatus of claim 15, wherein the joint searcher and channel estimator is arranged to essentially concurrently consider the plural signals for the respective successive sets of pilot data for determining both a time of arrival and channel coefficient by essentially concurrently operating upon a two dimensional functionally dependent matrix, the signals being stored in the matrix as a function of two different indices, a first index being a time index of a sampling window employed for each of the sets of pilot data and a second index indicating for which one of the successive sets of pilot data the signal was obtained.

20. The apparatus of claim 15, wherein the joint searcher and channel estimator is arranged to essentially concurrently consider the plural signals for the respective successive sets of pilot data for determining both a time of arrival and channel coefficient by essentially concurrently operating upon a matrix which stores signals which are dimensionally differentiated by being acquired in differing frame transmission intervals.

21. The apparatus of 1, wherein the antenna structure comprises plural antennas, the plural antennas providing respective plural signals indicative of an arriving wavefront; wherein the joint searcher and channel estimator is arranged to essentially concurrently consider plural signals provided by the plural antennas for determining both the time of arrival and channel coefficient; wherein each of the plural antennas in the antenna array is represented by an antenna index, and wherein the dimensional differentiation index is the antenna index; and wherein in the dimensional receptivity vector formed from the antenna signal matrix with respect to the sampling window time index for the plural antennas of the antenna array.

22. The apparatus of 21, wherein each of the plural possible frequencies for the dimensional receptivity vector represents a different possible direction of arrival of the arriving wavefront 23. The apparatus of 21, wherein the correlator output comprises $Y(n,t)$, and wherein the correlator output correlator output analyzer determines a maximum absolute value $|Y(n,t)|_{max}$, wherein the correlator output analyzer uses a sampling window time index t_max at which $|Y(n,t)|_{max}$ occurs as the time of arrival of the arriving wavefront; and wherein the correlator output analyzer uses the a frequency index n_max at which $|Y(n,t)|_{max}$ occurs as the direction of arrival of the arriving wavefront.

24. The apparatus of 23, wherein the correlator output comprises Y(n,t), and wherein for each arriving wavefront the correlator output correlator output analyzer determines a qualifying absolute value $|Y(n,t)|_{max}$, wherein the correlator output analyzer uses a sampling window time index t_max at which $|Y(n,t)|_{max}$ occurs as the time of arrival of the arriving wavefront; and wherein the correlator output analyzer uses the a frequency index n_max at which $|Y(n,t)|_{max}$ occurs as the direction of arrival of the arriving wavefront.

25. The apparatus of 21, wherein the correlator output comprises Y(n,t), and wherein the correlator output analyzer determines a maximum absolute value $|Y(n,t)|_{max}$, wherein the correlator output analyzer obtains an amplitude for the arriving wavefront by dividing $|Y(n,t)|_{max}$ by a number of antennas comprising the antenna array.

26. A wireless communication receiver comprising:
an antenna structure comprising plural antennas arranged to provide respective plural series of signals for successive sets of pilot data;
a joint searcher and channel estimator arranged to essentially concurrently consider the plural series of signals for determining both a time of arrival and channel coefficient;
wherein each of the plural antennas in the antenna array is represented by an antenna index, wherein each of the sets of pilot data is represented by a pilot set index, and wherein the joint searcher and channel estimator comprises:
an antenna signal matrix in which a complex value indicative of a signal received in a sampling window is stored as a function of a sampling window time index, the antenna index, and the pilot set index;
a correlator which performs a Fast Fourier Transformation (FFT) calculation to generate a correlator output;
a correlator outputanalyzer which uses the correlator output to generate the time of arrival and the channel coefficient, wherein in performing the calculation the correlator considers plural possible frequencies of complex values along the antenna index and plural possible frequencies of complex values along the pilot set index, plural possible frequencies of complex values along the antenna index corresponding to plural possible directions of arrival and being represented by a frequency index n1, the plural possible frequencies of complex values along the antenna index corresponding to plural possible doppler shifts and being represented by a frequency index n2, and wherein for each combination of plural possible direction of arrival frequencies, plural possible doppler frequencies, and plural time indexes, the correlator calculates:
$Y(n_1, n_2, t) = FFT(n_1, n_2, X(:,:,t))$
wherein t is the sampling window time index; X(:,t) is the complex antenna matrix (with the colon ":" representing all antenna indexes for one sampling window time index).

27. The apparatus of claim 26, wherein for each combination of plural possible frequencies and plural time indexes, the method comprises evaluating the following expression:
$Y(n,t) = \Sigma C_j * FFT(n, X(:,:,t)), j = 1, K$
wherein $C_j$ is a coding sequence symbol value j and K is the length of the coding sequence.

28. The apparatus of claim 26, wherein the correlator output comprises $Y(n_1, n_2, t)$, and wherein the correlator output analyzer determines a maximum absolute value $|Y(n_1, n_2, t)|_{max}$, wherein the correlator output analyzer uses a sampling window time index t_max at which $|Y(n_1, n_2, t)|_{max}$ occurs to determine the time of arrival of an arriving wavefront; wherein the correlator output analyzer uses the a direction of arrival frequency index $n_1$_max at which $|Y(n_1, n_2, t)|_{max}$ occurs to determine the doppler shift direction; and wherein the correlator output analyzer uses the a doppler frequency index $n_2$_max at which $|Y(n_1, n_2, t)|$max occurs to determine the doppler shift direction.

29. The apparatus of claim 26, wherein the correlator output comprises $Y(n_1, n_2, t)$, and wherein the correlator output analyzer determines a maximum absolute value $|Y(n_1, n_2, t)|_{max}$, wherein the correlator output analyzer obtains an amplitude for an arriving wavefront by dividing $|Y(n_1, n_2, t)|_{max}$ by a product of a number of sets of pilot data in the series and a number of antennas in the antenna array.

30. A method of operating a wireless communication receiver comprising:
acquiring dimensionally differentiated signals at an antenna structure;
storing, in an antenna signal matrix, complex values indicative of the dimensionally differentiated signals received in a sampling window as a function of a sampling window time index and a dimensional differentiation index;
concurrently using the dimensionally differentiated signals for determining both a time of arrival and channel coefficient by performing the acts of:
locating value(s) in the antenna signal matrix for use in determining the time of arrival and the channel coefficient by using a dimensional reception vector formed from the antenna signal matrix with respect to a sampling window time index, the dimensional receptivity vector having a frequency related to a difference between phase components of complex values of the dimensional receptivity vector, there being plural possible frequencies for the dimensional receptivity, the plural possible frequencies being represented by a frequency index; and
calculating, for each combination of plural possible frequencies and plural time indexes:
$Y(n,t) = FFT(n, X(:,t))$
wherein t is the sampling window time index;
X(:,t) is the complex antenna matrix, with : representing all antenna indexes for one sampling window time index;
n is the frequency index; and,
using the value(s) located to generate the time of arrival and the channel coefficient.

31. The method of claim 30, wherein for each combination of plural possible frequencies and plural time indexes, calculating:
$Y(n,t) = \Sigma C_j * FFT(n, X(:,t)), j = 1, K$
wherein $C_j$ is a coding sequence symbol value j and K is a length of the coding sequence.

32. The method of claim 30, wherein the antenna structure comprises an array of plural antennas, and wherein each of the plural possible frequencies for the dimensional receptivity vector represents a different possible direction of arrival of the arriving wavefront.

33. The method of claim 32, further comprising in the locating step generating an output which comprises Y(n,t), and further comprising determining a maximum absolute value $|Y(n,t)|_{max}$, using the a sampling window time index t_max at which $|Y(n,t)|_{max}$ occurs as the time of arrival of the arriving wavefront; and using the a frequency index n_max at which $|Y(n,t)|_{max}$ occurs as the direction of arrival of the arriving wavefront.

34. The method of claim 32, further comprising in the locating step generating an output which comprises Y(n,t), and further comprising:
   determining a maximum absolute value $|Y(n,t)|_{max}$; and
   obtaining an amplitude for the arriving wavefront by dividing $|Y(n,t)|_{max}$ by a number of antennas comprising the antenna array.

35. The method of claim 30, wherein the antenna structure comprises an antenna which provides signals for each of successive sets of pilot data received by the antenna as the dimensionally differentiated signals, and wherein each of the plural possible frequencies corresponds to a doppler shift.

36. The method of claim 35, wherein the locating step further comprises generating an output which comprises Y(n,t), and further comprising:
   determining a maximum absolute value $|Y(n,t)|_{max}$;
   using a sampling window time index t_max at which $|Y(n,t)|_{max}$ occurs to determine the time of arrival of an arriving wavefront; and
using the a frequency index n_max at which $|Y(n,t)|_{max}$ to determine the doppler shift.

37. The method of claim 35, wherein the locating step further comprises generating output comprising Y(n,t), and further comprising:
   determining a maximum absolute value $|Y(n,t)|_{max}$; and
   obtaining an amplitude for an arriving wavefront by dividing $|Y(n,t)|_{max}$ by a number of sets of pilot data in the series.

38. The method of claim 30, wherein the dimensionally differentiated signals comprise successive sets of pilot data, and wherein the method further comprises:
   concurrently using the signals for each of the successive sets of pilot data for determining both a time of arrival and channel coefficient;
   wherein each of the sets of pilot data is represented by a pilot set index;
   storing a complex value indicative of the signal received in a sampling window an antenna signal matrix as a function of a sampling window time index and the pilot set index;
   forming the dimensional receptivity vector from the antenna signal matrix with respect to a sampling window time index for the plural sets of pilot data;
   calculating, for each combination of plural possible doppler frequencies and plural time indexes, Y(n,t) =FFT(n,X(:,t)), wherein n is the doppler frequency index.

39. The method of claim 38, wherein for each combination of plural possible frequencies and plural time indexes, the method comprises evaluating the following expression:
   $Y(n,t) = \Sigma C_j *FFT(n,X(:,t)), j=1,K$
   wherein $C_j$ is a coding sequence symbol value j and K is the length of the coding sequence.

40. The method of claim 38, wherein the correlator output comprises Y(n,t), and further comprising determining a maximum absolute value $|Y(n,t)|_{max}$.

41. The method of 40, further comprising:
   using a sampling window time index t_max at which $|Y(n,t)|_{max}$ occurs to determine the time of arrival of an arriving wavefront; and
   using the doppler frequency index n_max at which $|Y(n,t)|_{max}$ to determine the doppler shift direction.

42. The method of 40, further comprising obtaining an amplitude for the arriving wavefront by dividing $|Y(n,t)|_{max}$ by a number of sets of pilot data in the series.

43. The method of claim 38, further comprising concurrently using the signals for each of successive sets of pilot data for determining both a time of arrival and channel coefficient by essentially concurrently operating upon a two dimensional functionally dependent matrix, the signals being stored in the matrix as a function of two different indices, a first index being a time index of a sampling window employed for each of the sets of pilot data and a second index indicating for which one of the successive sets of pilot data the signal was obtained.

44. The method of claim 38, further comprising concurrently using the signals for each of successive sets of pilot data for determining both a time of arrival and channel coefficient by essentially concurrently operating upon a matrix which stores signals which are dimensionally differentiated by being acquired in differing frame transmission intervals.

45. The method of claim 30, further comprising obtaining from plural antennas of the antenna structure respective plural signals indicative of an arriving wavefront,
   associating each of the plural antennas in the antenna array with an antenna index.

46. The method of claim 45, wherein each of the plural possible frequencies for the dimensional receptivity vector represents a different possible direction of arrival of the arriving wavefront.

47. The method of claim 45, wherein the correlator output comprises Y(n,t), and further comprising determining a maximum absolute value $|Y(n,t)|_{max}$.

48. A method of operating a wireless communication receiver comprising:
   obtaining from plural antennas respective plural series of signals for successive sets of pilot data;
   concurrently using the plural series of signals for determining both a time of arrival and channel coefficient;
   wherein each of the plural antennas in the antenna array is represented by an antenna index, wherein each of the sets of pilot data is represented by a pilot set index, wherein the step of concurrently using the plural signals for determining both the time of arrival and the channel coefficient is performed by a joint searcher and channel estimator, and further comprising the acts of the joint searcher and channel estimator:
   storing a complex value indicative of the signal received in a sampling window an antenna signal matrix as a function of a sampling window time index, the antenna index, and the pilot set index;
   performing a Fast Fourier Transformation (FFT) calculation to generate a correlator output;
   using the correlator output to generate the time of arrival and the channel coefficient;
   wherein in performing the calculation the correlator considers plural possible frequencies of complex values along the antenna index and plural possible frequencies of complex values along the pilot set index, plural possible frequencies of complex values along the antenna index corresponding to plural possible directions of arrival and being represented by a frequency index $n_1$, the plural possible frequencies of complex values along the antenna index corresponding to plural possible doppler shifts and being represented by a frequency index $n_2$, and wherein for each combination of plural possible direction of arrival frequencies, plural possible doppler frequencies, and plural time indexes; and wherein the correlator calculates:

$Y(n_1,n_2,t) = FFT(n_1,n_2,X(:,:,t))$ wherein t is the sampling window time index; $X(:,:,t)$ is the complex antenna matrix (with the colons ":,:," representing all antenna indexes and all pilot indexes for one sampling window time index).

49. The method of claim 48, wherein for each combination of plural possible frequencies and plural time indexes, the method comprises evaluating the following expression:

$Y(n,t) = \Sigma C_j * FFT(n,X(:,:,t)), j=1,K$ wherein $C_j$ is a coding sequence symbol value j and K is the length of the coding sequence.

50. The method of claim 48, wherein the correlator output comprises $Y(n_1,n_2,t)$, and further comprising determining a maximum absolute value $|Y(n_1,n_2,t)|_{max}$.

51. The method of claim 48, further comprising:

using a sampling window time index t_max at which $|Y(n_1,n_2,t)|_{max}$ occurs to determine the time of arrival of an arriving wavefront;

using an antenna index $n_1$ max at which $|Y(n_1,n_2,t)|_{max}$ occurs to determine the direction of arrival of an arriving wavefront; and using the doppler frequency index n2_max at which $|Y(n1,n2,t)|$ max to determine the doppler shift direction.

* * * * *

UNITED STATES PATENT AND TRADEMARK OFFICE
CERTIFICATE OF CORRECTION

| | | |
|---|---|---|
| PATENT NO. | : 7,308,286 B2 | |
| APPLICATION NO. | : 10/717313 | |
| DATED | : December 11, 2007 | |
| INVENTOR(S) | : Felter | |

It is certified that error appears in the above-identified patent and that said Letters Patent is hereby corrected as shown below:

In Column 5, Line 29, delete "parametic" and insert -- parametric --, therefor.

In Column 5, Line 30, delete "parametic" and insert -- parametric --, therefor.

In Column 5, Line 33, delete "parametic" and insert -- parametric --, therefor.

In Column 7, Line 51, delete "parmetric" and insert -- parametric --, therefor.

In Column 7, Line 58, delete "parmetric" and insert -- parametric --, therefor.

In Column 33, Line 7, delete "paremetric" and insert -- parametric --, therefor.

In Columns 34-40, in Claims 2, 3, 4, 5, 6, 7, 8, 9, 10, 11, 13, 14, 15, 16, 17, 18, 19, 21, 22, 23, 24, 25, 41, 42, after "of" insert -- claim --.

In Column 35, Line 32, in Claim 10, after "the" delete "a".

In Column 35, Line 57, in Claim 13, after "use the" delete "a".

In Column 36, Line 19, in Claim 17, after "uses the" delete "a".

In Column 36, Line 46, in Claim 20, after "intervals" insert -- . --.

In Column 36, Line 63, in Claim 22, after "wavefront" insert -- . --.

In Column 36, Line 65, in Claim 23, after "wherein the" delete "correlator output".

In Column 37, Line 3, in Claim 23, after "uses the" delete "a".

In Column 37, Line 8, in Claim 24, after "the" delete "correlator output".

In Column 37, Line 13, in Claim 24, after "the" delete "a".

In Column 37, Line 40, in Claim 26, delete "outputanalyzer" and insert -- output analyzer --, therefor.

UNITED STATES PATENT AND TRADEMARK OFFICE
CERTIFICATE OF CORRECTION

PATENT NO. : 7,308,286 B2
APPLICATION NO. : 10/717313
DATED : December 11, 2007
INVENTOR(S) : Felter It is certified that error appears in the above-identified patent and that said Letters Patent is hereby corrected as shown below:

In Column 37, Line 49, in Claim 26, delete "n1," and insert -- $n_1$, --, therefor.

In Column 37, Line 52, in Claim 26, delete "n2," and insert -- $n_2$, --, therefor.

In Column 38, Line 4, in Claim 28, delete "$|Y(n_1,n_2,t)_{max,}$" and insert -- $|Y(n_1,n_2,t)|_{max,}$ --, therefor.

In Column 38, Line 7, in Claim 28, after "uses the" delete "a".

In Column 38, Line 10, in Claim 28, after "uses the" delete "a".

In Column 38, Line 11, in Claim 28, delete "$|Y(n_1,n_2,t)|max$" and insert -- $|Y(n_1,n_2,t)|_{max}$ --, therefor.

In Column 38, Line 16, in Claim 29, delete "$|Y(n_1,n_2,t)_{max,}$" and insert -- $|Y(n_1,n_2,t)|_{max,}$ --, therefor.

In Column 38, Line 67, in Claim 33, after "the" delete "a".

In Column 39, Line 2, in Claim 33, after "the" delete "a".

In Column 39, Line 24, in Claim 36, after "the" delete "a".

In Column 42, Line 8, in Claim 51, delete "$n_1$ max" and insert -- $n_1\_max$ --, therefor.

UNITED STATES PATENT AND TRADEMARK OFFICE
CERTIFICATE OF CORRECTION

PATENT NO. : 7,308,286 B2
APPLICATION NO. : 10/717313
DATED : December 11, 2007
INVENTOR(S) : Felter It is certified that error appears in the above-identified patent and that said Letters Patent is hereby corrected as shown below:

In Column 42, Line 11, in Claim 51, delete "n2_max" and insert -- $n_2\_max$ --, therefor.

In Column 42, Line 12, in Claim 51, delete "|Y(n1,n2,t)max" and insert -- $|Y(n_1,n_2,t)|_{max}$ --, therefor.

Signed and Sealed this

Fourteenth Day of October, 2008

JON W. DUDAS
*Director of the United States Patent and Trademark Office*